US008635545B2

(12) United States Patent
Kim et al.

(10) Patent No.: US 8,635,545 B2
(45) Date of Patent: Jan. 21, 2014

(54) USER INTERACTION METHOD AND APPARATUS FOR ELECTRONIC DEVICE

(75) Inventors: Jin Yong Kim, Seoul (KR); Dong Jun Shin, Seoul (KR); Hee Woon Kim, Gyeonggi-do (KR); Seung Hye Yoo, Seoul (KR); Su Hyun Na, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 381 days.

(21) Appl. No.: 12/855,872

(22) Filed: Aug. 13, 2010

(65) Prior Publication Data
US 2011/0041086 A1 Feb. 17, 2011

(30) Foreign Application Priority Data

Aug. 13, 2009 (KR) ........................ 10-2009-0074748

(51) Int. Cl.
*G06F 3/048* (2013.01)

(52) U.S. Cl.
USPC ............................ 715/764; 715/810; 715/825

(58) Field of Classification Search
USPC .......................................... 715/764; 345/163
See application file for complete search history.

(56) References Cited

U.S. PATENT DOCUMENTS

| | | | | | |
|---|---|---|---|---|---|
| 5,586,237 | A | * | 12/1996 | Baecker et al. | 345/670 |
| 5,886,697 | A | * | 3/1999 | Naughton et al. | 345/473 |
| 6,160,554 | A | * | 12/2000 | Krause | 715/804 |
| 6,570,597 | B1 | * | 5/2003 | Seki et al. | 715/835 |
| 7,086,011 | B2 | * | 8/2006 | Budrys et al. | 715/837 |
| 7,503,009 | B2 | * | 3/2009 | Peters | 715/764 |
| 7,730,425 | B2 | * | 6/2010 | de los Reyes et al. | 715/835 |
| 7,966,575 | B1 | * | 6/2011 | Jetha et al. | 715/817 |
| 8,239,784 | B2 | * | 8/2012 | Hotelling et al. | 715/830 |
| 8,286,096 | B2 | * | 10/2012 | Shibaike | 715/834 |
| 8,365,074 | B1 | * | 1/2013 | Wagner et al. | 715/702 |
| 8,411,046 | B2 | * | 4/2013 | Kruzeniski et al. | 345/173 |
| 8,477,108 | B2 | * | 7/2013 | Waller et al. | 345/173 |
| 8,514,251 | B2 | * | 8/2013 | Hildreth et al. | 345/635 |
| 2003/0043206 | A1 | * | 3/2003 | Duarte | 345/810 |
| 2003/0084096 | A1 | * | 5/2003 | Starbuck et al. | 709/203 |
| 2005/0251748 | A1 | * | 11/2005 | Gusmorino et al. | 715/713 |
| 2006/0026523 | A1 | * | 2/2006 | Kitamaru et al. | 715/708 |
| 2006/0036568 | A1 | * | 2/2006 | Moore et al. | 707/1 |
| 2008/0122796 | A1 | * | 5/2008 | Jobs et al. | 345/173 |
| 2008/0126994 | A1 | * | 5/2008 | Park et al. | 715/847 |
| 2008/0198141 | A1 | * | 8/2008 | Lee et al. | 345/173 |
| 2008/0204424 | A1 | * | 8/2008 | Jin et al. | 345/173 |
| 2009/0102805 | A1 | | 4/2009 | Meijer et al. | |
| 2009/0181770 | A1 | | 7/2009 | Viner et al. | |
| 2010/0083167 | A1 | * | 4/2010 | Kikuchi et al. | 715/786 |
| 2010/0174987 | A1 | * | 7/2010 | Shin et al. | 715/702 |
| 2011/0018806 | A1 | * | 1/2011 | Yano | 345/163 |
| 2011/0041086 | A1 | * | 2/2011 | Kim et al. | 715/764 |

FOREIGN PATENT DOCUMENTS

| | | | | |
|---|---|---|---|---|
| JP | 2008-191799 | | 8/2008 | ............ G06F 3/041 |
| KR | 10-0590576 | | 11/2006 | ............... G06F 3/03 |
| KR | 2008-0104858 | | 12/2008 | ............ G06F 3/041 |

* cited by examiner

*Primary Examiner* — David Phantana Angkool
(74) *Attorney, Agent, or Firm* — Cha & Reiter, LLC

(57) ABSTRACT

An interaction method and apparatus for an electronic device is proposed for providing the user with interactive audio/video/haptic effects. An interaction method for an electronic device according to the present invention includes outputting an event object in response to an input action to an event element; detecting a user interaction to the event object; and outputting an effect object in response to the user interaction.

20 Claims, 52 Drawing Sheets

USER INTERACTION METHOD AND APPARATUS FOR ELECTRONIC DEVICE

CLAIM OF PRIORITY

This application claims, pursuant to 35 USC 119, priority to and the benefit of the earlier filing date of, that patent application filed in the Korean Patent Office on Aug. 13, 2009, and afforded serial number 10-2009-0074748, the contents of which are incorporated by reference, herein.

BACKGROUND OF THE INVENTION

1. Field of the Invention

The present invention relates to user interfaces and, in particular, to an interaction method and apparatus for an electronic device that is capable of providing interactive audio/video/haptic effects.

2. Description of the Related Art

With the rapid development of electronic technologies, electronic devices are becoming more and more intelligent with enhanced User Interface (UI) and various functions implemented in association with the interactive UI. In order to maximize the utilization of such electronic devices, various input mechanisms have been proposed. Particularly, the mobile devices are prevailing today due to their utilization convenience and portability and used for various purposes in various fields.

SUMMARY OF THE INVENTION

In order to overcome the problems of the prior art, the present invention provides a method and apparatus for controlling an electronic device based on a user's interaction.

Also, the present invention provides a user interaction method and apparatus for an electronic device that is capable of providing feedback to the user with enriched effects.

Also, the present invention provides a user interaction method and apparatus for an electronic device that is capable of interacting to predetermined event elements with enriched effects.

Also, the present invention provides a user interaction method and apparatus for an electronic device that is capable of providing more emotional and intuitive user interface by associating basic functions of the electronic device with predefined event elements to operate interactively.

In accordance with an aspect of the present invention, an interaction method for an electronic device includes outputting an event object in response to an input action to an event element; detecting a user interaction to the event object; and outputting an effect object in response to the user interaction.

In accordance with another aspect of the present invention, an interaction system for an electronic device includes a plurality of event elements for executing event effects corresponding to various situations; a plurality of event objects mapped to the event elements; a plurality of user interactions that can be mapped to the event objects; and a plurality of effect objects mapped to the event elements and the user interaction per event element.

In accordance with still another aspect of the present invention, an interaction apparatus for an electronic device includes an input means which receives at least one user interaction; and an output means which outputs an effect object in response to a user interaction input through the input means.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Exemplary embodiments of the present invention are described with reference to the accompanying formulas and drawings in detail. The same reference numbers are used throughout the drawings to refer to the same or like parts. Detailed descriptions of well-known functions and structures incorporated herein may be omitted to avoid obscuring the subject matter of the present invention.

The present invention proposes a user interaction method of an electronic device that is capable of providing the user with entertainment. In an exemplary embodiment of the present invention, the electronic device includes at least one component for detecting at least one user action. The electronic device provides an object corresponding to a predefined event element and various feedbacks in response to the user's action on the object with video, audio, and/or haptic effects.

The user interaction system according to an exemplary embodiment is composed of at least one event element for providing event feedback corresponding to various events (e.g., birthday event, party event, and examination pass event); event objects allowing execution of the event corresponding to the event element in response to the user's action to the event element; interaction information about one or more user interactions instructing execution of predetermined effect; and effect objects output representing the effect in response to the user's interaction. Here, the event objects can be mapped to the at least one event elements, and the effect objects can be mapped to the event elements and the user's interactions to the event elements.

The user interaction provision apparatus of the present invention can include an input means for at least one receiving user interaction, and an output means for outputting the effect object in response to the user interaction input through the input means. The input means can be a device detecting user interactions defined in the present invention and include a voice input means, a touch input means, a motion input means, etc. The output means can be a device outputting the effect objects corresponding to various effects defined in the present invention and include an audio output means, a video (still and motion image) output means, a vibration generation means, etc.

The user interaction provision method of the present invention can include outputting event objects of event elements corresponding to user input; receiving user interaction by means of the event objects, and outputting effect objects in response to the user interaction.

The structures and operations of the electronic device according to exemplary embodiments of the present invention are described hereinafter with reference to FIGS. 1 to 54. It would recognized by those skilled in the art that the structures and operations of the electronic device of the present invention are not limited to the following descriptions but can be modified in various embodiments.

Figure 1:
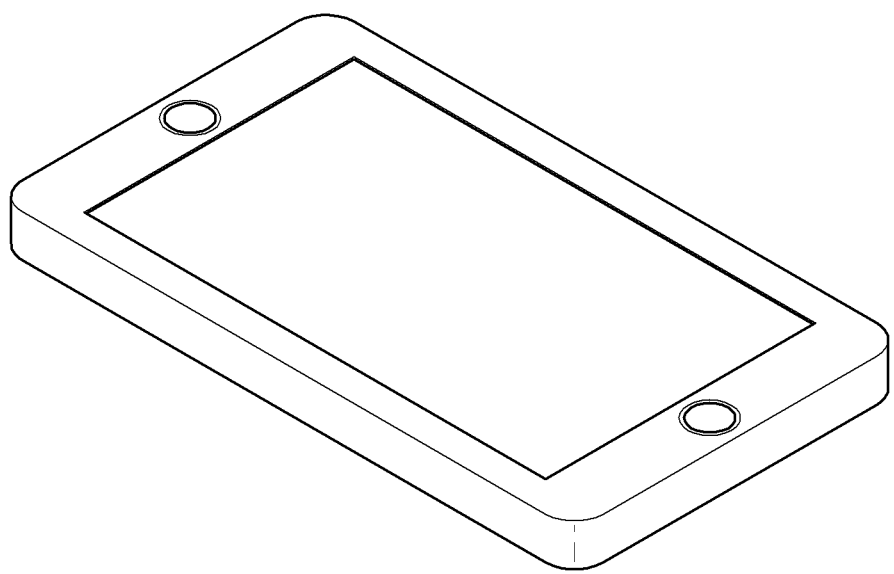
FIG. 1 shows a mobile terminal as an electronic device to which the present invention is applied.
Figure 2:
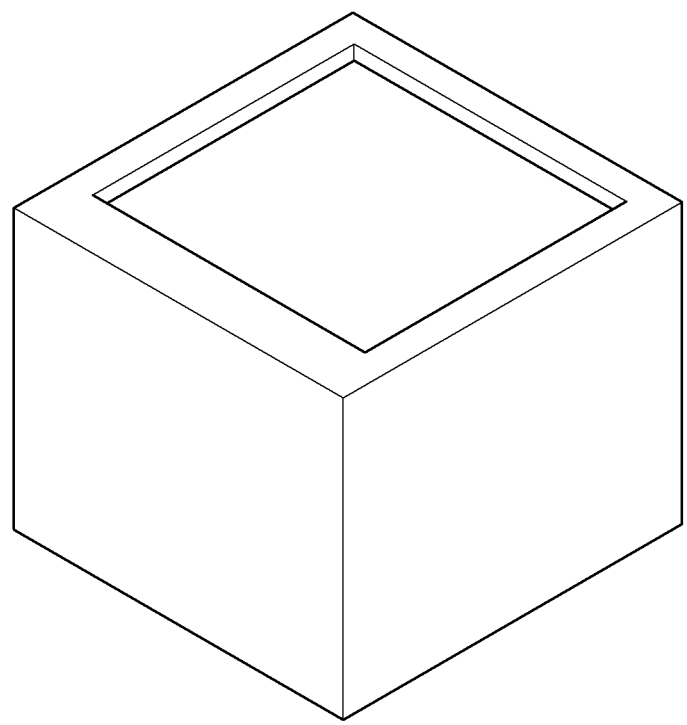
FIG. 2 shows an electronic information system as an electronic device to which the present invention is applied.
Figure 3:
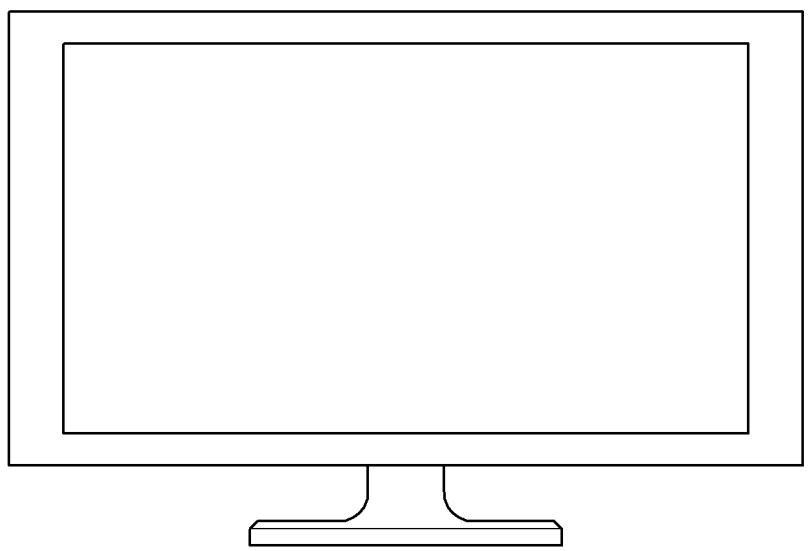
FIG. 3 shows a monitor for use in a personal computer as an electronic device to which the present invention is applied.

FIGS. 1 to 3 are schematic diagrams illustrating electronic devices according to exemplary embodiments of the present invention.

FIG. 1 shows a mobile terminal as an electronic device to which the present invention is applied, FIG. 2 shows an electronic information system as an electronic device to which the present invention is applied, and FIG. 3 shows a monitor for use in a personal computer as an electronic device to which the present invention is applied.

The mobile terminal of FIG. 1 can be any of a plurality of mobile communication terminals 100 operating with communication protocols implemented in various communication systems, Personal Multimedia Player (PMP), Digital Broadcast Player, Personal Digital Assistant (PDA), music player (e.g., MP3 player), Samartphone, and their equivalents.

The electronic information system of FIG. 2 can be any of a plurality of screen monitors and media poles 200 that are fixed on walls, or posts, or on the ground in museums, pavilions, amusement parks, and roads for providing guidance information in response to user request.

Also, the monitor of FIG. 3 can be any of a plurality of devices 300 such as a television, a monitor-integrated personal computer, a laptop computer, etc. Each of the electronic devices includes at least one user interactive means, and the user interactive means can be implemented in various forms.

The electronic device according to an exemplary embodiment of the present invention also acts as an output means for outputting feedback in response to the user input and can be any of a variety of types of portable devices and large devices fixed at specific places. Although the description is addressed to a portable device in the following, the present invention can be applied to various types of electronic devices.

In an exemplary embodiment of the present invention, the electronic device detects at least one user action input through at least one input means and outputs a feedback event with at least one of video, audio, and haptic effects in response to the at least one user interaction. For this purpose, the electronic device includes at least one input device for receiving the user interactions. The user interaction can include voice interaction, motion interaction, touch interaction, and multimodal interaction.

The electronic device can include at least one of a voice input device such as a microphone for detecting voice interaction, a motion sensor for detecting motion interaction, a touchscreen (or touchpad) for detecting touch interaction, or at least two of the aforementioned device for detecting multimodal interaction.

In an exemplary embodiment of the present invention, the electronic device is configured to provide at least one predefined event element. The electronic device also can provide effect objects per user interaction using the objects corresponding to the event elements. In an exemplary embodiment of the present invention, the electronic device can group at least one event element into an event group and provides a series of effects according to the event elements contained in the event group.

Figure 4:
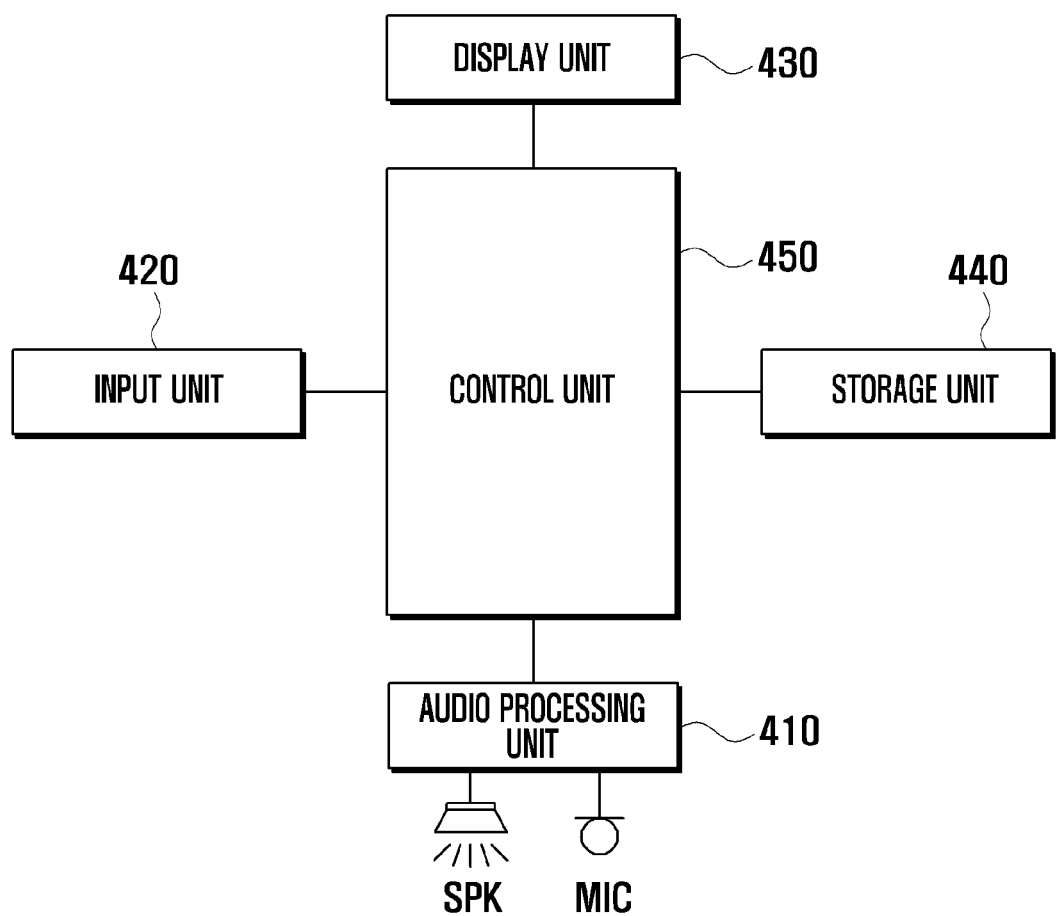
FIG. 4 is a block diagram illustrating a configuration of the electronic device according to an exemplary embodiment of the present invention.

A description is made of the configuration of the electronic device with reference to FIG. 4.

FIG. 4 is a block diagram illustrating a configuration of the electronic device according to an exemplary embodiment of the present invention.

Referring to FIG. 4, the electronic device includes an audio processing unit 410, an input unit 420, a display unit 430, a storage unit 440, and a control unit 450. Although not depicted in the drawing, the electronic device can further include at least one of Radio Frequency (RF) unit, a digital broadcast module such as Digital Multimedia Broadcasting (DMB) and Digital Video Broadcasting (DVB) receiver, camera module for taking still/motion picture, Bluetooth module for performing Bluetooth communication, Internet access module for accessing Internet, and touchpad for receiving touch input. Such RF units are well known in the art and details of their operation need not be provided in detail herein.

The audio processing unit 410 is connected to a microphone (MIC) and a speaker (SKP). The audio processing unit 410 processes the audio signal (e.g. voice signal) input through the microphone to output audio data to the control unit 450 and processes the audio data by the control unit 450 to output an audio signal (e.g., audio signal outputted by playing a music file) through the speaker (SPK). That is, the audio processing unit 410 converts the analog signal input through the microphone (MIC) to a digital signal and converts the digital signal input by the control unit 350 to an analog signal. The audio processing unit 410 can play various audio signals (e.g., audio signal corresponding to an effect object) generated in response to a user interaction input to the electronic device.

The input unit 420 receives various alphabetic data signals and transfers the input signals in association with controlling functions of the electronic device to the control unit 450. The input unit 420 generates an input signal according a user's action and includes at least one of keypad, a set of function keys, and a touchpad for generating the input signal. The input unit 420 can be implemented with at least one of a touchpad, a touchscreen, a normal keypad (e.g., 4×3 or 3×4 keypad), QWERTY keypad, and a set of special function keys. In case that the electronic device is implemented only with a touchscreen as a single input means, the touchscreen represents the input device 420.

The display unit 430 displays visual data generated while the electronic device are executing a specific function, a user input event, a key manipulation status information, and a function configuration information of the electronic device. That is, the display unit 430 can display screen data presenting information related to the operation status and progress. The display unit 430 displays the various signal and color information output by the control unit 450 with visual effects. The display unit 430 can be implemented with any of a Liquid Crystal Display (LCD), an Organic Light Emitting Display (OLED), and an Active Matrix OLED (AMOLED). The display unit 430 can be configured to operate in landscape mode and portrait mode according to the orientation of the portable device.

In an exemplary embodiment of the present invention, the display unit 430 can be implemented with touchscreen functionality. The touchscreen is a device which can detect an touch event (such as touch, multi-touch, drag, tap, and flick) made by means of a user's finger or an object, such as stylus, and recognizes a position of the touch event. If a touch event is made at an object presented on the touchscreen or a specific area of the touchscreen, the touchscreen detects and reports the position where the touch event is made such that an application executes a predetermined task in response to the touch event. That is, the touchscreen allows the user to input a command by making a gesture right on the touchscreen.

In an exemplary embodiment of the present invention, the display unit 430 can receive a touch interaction for controlling a function provided by an application. The touch interaction represents all tap interactions, double tap interactions, drag and drop interactions, touch and move interactions, and flick interactions. The display unit 430 can generate and transfer the aforementioned touch interactions to the control unit 450 and output an effect object corresponding to the interaction in response to the control signal received from the control unit 450.

The storage unit 440 can be implemented with a Read Only Memory (ROM) and Random Access Memory (RAM). The storage unit 440 can store various types of data generated and used in the electronic device. The data can include all the type of the application data generated while the applications are running and received from external sources (e.g., other electronic devices). Particularly in an exemplary embodiment of the present invention, the data can include user interface, event elements related to execution of entertainment function, objects mapped to the event elements, effect objects corresponding to user interactions available with the objects, setting information related to the use of the entertainment function (setting information related to edit/setting to be described later), Graphical User Interface (GUI) objects configured per application, video data per event element for use in effect playback (motion picture file, flash file, animation file, etc), and image information. The storage unit 440 can include one or more buffer for buffering data generated while the aforementioned applications are running. The storage unit 440 can be implemented inside of the electronic device or as an external device such as smart card. The storage unit 440 can include all the types of internal and external storage media (e.g., RAM, ROM, Flash).

The control unit 450 controls the operations of the electronic device and signaling among internal function blocks of the electronic device. The control unit 450 controls signaling among the audio processing unit 410, input unit 420, display unit 430, and storage unit 440. Although not depicted in FIG. 4, the control unit 450 can include a data processing unit with a codec and at least one modem for supporting mobile communication service. In case that the electronic device supports mobile communication service, a Radio Frequency (RF) unit can be included for processing RF signal.

The control unit 450 controls processing events by using predefined event elements. The control unit 450 controls such that the object of the event element selected by the user among the predefined event elements is displayed on the display unit 430. The control unit 450 recognizes the user interaction input through the display unit 430 or the microphone (MIC) and outputs an object (GUI, sound, etc.) corresponding to the effect retrieved in response to the user interaction through the display unit 430 and/or speaker (SPK).

The control operations of the control unit 450 are described in more detail with reference to the drawings. In an exemplary embodiment of the present invention, the aforementioned function control procedure can be implemented in software.

Although the electronic device has been depicted schematically in FIG. 4 for the simplicity purpose, the present invention is not limited to the above-structured electronic device.

In case that the electronic device is configured to support mobile communication services, the control unit 450 can include a baseband module for processing mobile communication service. In case of being configured to support mobile communication services, the electronic device can include a radio communication module for establishing a communication channel with a mobile communication network to perform communication service such as voice call, video telephony call, and data call. In this case, the audio processing unit 410 can further include a voice signal processing function for the mobile communication service.

Although not depicted in FIG. 4, the electronic device according to an exemplary embodiment of the present invention can further include at least one of a camera module for capturing an object to acquire video data, a digital broadcast reception module for playing digital broadcast data, a short range wireless communication module for short range communications, an Internet access module for Internet access, and a motion sensor for detecting motions of the user. It is obvious to those skilled in the art that the internal function blocks of the electronic device can be excluded or replaced by other similar devices.

Although the description is directed to an electronic device having a touchscreen, the present invention can be applied to the electronic devices implemented without touchscreen. For example, the user interaction method of the present invention can be applied to the electronic device equipped with a normal LCD display and keypad and/or touchpad. That is, the electronic device can receive the user interaction defined in the present invention through the keypad, touchpad, microphone, and motion sensor and output the feedback on the display unit.

FIGS. 5 to 8 are diagrams for explaining operations of outputting events in response to at least one user interaction in an electronic device according to an exemplary embodiment of the present invention.

Referring to FIGS. 5 to 8, reference number 510 denotes items corresponding to single event elements for executing an event, reference number 530 denotes an item defined as a set of a predetermined number of event elements (group event element), and reference number 550 denotes an item corresponding to a group box for the user to create a group event element.

Reference number 555 (FIG. 8) denotes an item created by the user grouping a plurality of event elements 510 into the group box 550. That is, reference number 550 (FIG. 5) denotes an empty group box, and reference number 555 (FIG. 8) denotes the group box filled with event elements 510 selected by the user. The group box 555 corresponds to the group event element 530. In case that a predetermined number of signal event elements 510 are bound into a group box 550, the group of signal event elements can be provided as a group event element.

Figure 5:
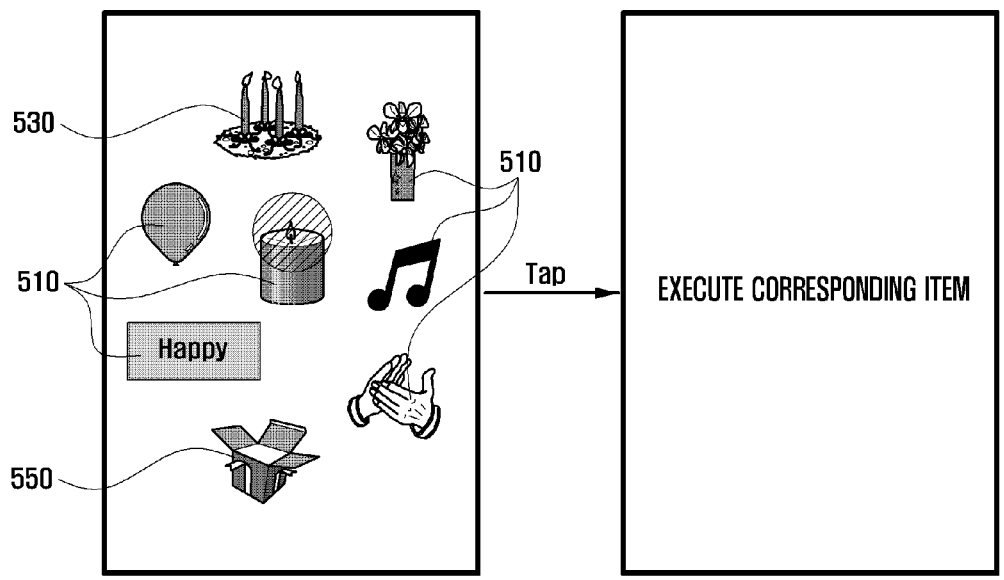
FIGS. 5 to 8 are diagrams for explaining operations of outputting events in response to at least one user interaction in an electronic device according to an exemplary embodiment of the present invention.

FIG. 5 shows an exemplary feedback operation of the electronic device in response to a tap action made on a single event element 510. If a tap action (as denoted by the hashed circle, which is used throughout this disclosure to represent a tap action) is detected on a single event element, the event element is executed such that a corresponding object is displayed. Detailed description is made with reference to drawings later.

Figure 6:
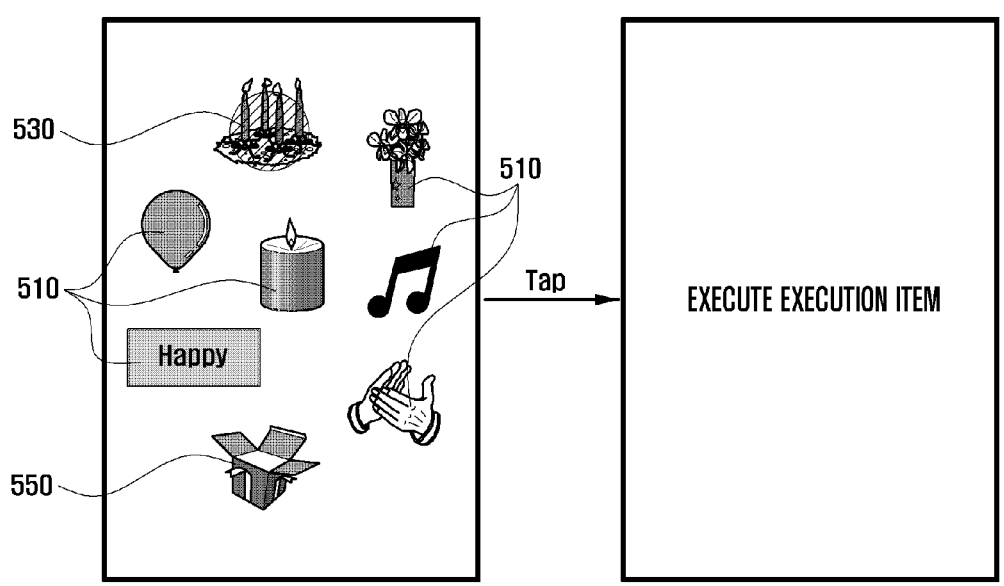

FIG. 6 shows an exemplary feedback operation of the electronic device in response to a tap action (as denoted by the hashed circle) made on a group event element 530. If a tap action is detected on a group event element, the group event is executed such that an object corresponding to one of the single event elements constituting the group event element is output in consideration of priority order. That is, if the group event element is executed, the single event elements constituting the group event element are output in priority order. Detailed description is made with reference to drawings later.

Figure 7:
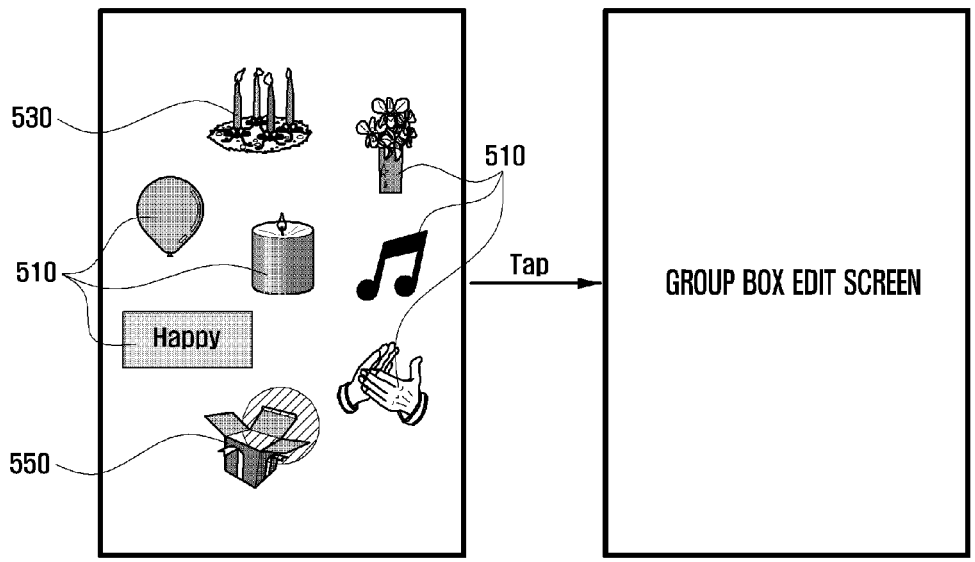

FIG. 7 shows an exemplary feedback operation of the electronic device in response to a tap action (as denoted by the hashed circle) made on an empty group box 550. If a tap action is detected on the empty group box 550, the electronic device displays a group box edit screen in response to the tap action. Detailed description is made with reference to drawings. For example, in one aspect of the invention, a first screen may be replaced by a second screen as more fully described and illustrated with regard to FIG. 18, wherein a group box edit screen replaces a first screen in response to a tap action.

Figure 8:
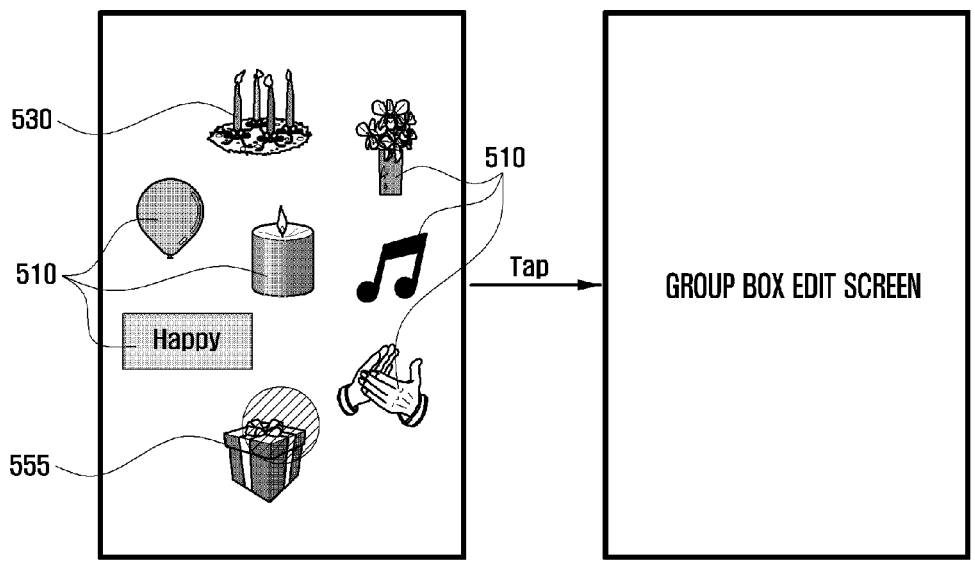

FIG. 8 shows an exemplary feedback operation of the electronic device in response to a tap action (as denoted by the hashed circle) made on a full group box 555. If a tap action is detected on the full group box 555, the electronic device executes the full group box 555 such that an object corresponding to one of the single event elements contained in the group box 555 is output in accordance with priorities of the event elements. The full group box 555 can contain a plurality of single event elements as the group event element. Accordingly, when the full group box is executed, the single event elements contained in the full group box are output in priority order. Detailed description is made with reference to drawings later.

As described above, the electronic device according to an exemplary embodiment of the present invention can provide single event elements and group event elements, each composed of a plurality of single event elements. According to at least one interaction to the single event element or the group event element, various effects can be provided along with the event. That is, the electronic device according to an exemplary embodiment of the present invention includes one or more interactive devices for user interaction such that the interactive devices provide the events mapped to the corresponding event element.

Figure 9:
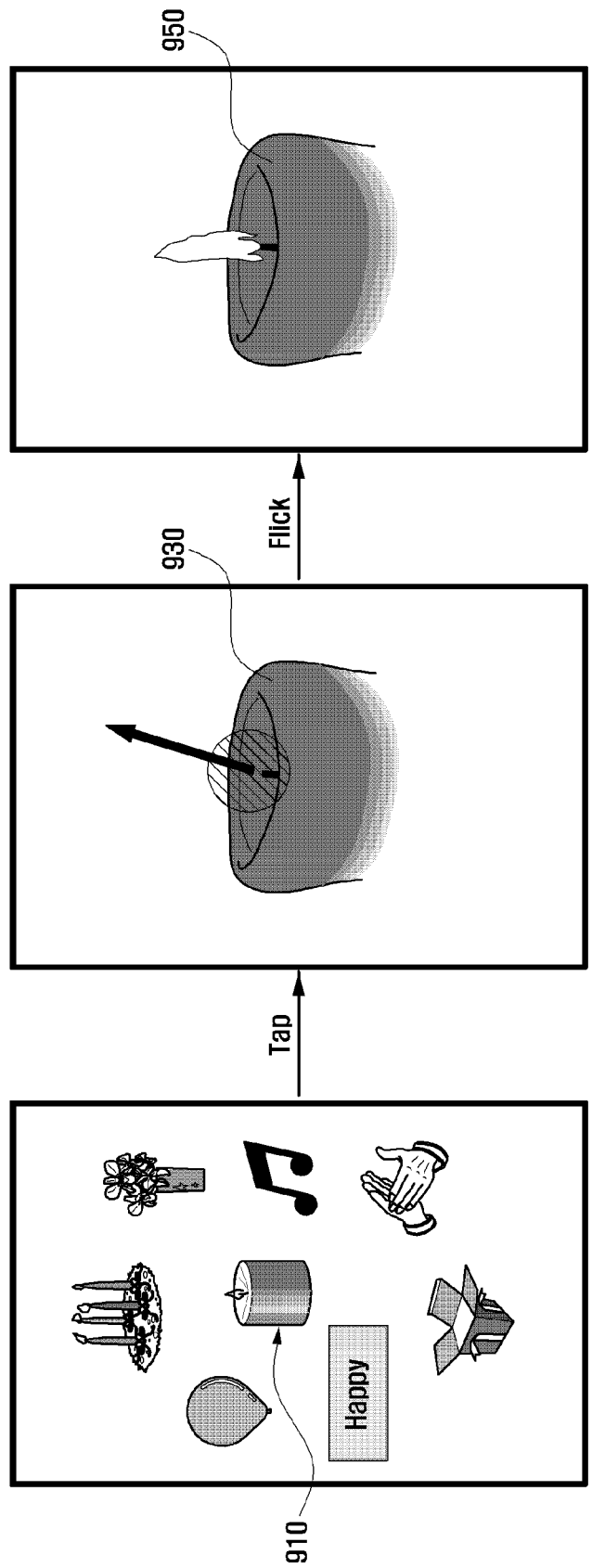
FIGS. 9 to 13 are diagrams illustrating exemplary screen images for explaining event feedback operations with per-element effects in the user interaction method according to an exemplary embodiment of the present invention.
Figure 13:
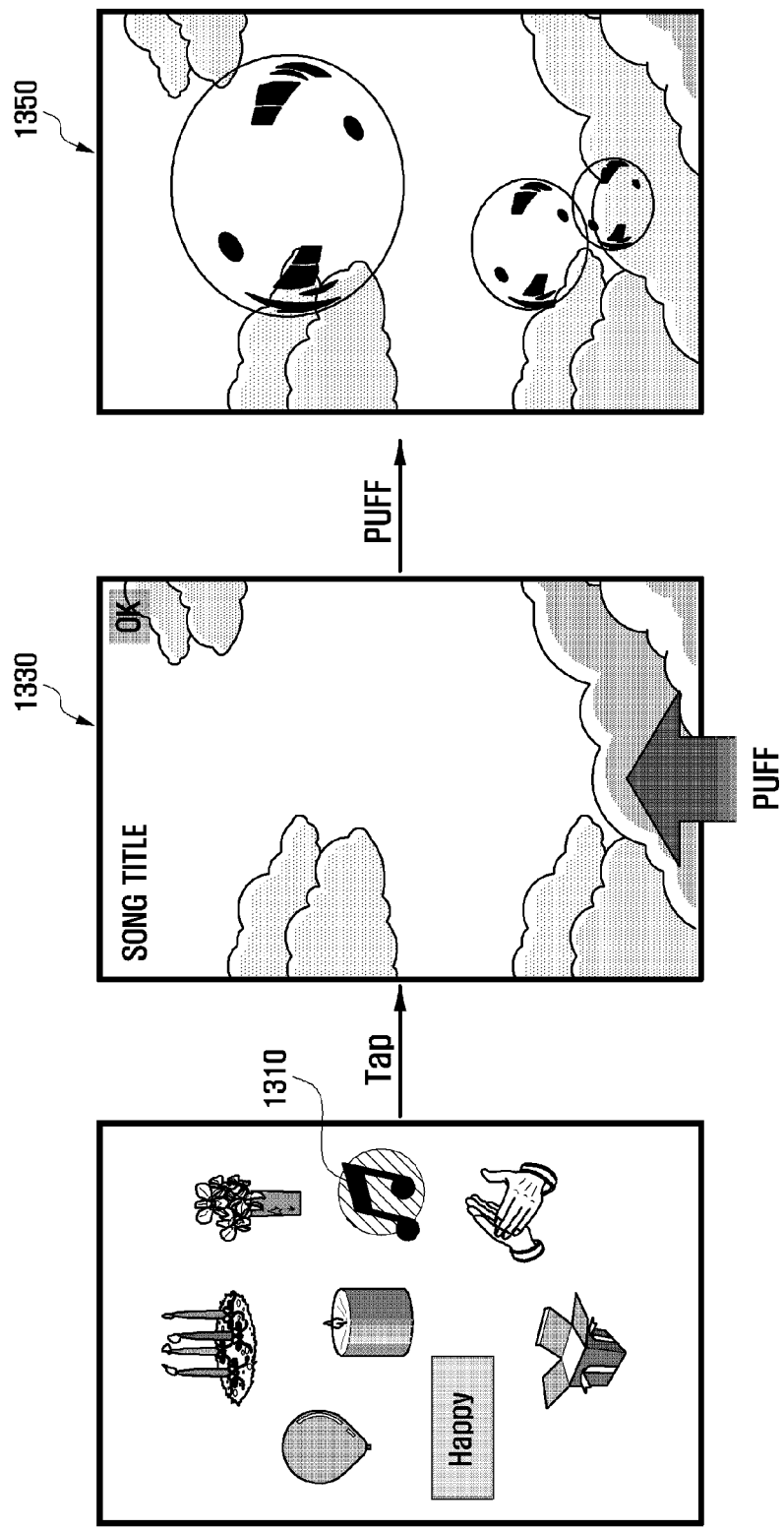

Table 1 shows exemplary event elements according to an exemplary embodiment of the present invention, and Table 2 shows exemplary interactions input in relation with the event elements of Table 1. The effects provided in response to the user interactions on the event elements are depicted in FIGS. 9 and 13.

TABLE 1

| Item list |
| --- |
| Birthday item |
| Firework item |
| Balloon item |
| Candle item |
| Cheer item |
| Electric sign item |
| Bubble item |
| Group box item |

As shown in Table 1, the event elements can include various items such as birthday item, firework item, balloon item, candle item, cheer item, electric sign item, bubble item, and group box item. The event elements are not limited to those listed in Table 1, but the element list can be edited by adding new event elements or replacing old event elements with new ones at the manufacturing stage or according to a user configuration.

The birthday item is composed of a plurality of single event elements such that, when the birthday item is executed, the single event elements are rendered. For example, if the birthday item is executed, the single event elements are rendered in order of electric sign item→candle item→firework item→cheer item along with the playback (or repetition) of a happy birthday song. The priority order and selection of the items are more fully disclosed with regard to FIG. 18.

The firework item can be designed to express a firework explosion on the background of a beautiful night view in accordance with the position at which the user interaction is made.

The balloon item can be designed to express inflation of balloons in response to the user interaction. The candle item can be designed such that animated candles are blown out in response to the user interaction. The candle item can be provided with a visual effect of illumination in association with photographing function.

The cheer item can be designed to express applause and shouting sounds in response to the user interaction along with display of applauding video.

The electric sign item can be designed to display a full screen image filled with a designated color when no text is input and a sliding and/or wave effect animation with an input text in accordance with the direction of the user interaction.

The bubble item can be designed to express the bubbles forming with the playback of a predetermined song (or a part of a song).

The group box item can be designed such that a plurality of various event elements, such as birthday item, is rendered in series with a package setting function. In case that a group is set using the group box item, it is possible to provide the event such as the birthday item execution with the group box item.

TABLE 2

| Item | Interaction |
| --- | --- |
| Firework item | Tap interaction |
|  | Flick interaction |
|  | Blow interaction |
|  | . . . |
| Balloon item | Blow interaction |
|  | Tap interaction |
|  | . . . |
| Candle item | Flick interaction |
|  | Blow interaction |
|  | . . . |
| Electric sign item | Drag and drop interaction |
|  | Tap interaction |
|  | Hold interaction |
|  | . . . |
| . . . | . . . |

As shown in table 2, for each item according to an exemplary embodiment of the present invention, a single event element, can be executed in response to one or more user interactions. Detailed descriptions are made for the output operations of effect objects corresponding to user interactions made on the single event elements with later reference to the drawings.

The event elements listed in table 1 and the effects output in response to the user interactions (see table 2) made on the event elements are described with reference to FIGS. 9 to 13.

FIGS. 9 to 13 are diagrams illustrating exemplary screen images for explaining event feedback operations with per-element effects in the user interaction method according to an exemplary embodiment of the present invention.

FIG. 9 shows exemplary feedback operations of the electronic device in response to actions made on one of the single event elements (here, the candle item 910) listed in table 1.

If a tap action is detected on the candle item 910 (as denoted by the hashed circle), the candle item 910 is executed such that a corresponding object is displayed on the screen as shown in FIG. 9. The object can be an image of an unlit candle as denoted by reference number 930 and changed with a lit candle as denoted by reference number 950 in response to a flick action (as indicated by the depicted arrow beginning at the area of the tap (hashed circle)) thereon.

The user can make a predetermined action on the object 930 to change the unlit candle image into another object 950. For example, the user can make a flick action on the unlit candle image object 930 such that the unlit candle image object 930 is replaced by the lit candle image object 950. That is, a flick action is detected on the unlit candle image object 930, the electronic device outputs a feedback with a visual effect in which the unlit candle is lit in response to the flick action. The visual effect can be provided with the corresponding audio effect.

In order to give the reality to the visual effect, the lit candle image object 950 can be designed as an animation object. For example, the lit candle image object 950 can be a motion picture or a flash file in which the flame of the candle is shaking in the wind. Various effects that can be expressed with the candle item are described later.

Figure 10:
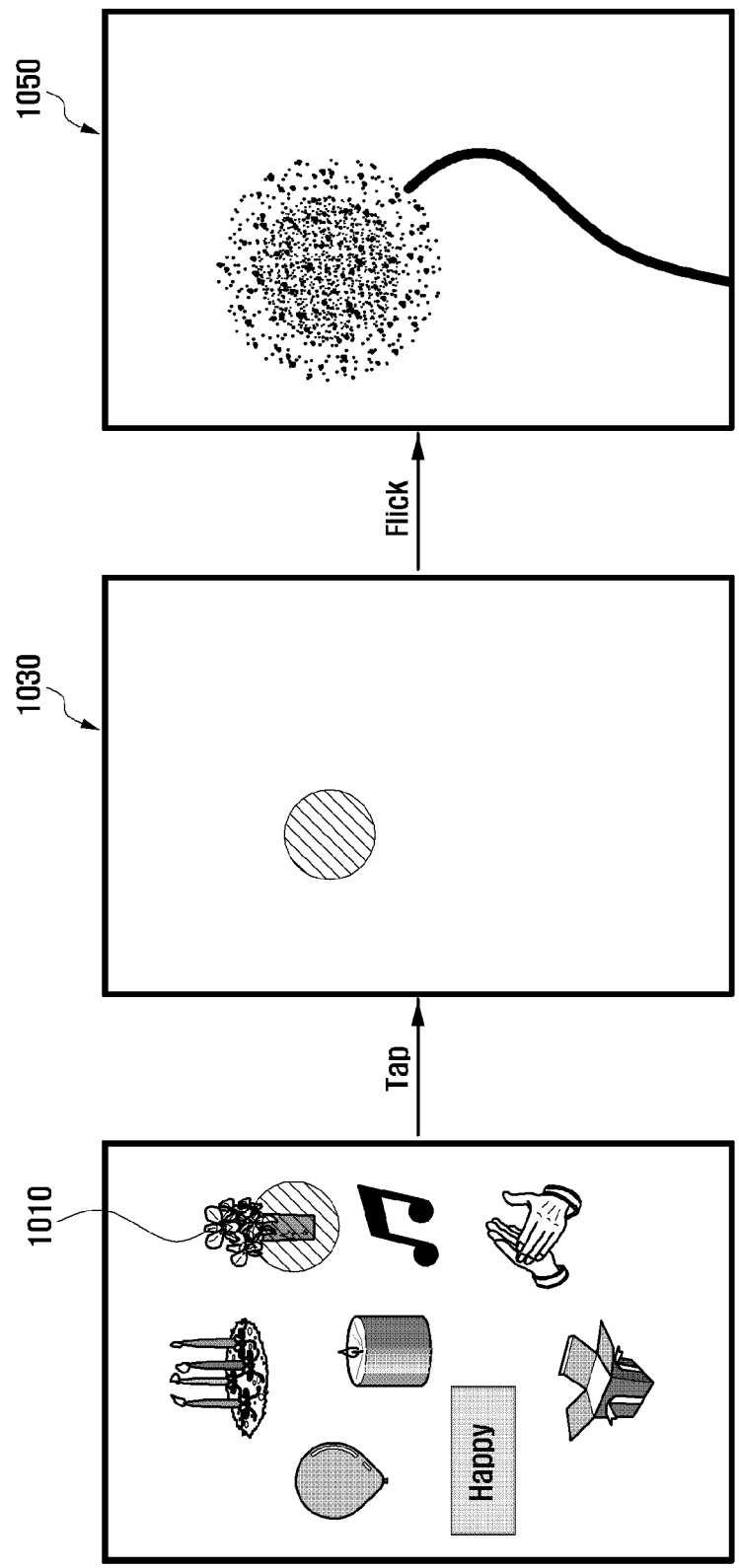

FIG. 10 shows exemplary feedback operations of the electronic device in response to user interactions made on one of the single event elements (here, the firework item 1010).

If a tap action is detected on the firework item 1010, the firework item 1010 is executed such that a corresponding object is displayed on the screen as shown in FIG. 10. At this time, the object can be provided in the form of a blank background image or a specific (still or motion) image such as night view image. In FIG. 10, an exemplary blank background image is displayed in response to the tap action.

The user can make a predefined interaction on the object 1030 such that the object 1030 is replaced with the object denoted by reference number 1050. That is, the user can make an action on the object 1030. For example, the user can make a tap action on the blank background image object 1030 such that the blank background image object 1030 is replaced with a firework explosion image object 1050. The firework explosion image object 1050 can be designed such that the visual effect of firework explosion is displayed at a position where the interaction (the tap action) is detected. Meanwhile, the visual effect can be provided in synchronization together with a sound effect of "pop" and a haptic effect of vibration. If the tap action is inputted, the visual effect displays at a position where the tap action is detected. When the visual effect is displayed by the screen, sound effect and/or haptic effect may be outputting by a speaker and/or a vibration motor. For example, the visual effect, the sound effect and the haptic effect may by outputted by playback of an animation file that couples image, sound and vibration. Although not shown, it would be recognized, that the animation file may be associated with, and accessed through, the exemplary functions shown in Table 2.

In order to improve the reality, the firework explosion image object 1050 can be provided in the form of an animation image. For example, the firework explosion can be expressed in an animation image or flash image where a fire cracker is shooting up from the bottom of the screen and exploded at a specific position in response to the user interaction. Various effects that can be expressed with the firework item are described later.

Figure 11:
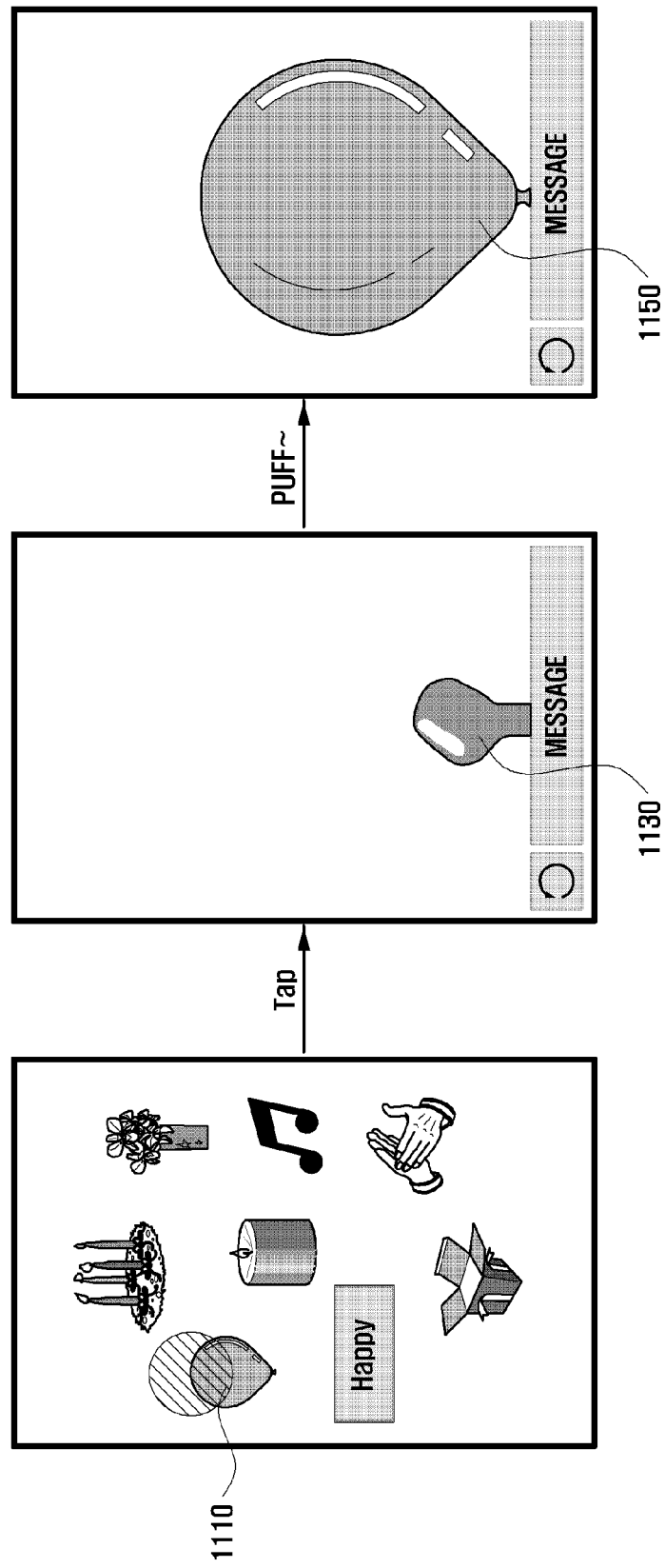

FIG. 11 shows exemplary feedback operations of the electronic device in response to user interactions made on one of the single event elements (here, the balloon item 1110).

If a tap action is detected on the balloon item 1110, the balloon item 1110 is executed such that a corresponding object is displayed on the screen as shown in FIG. 11. At this time, the object can be provided in the form of a flat balloon image as denoted by reference number 1130 of FIG. 11.

The user can make a predefined interaction on the flat balloon image object 1130 such that the object 1130 is replaced with an object denoted by reference number 1150. For example, the user can make an interaction (e.g. a blow action to the microphone) while the object 1130 is displayed on the screen. If the user interaction is detected, the electronic device controls operation of the display such that another object expressing an effect in which the flat balloon is gradually inflates to fill the balloon 1150 in response to the user interaction. That is, the electronic device controls such that the flat balloon image object 1130 is replaced with the inflated balloon image object 1150 in response to the user's voice interaction with sound "puff" or blowing on a microphone. The user can make the blow action to expect a visual effect in which the flat balloon is gradually inflated. In order to improve the reality of the blowing effect, the object 1150 can be provided in the form of a motion picture rather than a still picture. For example, the object 1150 can be implemented in the form of motion picture or flash file in which a flat balloon is gradually inflated while the user makes a blow interaction with a puff sound to the microphone. Various effects that can be expressed with the balloon item are described later.

Figure 12:
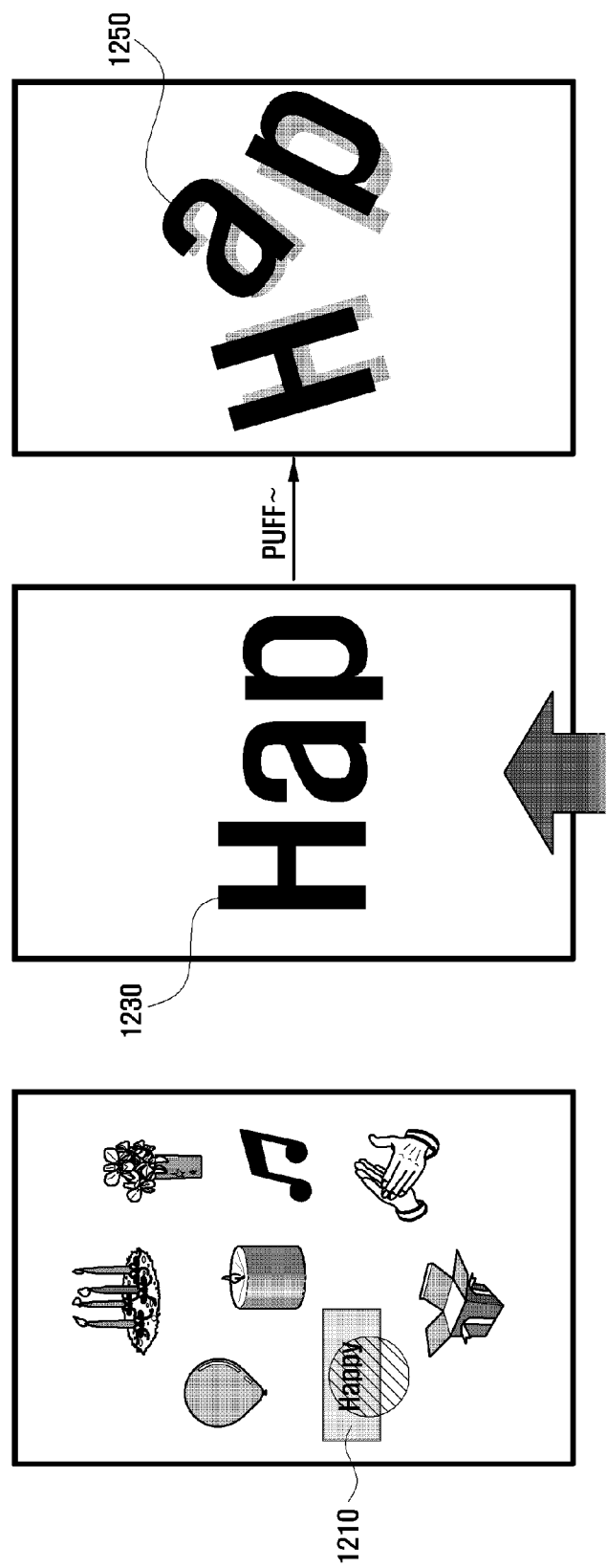

FIG. 12 shows exemplary feedback operations of the electronic device in response to user interactions made on one of the single event elements (here, the electric sign item 1210).

If an action (e.g., tap action) is detected on the electric sign item 1210, the electric signal item 1210 is executed such that an object corresponding to the electric sign item 1210 is displayed on the screen. At this time, the object can be provided in the form of a text (e.g., the term "HAP" of the term "HAPPY") as denoted by reference number 1230 of FIG. 12.

The electronic device can provide an object having the effect in which the text "HAPPY" flies to an upper end in the screen in response to the blow interaction with sound "puff", as denoted by reference number 1250 of FIG. 12. For example, if the user makes a voice input interaction with sound "puff" to the microphone (as indicated by the solid arrow) while the text "HAPPY" is displayed, the electronic device outputs an event with a visual effect in which the individual characters of the text are continuously positioned randomly toward the upper end of the screen. At this time, the blow interaction can be applied in horizontal/vertical direction according to whether the electronic device is operating in portrait view mode or landscape view mode. Accordingly, another GUI effect can be provided if needed. In order to enhance the reality of the effect, the object 1250 replacing the object 1230 can be provided in the form of a motion picture. For example, the object 1250 can be a motion picture or a flash file in which the individual characters of the text are dispersed. Various effects that can be expressed with the electric sign item are described later.

FIG. 13 shows exemplary feedback operations of the electronic device in response to user interactions made on one of the single event elements (here, the bubble item).

As shown in FIG. 13, if an action (e.g., tap action) is detected on the bubble item 1310. The bubble item 1310 is executed such that an object 1330 corresponding to the bubble item 1310 is displayed on the screen. At this time, the object 1330 of FIG. 13 is provided in the form of a sky picture as background image.

If the user makes a predefined interaction on the screen displaying the object 1330 (e.g., a flick, a tap, a blow), the electronic device controls operation such that the object 1330 is replaced by another object 1350. For example, the user can make a blow interaction to the microphone (MIC) while the object 1330 is displayed on the screen, if the blow interaction (as indicated by a solid arrow) is detected, the electronic device displays the object 1350 with a visual effect in which the bubbles are flying to the sky. The visual effect can be provided with an audio object playing a part of predetermined song (e.g. a measure) depending on the duration and impact of the blow interaction. In order to improve the reality of the effect, the object 1350 replacing the object 1330 can be provided in the form of a motion picture rather than a still picture. For example, the object 1350 can be a motion picture or a flash file in which the bubbles are flying upward in response to the blowing interaction made to the microphone. Various effects that can be expressed with the bubble item are described later.

Figure 14:
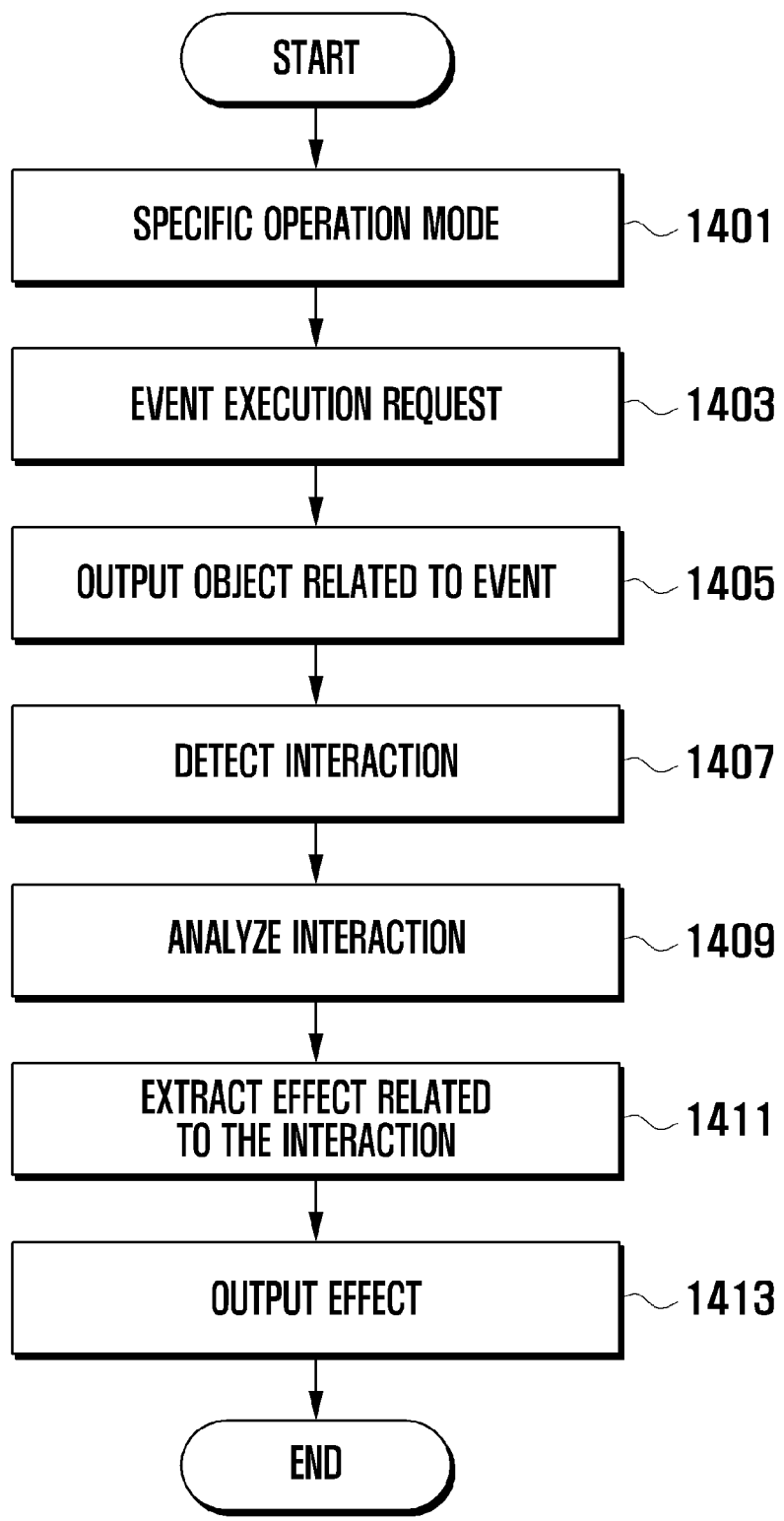
FIG. 14 is a flowchart illustrating a user interaction method according to an exemplary embodiment of the present invention.

FIG. 14 is a flowchart illustrating a user interaction method according to an exemplary embodiment of the present invention.

Referring to FIG. 14, the electronic device first executes a specific operation mode (1401). The specific operation mode can be an application execution mode activated while running a specific application, an idle mode, or an entertainment mode activated for the entertainment mode according to an exemplary embodiment of the present invention. FIG. 14 is depicted under the assumption that the electronic device operates in the entertainment mode.

In the entertainment mode, the electronic device detects a user command requesting for execution of a specific event (1403). After the user command is detected, the electronic device displays an event object corresponding to the requested event (1405). For example, the user can make an action on a specific item displayed on the screen as shown in any of FIGS. 9 to 13, and the electronic device can display an event object corresponding to the item in response to the user's action made thereon.

After displaying the event object, the electronic device monitors the input device (keypad, touchscreen, MIC input) to detect a user interaction. If a user interaction is detected in association with the event object (1407), the electronic device analyzes the user interaction (1409). For example, the user interaction can be any of a voice interaction (e.g. blow interaction), a touch interaction (e.g. tap interaction and/or a flick interaction), and a motion interaction as described with reference to FIGS. 9 to 13.

Next, the electronic device retrieves an effect corresponding to the user interaction as the analysis result (1411). For example, the electronic device can retrieve an effect corresponding to the voice interaction or the touch interaction.

Next, the electronic device outputs a resultant object corresponding to the retrieved effect (1413). For example, the electronic device can output the resultant object reflecting at least one of a video, an audio, and/or a haptic effect.

Figure 15:
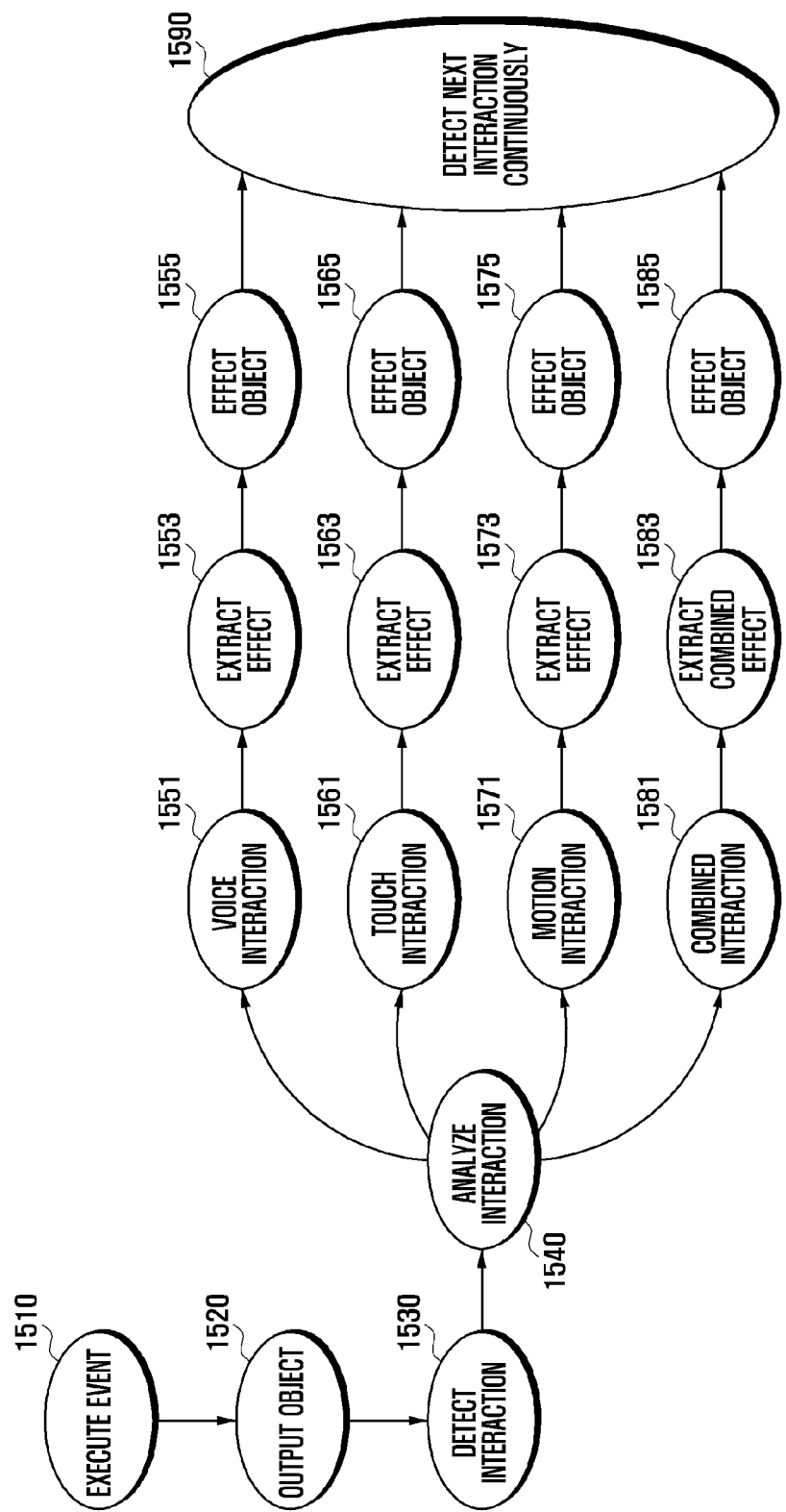
FIG. 15 is a flow diagram illustrating operations of the electronic device in response to the user interaction according to an exemplary embodiment of the present invention.

FIG. 15 is a flow diagram illustrating operations of the electronic device in response to the user interaction according to an exemplary embodiment of the present invention.

Referring to FIG. 15, the electronic device detects execution of an event in response to a user request (1510) and outputs an event object corresponding to the event element representing the requested event (1520). The user can input one of a plurality of user interactions predefined in association with the event object.

If a user interaction is input, the electronic device detects the user interaction (1530) and analyzes the user interaction (1540). For example, the electronic device determines whether the user interaction is a voice interaction, a touch interaction, a motion interaction, or combinations thereof.

If it is determined that the detected user interaction is a voice interaction (e.g., blow interaction) (1551), the electronic device retrieves the effect mapped to the event object (event element) and the voice interaction (1553). Next, the electronic device outputs an effect object representing the retrieved effect to render the event (1555).

As a result of the interaction analysis at step 1540, if it is determined that the detected user interaction is a touch interaction (e.g., tap interaction) made on the event object (1561), the electronic device retrieves the effect mapped to the event object (event element) and the touch interaction (1563). Next, the electronic device outputs an effect object representing the retrieved effect to render the event (1565).

As a result of the interaction analysis at step 1540, if it is determined that the detected user interaction is a motion interaction (e.g. orientation switching interaction) in association with the event object (1571), the electronic device retrieves the effect mapped to the event object (event element) and the motion interaction (1573). Next, the electronic device outputs an effect object representing the retrieved effect to render the event (1675).

As a result of the interaction analysis at step 1540, if it is determined that the detected user interaction is a combined interaction (e.g. if both the blow interaction and the tap interaction are input) (1581), the electronic device identifies the individual interactions (the blow interaction and the tap interaction) and retrieves the effects mapped to the event object (or event element) and the respective interactions (1583). Next, the electronic device outputs effect objects representing the retrieved effects to render the combined event (1585).

In the meantime, the electronic device can monitor the input device (keypad, touchscreen, MIC input) to detect a second user interaction while processing the effect corresponding to the previously detected user interaction (1590). That is, the electronic device can detect another user interaction input after canceling the previous user interaction or t after completion of the effect of the event element by combining the previous and second user interaction input event element. In this case, the electronic device can return to the procedure step 1540.

Figure 16:
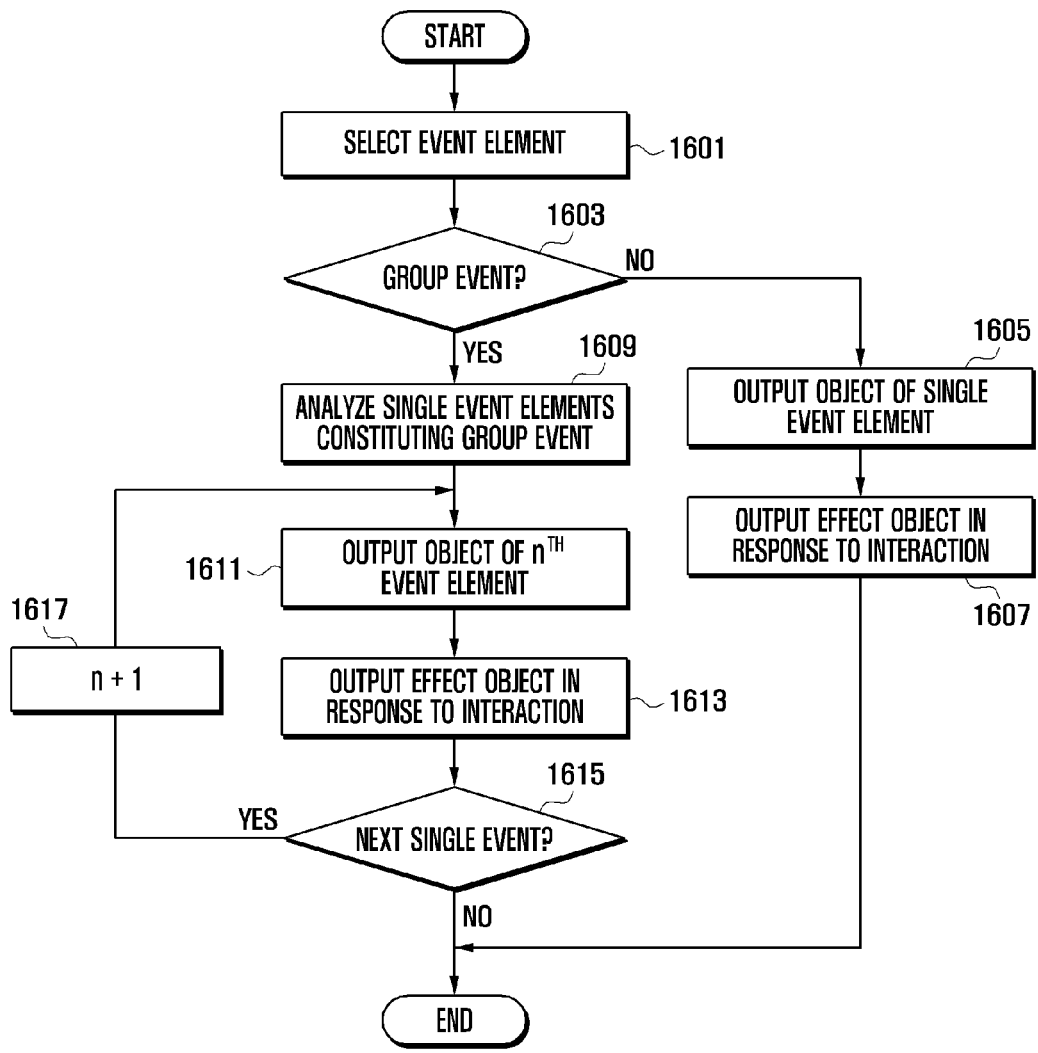
FIG. 16 is a flowchart illustrating a procedure for processing event elements by type in the user interaction method according to an exemplary embodiment of the present invention.

FIG. 16 is a flowchart illustrating a procedure for processing event elements by type in the user interaction method according to an exemplary embodiment of the present invention.

Referring to FIG. 16, the electronic device detects a user input for selecting a specific event element (1601) and determines whether the selected event element is a single event element or a group event element (1603).

If it is determined that the selected event element is a single event element, the electronic device outputs an event object corresponding to the single event element (1605). Next, the electronic device outputs an effect object in response to the user interaction made in association with the event object as described with reference to FIGS. 5 to 14 (1607).

Otherwise, if it is determined that the selected event is a group event element at step 1603, the electronic device analyzes at least one single event elements included in the group event element (1609). At this time, the electronic device can check the types of the single event elements contained in the group event element and the arrangement of the single event elements, i.e. the execution priorities of the single event elements, the selection of which is described with regard to FIG. 18. Next, the electronic device outputs the object of the single event element having the highest priority (n=1) (1611). Next, the electronic device outputs an effect object in response to the user interaction made in association with the event object as described with reference to FIGS. 5 to 14 (1613). In case of group event element, the electronic device performs steps 1611 to 1613 in association with all of the single event elements constituting the group event element.

That is, after processing the effect of the single event element at step 1613, the electronic device determines whether a next single event element exists (1615). If no next single event element exists, the electronic device ends the event element processing procedure. Otherwise, if a next single event element exists, the electronic device checks the next single event element (n+1) (1617) and returns the procedure to step 1611. The electronic device can repeat the above-described steps for each single event element within the group event element.

Until now, how the electronic device render the events with various effects in response to at least one user interaction made in association with single event elements and group event elements are described with exemplary embodiments and screen images. The above-described operations of the electronic device are explained with exemplary screen images hereinafter. The present invention is not limited to the following description but can be implemented with various modifications in other embodiments.

Figure 17:
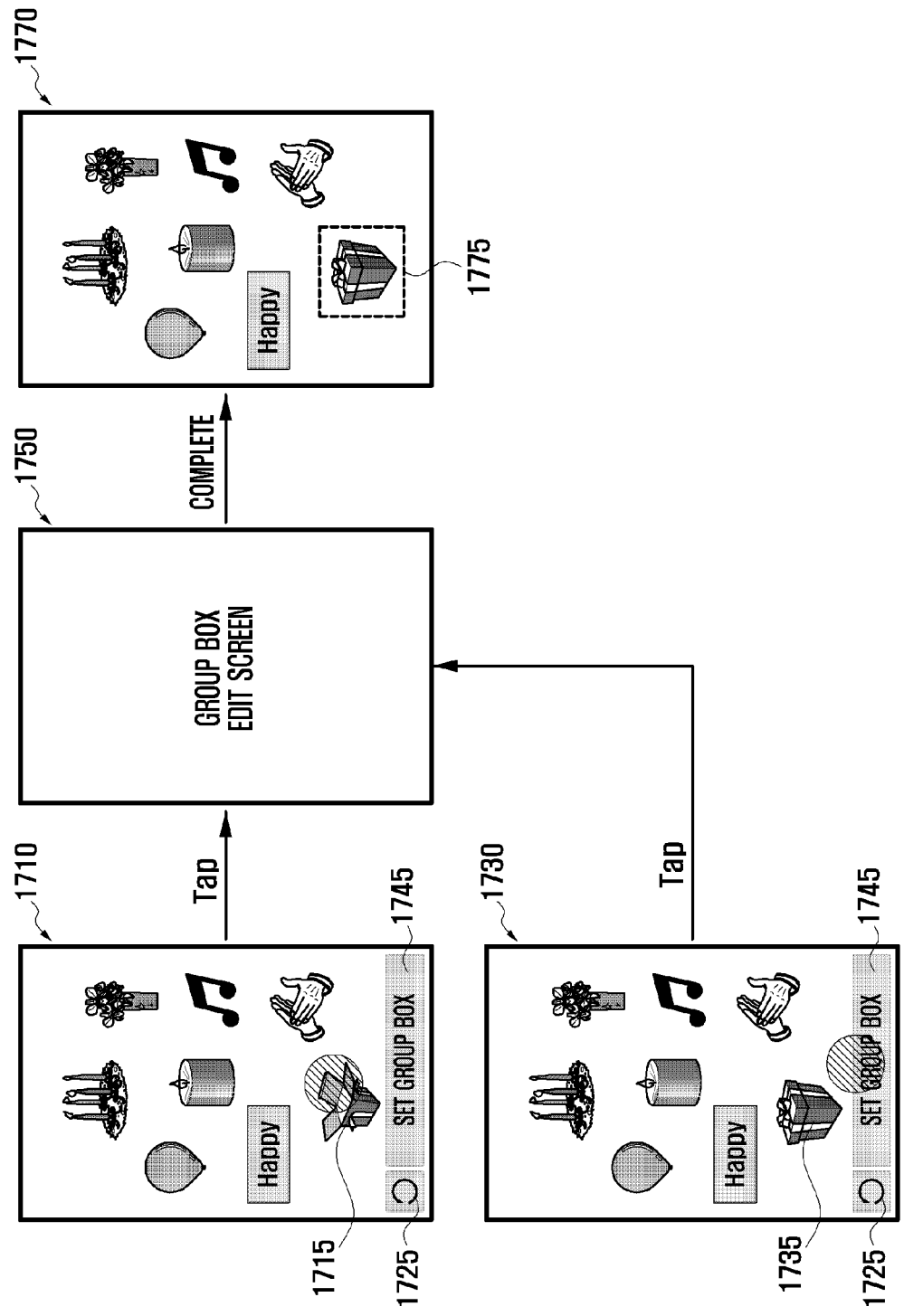
FIG. 17 is a diagram illustrating a group box item configuration procedure of the user interaction method according to an exemplary embodiment of the present invention.

FIG. 17 is a diagram illustrating a group box item configuration procedure of the user interaction method according to an exemplary embodiment of the present invention.

Referring to FIG. 17, reference numbers 1710 and 1730 denote exemplary screens displayed in entertainment mode, each entertainment mode screen including a plurality of event elements. Particularly, the entertainment mode screen 1710 is an initial entertainment mode screen for configuring an empty group box item 1715, and the entertainment mode screen 1730 is an initial entertainment mode screen for editing a full group box item 1735.

Reference number 1715 denotes an empty group box item which can be configured with at least one single event item into a group event item, reference number 1725 denotes a return item for returning from the current menu to a previous menu, reference number 1745 denotes a group box configuration item for configuring an empty group box item with single event items or editing a full group box item, and reference number 1735 denotes a full group box item composed of at least one single event item.

As shown in FIG. 17, the user can configure the empty group box item with at least one single event element in response to user input such as tap action on the empty group box item. That is, when a user action is detected on the empty group box item 1715, the electronic device controls such that the group box configuration screen 1750 is displayed in response to the user action. The structure and operations of the group box configuration screen are described in detail with reference to FIG. 18.

The user can complete the group box configuration through a configuration process while the group box item configuration screen 1750 is displayed. If the group box configuration process has completed, a group box configuration complete screen 1770 having a full group box item 1775, as a result of the group box configuration process, is displayed. The full group box item 1775 can correspond to a group event element composed of at least one single event element.

Afterward, the user can input a user action such as a tap action on the group box configuration item 1745 for editing the single event elements contained in the group box item 1735 while the screen 1730 is displayed.

If the user action is detected on the group box configuration item 1745, the electronic device controls such that the group box configuration screen is displayed in response to the user action. The user can edit the group box item 1735 through an editing process while the group box configuration screen 1750 is displayed. If the group box configuration has been completed, the edited group box item is displayed on the group box configuration complete screen 1770.

In case that the group box item is configured with at least one single event element, the group box item can be processed as a group event element in the effect rendering process.

Figure 18:
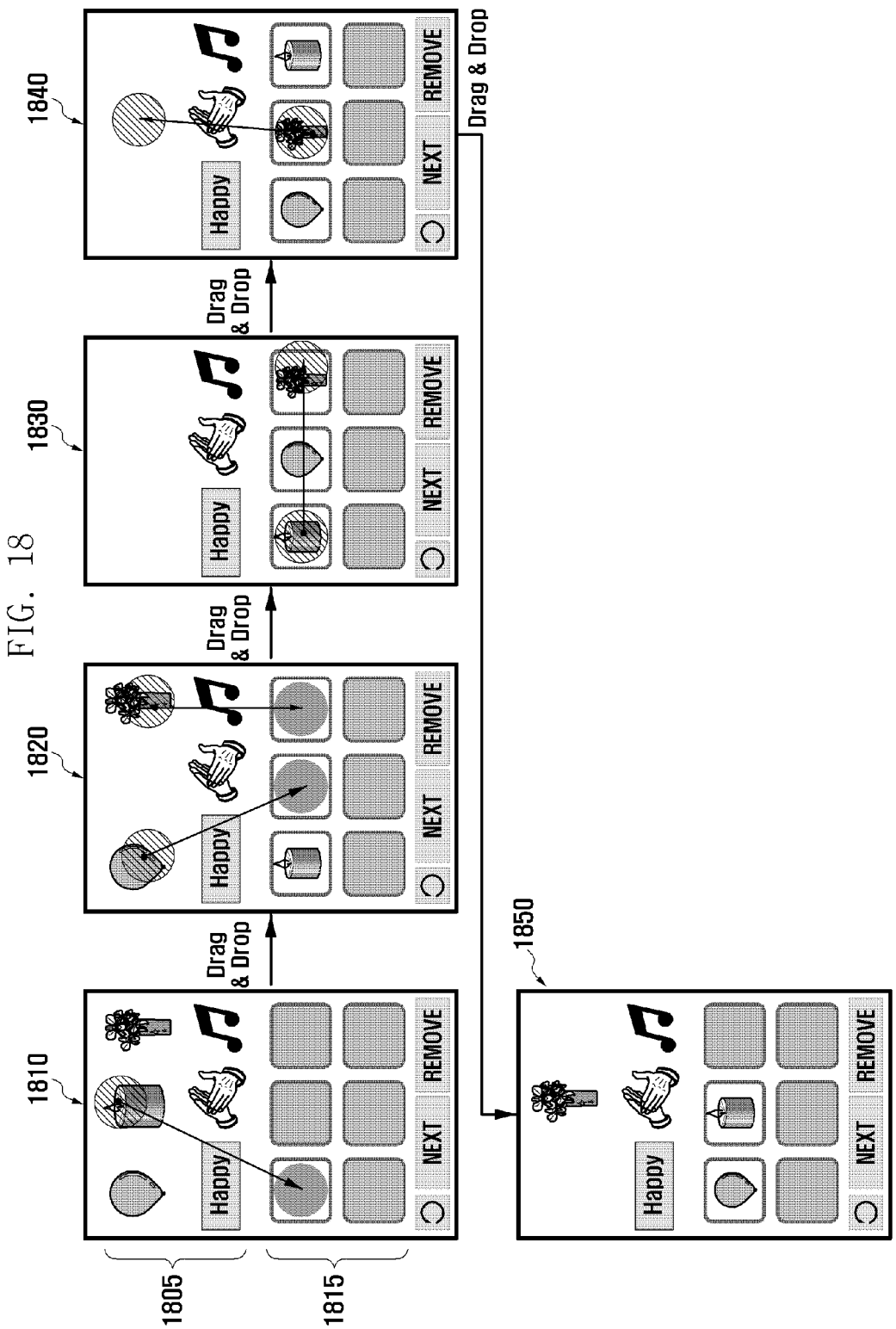
FIG. 18 is a diagram illustrating exemplary screen images for explaining steps of the group box item configuration/editing process of FIG. 17.

FIG. 18 is a diagram illustrating exemplary screen images for explaining steps of the group box item configuration/editing process of FIG. 17. FIG. 18 shows screen images representing the steps of the process corresponding to the group box item configuration/editing screen 1750 of FIG. 17.

Referring to FIGS. 17 and 18, if a group box item configuration/editing request is input while one of the initial entertainment mode screens 1710 and 1730 is displayed, the electronic device controls the operation such that a group box configuration/editing screen 1810 is displayed in response to the request.

In FIG. 18, reference number 1805 denotes a set of event elements that can be selected for forming a group box item, particularly single event elements, and reference number 1815 denotes slots of the group box for arranging (ordering) the event elements selected by the user. That is, a group box item is created with the event elements that are selected and then placed in the slots of the group box.

Although the group box is depicted with 6 slots in FIG. 18, the present invention is not limited thereto. For example, the number of slots of a group box can be changed depending on the manufacturer's design. The user can determine the processing order of the event items constituting the group box in sequential order of the slots in which the event items are placed.

In case that the number of slots of the group box is greater than six, the group box configuration/editing screen 1810 can be configured to display all of the slots simultaneously or in units of six slots by scrolling the screen. In case that the group box configuration/editing screen 1810 is configured to display the slots simultaneously, the slots can be displayed in reduced size. In case that the group box configuration/editing screen 1810 is configured to display the slots in units of 6 slots, the slots can be navigated in response to a flick action made on the screen in horizontal direction or vertical direction.

As shown in the screen images 1810 to 1830, the user can select the individual event elements one by one and place the selected event elements at intended slots. In the screen image 1810 to 1830, the candle item is placed in the first slot, the balloon item in the second slot, the firework item in the third slot. In this case, the event items are processed in order of candle item, balloon item, and firework item. That is, the event items contained in a group box are processed in descending order of the index numbers (n) of the slots containing the event items (i.e., a priority order).

As shown in the screen images 1810 to 1830, when an event element placed in the event element region is moved to a slot, the moved event element disappears from the event element region. This can prevent the user from including the same event element in the group box repeatedly. In another aspect of the invention, the event element may be retained in the event element region and, thus, may be included in the group element more than once. This is advantageous as it allows the user to change messages during the playback of the electric sign event, for example.

As shown in the screen images 1830 and 1840, the user can change the order of the event elements placed in specific slots. In the screen images 1830 and 1840, the candle item is moved from the first slot to the third slot. In this case, other event elements (balloon item and firework item) are shifted in opposite direction automatically. The change of the processing order can be done by position change. In this case, if the candle item is moved to the slot which the firework item had occupied, the firework item is moved to the first slot without movement of the balloon item, which was placed in the second slot.

As shown in the screen images 1830 and 1850, the user can remove a specific event element from the slot it has occupied. In the screen images 1830 and 1850, if the firework item is removed from the group box, the firework item disappears from the second slot and then is placed in the event item region (as indicated by the upward arrow).

In the second slot from which the firework is removed, and the candle item is shifted from the third slot to the second place (1850). The slot from which an event item is removed can be maintained in an empty state according to the configuration.

The empty slots can be occupied by other event elements selected by the user without redundancy through steps corresponding to the screen images 1810 to 1850. All of the six slots are not needed to be filled with event items, and can be configured in various combinations according to the user's intention.

The user commands for moving an event element to a slot (slot allocation operation), moving an event element from one to another slot (processing order change operation), and removing an event element from the group box (event element removal operation) can be performed in the form of a drag and drop action as shown in FIG. 18. These user commands also can be input by manipulation of function keys and navigation keys.

After the group box is configured with a predetermined number of event elements through steps corresponding to screen images 1810 to 1850, the group box configuration can be completed by menu manipulation. As a result, the group box configuration complete screen 1770 of FIG. 17 is displayed.

In case that a group is formed with at least one event element by means of the group box, the group can be produced as a group event element such as the exemplary birthday item and added as a new group event item. That is, the group event element configured as described above can be controlled as a group box item or added as a new item, if needed.

Figure 19:
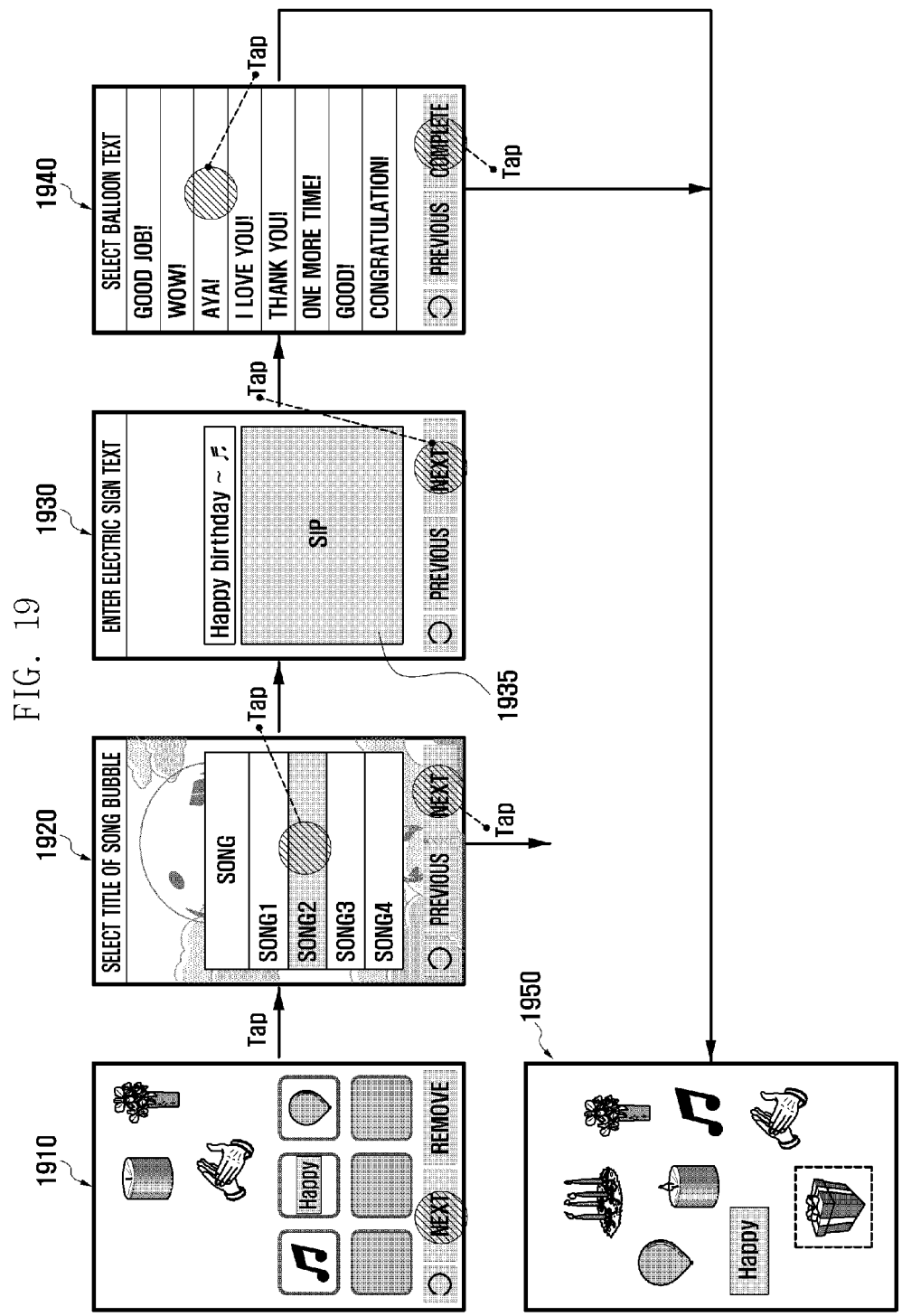
FIG. 19 is a diagram illustrating exemplary screen images for explaining steps of an effect configuration/editing procedure of the user interaction method according to an exemplary embodiment of the present invention.

FIG. 19 is a diagram illustrating exemplary screen images for explaining steps of an effect configuration/editing procedure of the user interaction method according to an exemplary embodiment of the present invention.

FIG. 19 shows operations of configuring/editing the effects corresponding to specific event element that are performed in the middle of the group box item configuration/editing procedure of FIG. 18. The effect configuration/editing operations to an event element depicted in FIG. 19 can be applied in the normal entertainment mode.

As shown in FIG. 19, the bubble item, electric sign item, and balloon item are included in a group, and the user can configure detailed settings for the effects required when the individual items included in the group, i.e. the items occupying the slots of the group, are executed. In FIG. 19, the bubble item, electric sign item, and balloon item are configured with detailed settings in sequential order. It is possible to select one of the items and configure the selected item with detailed settings.

Referring to FIG. 19, the user can request a menu for configuring the detailed settings of the bubble item included in the group, i.e. occupying one of the slots of the group box. As shown in the screen image 1910, the configuration menu can be requested by a user action made on the item assigned for the function entering detailed settings of an item or by a menu option selection.

The electronic device provides an initial screen for detailed settings of the item in response to the user request as shown in the screen image 1920. In the screen image 1910, the bubble item, electric sign item, and balloon item are arranged in sequential order such that the detailed settings screen of the bubble item are displayed first as shown in the screen image 1920.

While the detailed settings screen 1920 for the bubble item is displayed, the user can configure the effect to be rendered when the bubble item is executed (e.g. select a song). In the screen image 1920, an item "song 2" is selected and, if the user selects the 'next' or 'complete' menu option without additional configuration, the first item "song 1" can be selected as a default value.

As shown in the screen image 1920, if a user action (e.g. tap action) is made on the "song 2" item as an effect for the bubble item or an item designated for the function to go to the next step, the electronic device displays the detailed setting screen for the next item, i.e. the electric sign item as shown in the screen image 1930.

While the detailed setting screen 1930 of the electric sign item is displayed, the user can configure the effect to be rendered (e.g., input a text) when the electric sign item is executed. In the screen image 1930, the text "Happy birthday" is input by the user. The text can be input in various manners depending on the type of the electronic device. The detailed settings screen 1930 is provided with an input means having a specific key arrangement (e.g. virtual QWERTY keypad) such that the user can input text using the input means.

If the text "Happy birthday" is input as an effect of the electric sign item as shown in the screen image 1930 and then a user action is made on an item designated for the function to jump to the next step, the electronic device displays the detailed settings screen for the next item, i.e. the balloon item, as shown in the screen image 1940.

While the detailed settings screen 1940 of the balloon item is displayed, the user can configure an effect (e.g. select a balloon message) to be rendered when the balloon item is executed. In the screen image 1940, a text item "AYA!" is selected as an example. If the user select 'next' or 'complete' item without additional configuration, the first item, i.e. text "GOOD JOB!" can be selected automatically as a default value.

Once the detailed settings of the bubble item, electric sign item, and balloon item have been configured through steps 1920 to 1940 and if there is no further items, an item for completing the detailed settings configuration can be provided. While configuring the detailed settings of each item, the process can go to a previous step by selecting the "PREVIOUS" item for going back to the previous step as shown in the screen images 1920 to 1940. If a user action (e.g. tap action) is made on the item for completion of the detailed settings, the electronic device displays the initial screen of the entertainment mode as shown in the screen image 1950.

FIG. 19 is depicted with some part of the operations related to configuration of the detailed settings of individual items for simplifying the explanation. The detailed settings configuration process may include steps of configuring the user interactions for executing the corresponding effects and/or the types of the effects to be rendered in response to the user interactions. That is, the user can configure the user interactions and effects per user interaction.

For example, while the screen image 1940 is displayed, the user can configure one of a blow interaction and a touch interaction as a user interaction for executing the balloon message effect of "AVA!". Also, the user can configure the audio and haptic effects to be rendered when the balloon message is displayed in response to the user interaction.

The above description has been directed to the operations for grouping at least one event element using a group box item and configuring/editing the individual event elements included in the group. A description is made of operations for rendering the effects corresponding to at least one event element within a group box item or a group event element in response to the user interaction. The description is made with the exemplary case of the birthday item as an item corresponding to the group box item or the group event element. The birthday item is composed of one or more event elements related to a birthday event.

Figure 20:
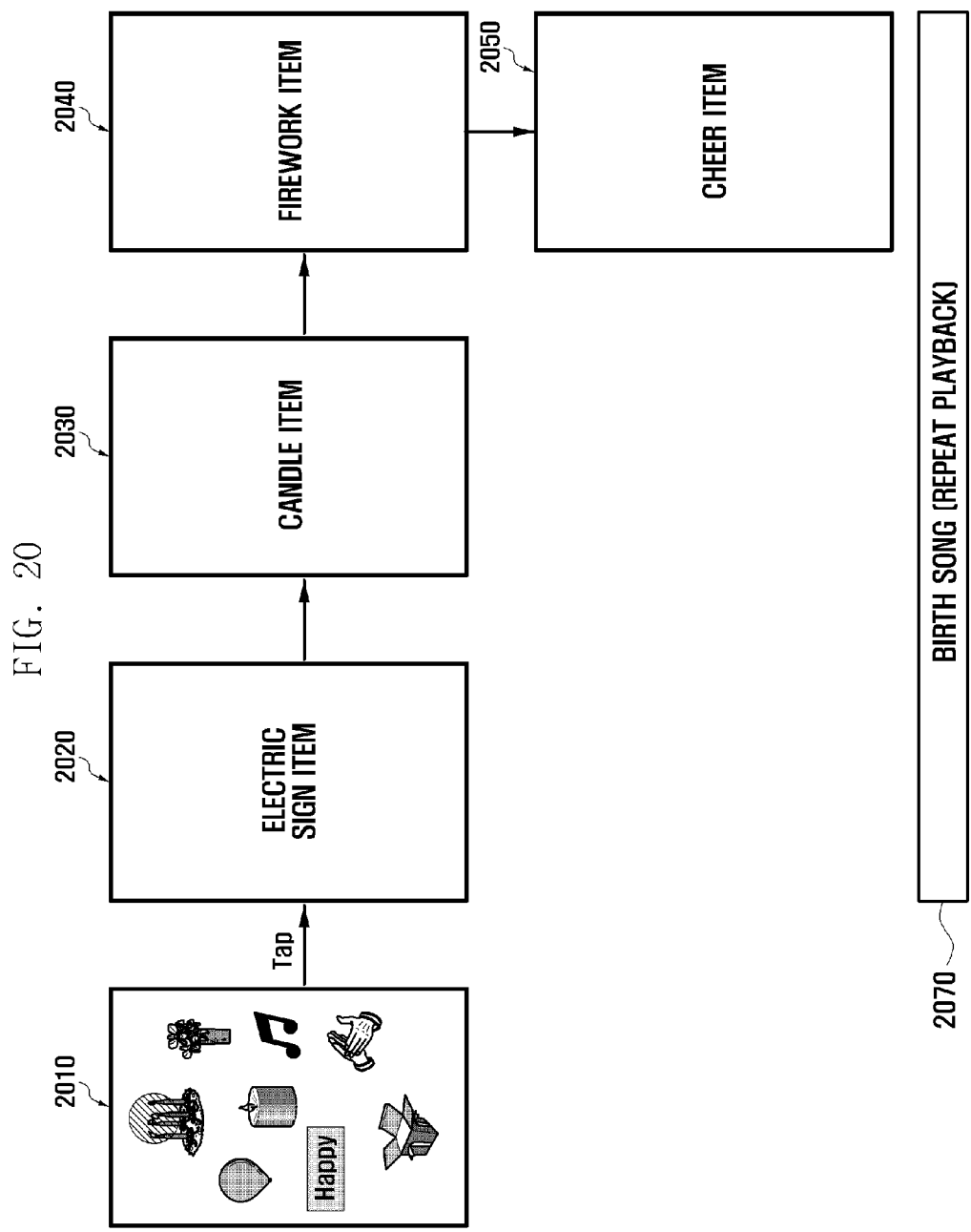
FIG. 20 is a diagram illustrating exemplary screen images for explaining steps of providing effects per event in a user interaction method according to an exemplary embodiment of the present invention.

FIG. 20 is a diagram illustrating exemplary screen images for explaining steps of providing effects per event in a user interaction method according to an exemplary embodiment of the present invention.

FIG. 20 shows an exemplary procedure for executing a plurality of single event elements constituting the birthday item in priority order in response to a user action made on the birthday item.

Referring to FIG. 20, the user can input the execution command by making an action on the birthday item in the initial function execution screen denoted by reference number 2010. If the user's action is detected on the birthday item, the electronic device determines whether the birthday item represents a single event element or a group event element. If it is determined that the birthday item represents a group event element, the electronic device checks the single event elements constituting the group event element and execution priorities of the single event elements. FIG. 20 is depicted under the assumption that the birthday item is composed of a plurality of single event elements arranged in execution order of electric sign→candle item→cheer item.

In case of a specific item such as the birthday item composed of a plurality of event elements for an event of a specific purpose, an accompanying event object associated with the purpose of the corresponding item can be provided as denoted by reference number 2070. The accompanying event object of the birthday item can be background music (BGM) item. In this case, when the birthday item is executed in response to the user action made on the birthday item, an object corresponding to the single item having the highest priority among the items constituting the birth item is executed in accompaniment with the playback of background music such as a happy birthday song. That is, the accompanying event object can include background image, emoticons, and flashcons as well as the background music. The accompanying event object can be configured so as to be played repeatedly until the effects corresponding to the entire single event elements are rendered completely, and multiple accompanying event objects can be provided. For example, a plurality of birthday songs can be played in series. In one aspect of the invention, item 2070 can be provided by playback of a separate sound file associated with one or more of the event objects included in the birthday object. For example, item 2070 may be associated with a highest priority object, such that the birth song is played from the presentation of the first (highest priority object) or may be associated with a lower priority object so that higher priority objects may be executed without playing of the birth song, but then during the execution of the birthday object, the birth song is played.

The electronic device can provide objects corresponding to the electric sign item having the highest priority in response to the user input as shown in the screen image denoted by reference number 2020. Here, the object representing the electric sign item can be provided in the form of a text such as "Happy birthday" sliding in a direction repeatedly.

The user can input a command for selecting one of a plurality of predefined user interactions onto the object representing the electric sign item. The user interactions can be classified into voice interaction, motion interaction, touch interaction, and combinations thereof. The user interactions can include blow interaction, tab interaction, double tap interaction, hold interaction, flick interaction, direction change interaction, drag and drop interaction, and touch and move interaction.

The user can make one of the user interactions onto the text of the electric sign item. The electronic device identifies the user interaction made on the corresponding item and outputs an effect corresponding to the interaction. The electronic device can be controlled such that the text of the electric sign slides in a direction according to a touch interaction made by the user or a specific screen is displayed according to the blow interaction made by the user. The operations of providing the effect objects per user interaction in association with the electric sign item are described with reference to drawings later.

After the effect of the electric sign item has been rendered completely on the execution screen 2020, the electronic device performs execution of the object representing the candle item, which has the next highest priority, as shown in the screen image denoted by reference number 2030. As aforementioned, the object representing the candle item can be executed in accompaniment with the background playback of the accompanying event object.

While the object representing the candle item is executed as denoted by reference number 2030, the user can input one of the predefined user interactions onto the object. For example, the user can make a flick interaction at the wick of the candle item or a blow interaction onto the lit candle item (as previously discussed), and the electronic device can control the operation to render the effect in which the wick of the candle item is lit in response to the flick interaction or a camera module takes a picture as the candle is unlit in response to the blow interaction. The operations of providing the effect objects per user interaction in association with the candle item are described later with reference to the drawings.

After the effect of the candle item has been rendered completely on the execution screen 2030, the electronic device performs execution of the object representing the firework item having the next highest priority as shown in the screen image denoted by reference number 2040. As aforementioned, the object representing the firework item can be executed in accompaniment with the background playback of the accompanying event object.

While the object representing the firework item is executed as denoted by reference number 2040, the user can input one of the predefined user interactions associated with the firework item onto the object. For example, the user can make a tap interaction or a flick interaction onto the firework item, and the electronic device can control; the operation to render the effect in which the firework is exploding in response to the user interaction. The operations of providing the effect objects per user interaction in association with the firework item are described later with reference to the drawings.

After the effect of the firework item has been rendered completely on the execution screen 2040, the electronic device performs execution of the object representing the cheer item having the next highest priority as shown in the screen image denoted by reference number 2050. As aforementioned, the object representing the cheer item can be executed in accompaniment with the background playback of the accompanying event object.

While the object representing the cheer item is executed as denoted by the reference number 2050, the user can input one of a plurality of predefined user interactions associated with the object onto the object. For example, the user can make a tap interaction or a touch and move interaction, and the electronic device can control the operation to render the effect in which a predetermined sound (e.g. a cheering sound) in response to the user interaction. The operations of providing the effect objects per user interaction in association with the cheer item are described later with reference to the drawings.

After the effect of the cheer item has been rendered completely on the execution screen 2050, the electronic device controls the operation such that the initial screen is displayed.

That is, after all of the items have been executed completely, the electronic device displays the initial screen 2010.

The timings for switching between the executions of the individual items can be defined per item. For example, switching from the candle item execution to the firework item execution is done at the time when the camera module takes a picture after the candle is unlit in response to the blow interaction and completes the operations related to the candle item. Switching from an item to the next item can be performed where no user interaction is detected in a predetermined time (e.g. x seconds) after the completion of the effect corresponding to a specific interaction.

Figure 21:
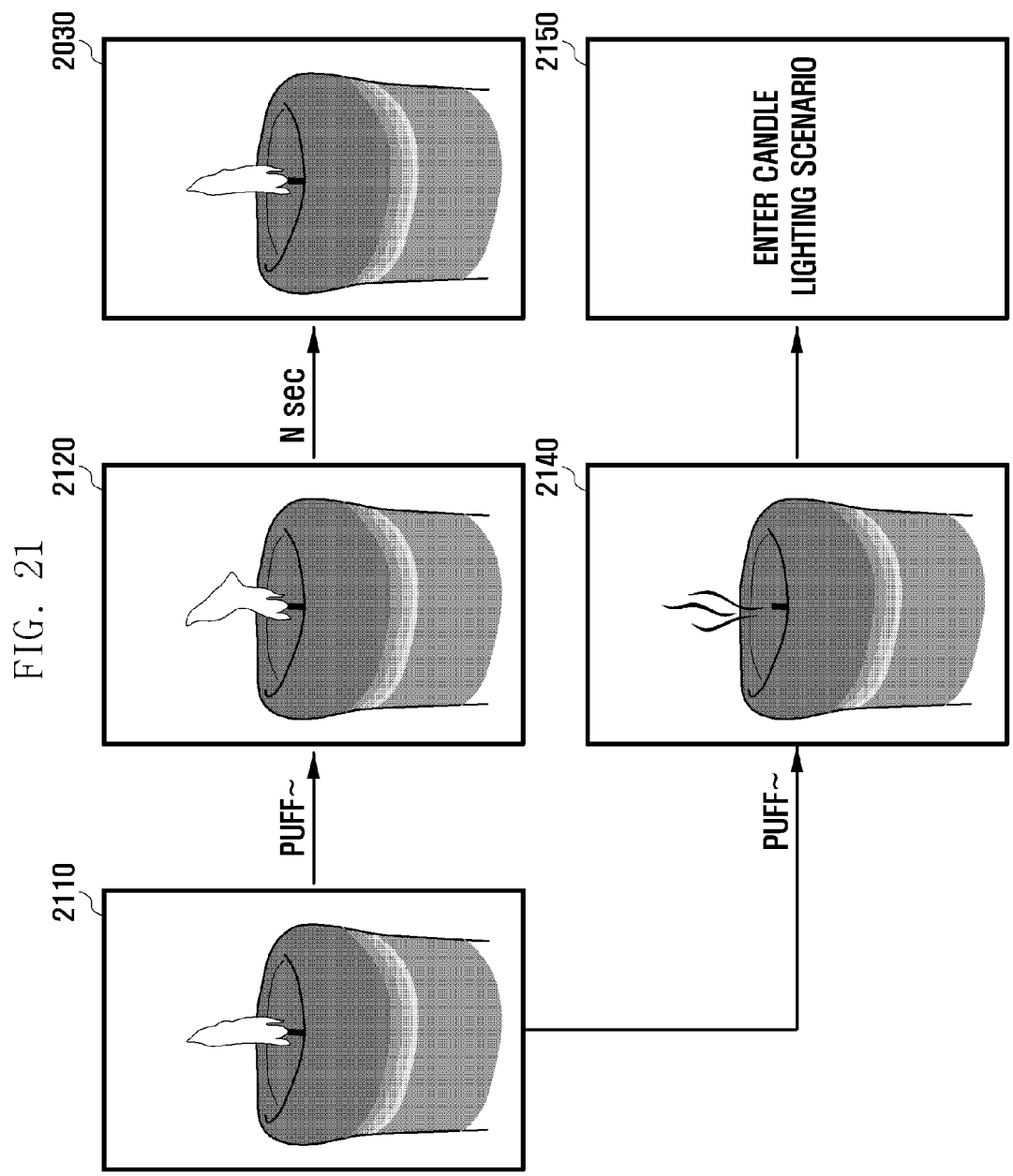
FIG. 21 is a diagram illustrating exemplary screen images for explaining steps of outputting effects of a candle item in a user interaction method according to an exemplary embodiment of the present invention.

FIG. 21 is a diagram illustrating exemplary screen images for explaining steps of outputting effects of the candle item in a user interaction method according to an exemplary embodiment of the present invention.

Referring to FIG. 21, the electronic device can provide an object representing the candle item as shown in the screen image 2110 in response to a user input. Although the object representing the candle wherein the wick is displayed first in a lighted mode, as shown in the screen image 2110, another object representing a candle having an unlit wick can be displayed first before the screen image 2110.

While the object of the candle item is displayed as shown in the screen image 2110, the user can make one of the predefined user interactions associated with the object onto the object. In FIG. 21, it is assumed that the blow interaction is made by the user. The user can make the blow interaction by inputting a puff sound to the microphone (MIC). The electronic device can detect the blow interaction and outputs an effect in which the flame of the candle is shaking in the window in response to the user interaction as shown in the screen image 2120. In order to improve the reality of the flame shaking in the window, the object represented by the screen image 2120 can be provided in the form of a motion picture. That is, the electronic device can play a motion picture or a flash file in which the flame of a candle is shaking while the blow interaction is made onto the microphone. The electronic device can control the operation to maintain the playback of the motion picture or the flash file while the blow interaction continues, i.e. from the start to the end of the blow interaction and provides an object expressing the candle of which the flame returns to a calm state when the blow interaction stops.

If a blow interaction is detected while the screen image 2110 is displayed, the electronic device can analyzes the intensity of the blow interaction. The intensity of the blow interaction can be measured by comparing the user interaction with a predetermined reference value. For example, if the intensity of the blow interaction is less than the reference value, i.e. if a weak blow interaction is detected, the electronic device can control the operation to output an effect object represented by the screen image 2120.

Otherwise, if the intensity of the blow interaction is equal to or greater than the reference value, i.e. if a storing blow interaction is detected, the electronic device can control to output an effect object represented by the screen image 2140 in which the flame of the candle is blown out and then smoke curls up.

In order to improve the reality of the flickering flame and curling smoke, the effect object represented by the screen image 2140 can be provided in the form of an animated motion picture. That is, when the storing blow interaction is detected, the electronic device outputs a dynamic effect with the motion picture or flash file in which the candle is blown out and then smoke curls up. Depending on the intensity of the blow interaction, the effect object can be presented with different motion pictures.

After outputting the effect object, the electronic device can complete the operations related to the candle item or control the operation to enter a candle lighting scenario in response to the user input. In the candle lighting scenario, an effect object expressing the candle with a wick being lit can be output.

Figure 22:
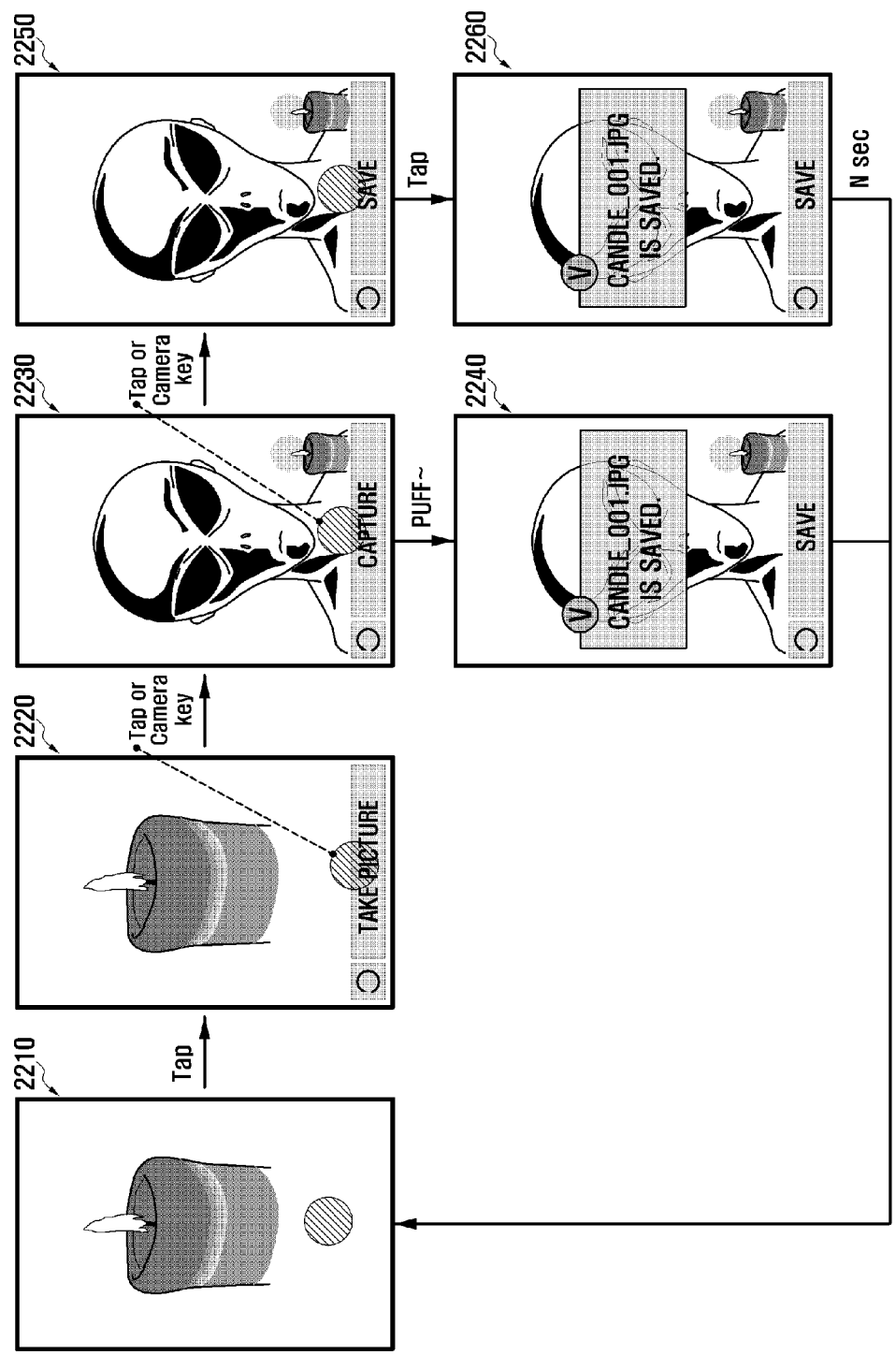
FIG. 22 is a diagram illustrating exemplary screen images for explaining steps of outputting effects of a candle item in a user interaction method according to another exemplary embodiment of the present invention.

FIG. 22 is a diagram illustrating exemplary screen images for explaining steps of outputting effects of candle item in a user interaction method according to another exemplary embodiment of the present invention.

Particularly in FIG. 22, the operations related to the interactions of the candle item and camera function.

Referring to FIG. 22, the electronic device can provide an object representing the candle item as shown in the screen image 2210 in response to a user input. While the object of the candle item is output as shown in the screen image 2210, the user can make an interaction onto any region of the object. In FIG. 22, it is assumed that a tap interaction for executing a supplementary function associated with the candle item is made at a blank region of the object. It is assumed that the supplementary function associated with the candle item is a camera function.

The electronic device provides option buttons responsive to the tap interaction of the user as shown in the screen image 2220. The option buttons include a first button for returning to the previous menu and a second button for execution the camera function associated with the candle item. The user can make a user interaction (e.g. tap interaction) on the second button while the screen image 2220 is displayed. Of course, the camera function can be executed by selecting a shortcut key designated for executing the camera function.

If a user interaction is detected on the second button in the screen image 2220, the electronic device executes the camera function and displays a subject input through a camera lens while monitoring user interaction for taking a picture. At this time, the electronic device provides a visual effect in which the object expressing the candle item (particularly, candle image) is zoomed out at a corner (e.g. bottom light corner) of the screen on the subject image. The position where the candle image moves can be predetermined regardless of the position of the subject on the screen or determined after scanning the subject image such that the subject is not overlapped with the candle image. Of course, the electronic device can be configured such that the execution of the camera function and the movement of the candle image can be performed in response to the drag interaction. In this case, the electronic device can execute the camera function to capture a subject image while reducing the candle image in size and moving the reduced candle image to the corner of the screen as shown in the screen image 2230.

While the object of the candle item and the subject image are displayed as shown in the screen image 2230, the user can make one of the predefined interactions. For example, the user can make the blow interaction onto the microphone or the tap interaction onto the capture button at the bottom of the screen (or select a camera shortcut key).

If the blow interaction is detected while the screen image 2230 is displayed, the electronic device interprets the blow interaction as image capture command such that it captures the subject's image and stores the captured image along with the overlapped candle item image as a combined image. At this time, the electronic device outputs a visual effect in which the flame of the candle is shaking in response to the blow interaction and then captures the subject's image. After capturing the subject image, the electronic device returns the process to the previous step corresponding to the screen image 2210.

If the tap interaction is made on an option button provided in the screen image 2230 (or if the camera shortcut key is selected), the electronic device detects the tap interaction. Here, the option button is designated for executing image capture command. The option button, i.e. capture function button, provided in the screen image 2220 can be replaced by another option button designated for capturing (or taking) the subjects' image as shown in the screen image 2230. The user can make a tap interaction on the third option button in order to take the subject's image.

The electronic device interprets the tap interaction made on the third option button (or camera shortcut key selection) to an image capture command and takes and saves the subject's image along with the candle item image. Once the image capture has been completed, the third option button is replaced by a fourth option button as shown in the screen image 2250. The fourth option button can be a button designated for inputting a save command. The user can save the captured image or cancel saving the capture image. If the user makes a tap interaction onto the fourth option button, the electronic device saves the image captured by the camera as shown in the screen image 2260. After saving the captured image, the electronic device can return the process to the previous step corresponding to the screen image 2210.

As described above with reference to FIG. 22, the electronic device according to an exemplary embodiment of the present invention can apply the illumination effect of the candle item to the subject's image taken by the camera or take the subject's image in the state where the illumination effect of the candle item is applied.

FIGS. 23 to 28 are diagrams for explaining operations of outputting effects associated with the firework item in the electronic device according to an exemplary embodiment of the present invention.

As shown in FIGS. 23 to 28, the electronic device can provide an object representing the firework item in response to a user input. The user can make one of a plurality of predefined user interactions onto the object provided by the electronic device. The effects outputted in response to the user interactions made onto the firework item are described with reference to the exemplary drawings.

Figure 23:
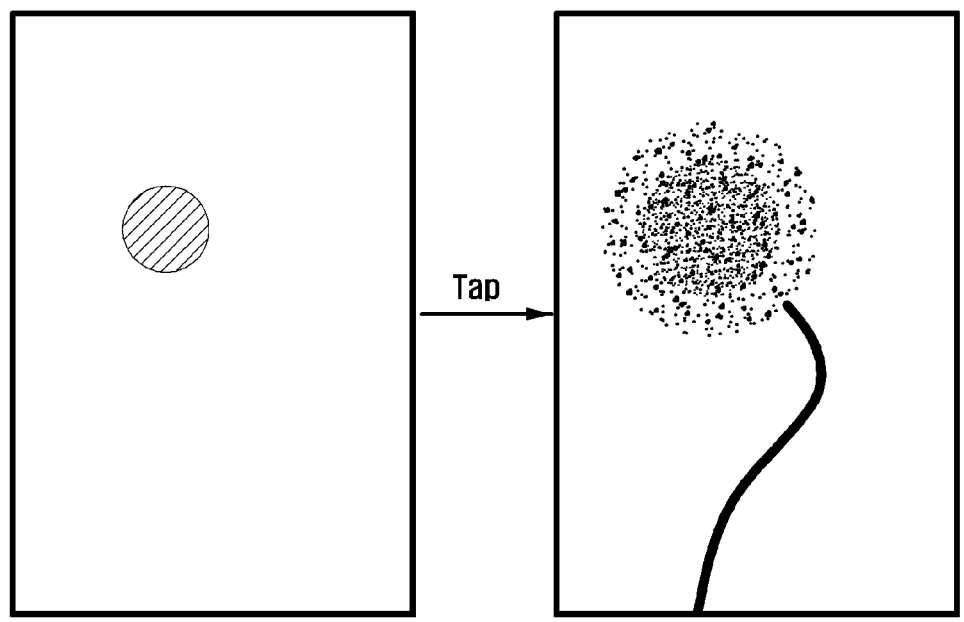
FIGS. 23 to 28 are diagrams for explaining operations of outputting effects associated with a firework item in the electronic device according to an exemplary embodiment of the present invention.

FIG. 23 shows an exemplary operation in response to the tap interaction of the user on the firework object. Note that the firework object refers to the firework effect. If the tap interaction is detected at a position on the firework object screen, the electronic device outputs an effect in which the firework explodes. At this time, the electronic device selects one of a variety of fireworks randomly in response to the tap interaction and outputs an effect configured with the selected firework. The firework explosion effect can be output in the form of an animated picture. In order to give reality to the presentation, the firework explosion effect is designed such that a small firework rises from the bottom of the screen and explodes at the position where the tap interaction is detected.

Figure 24:
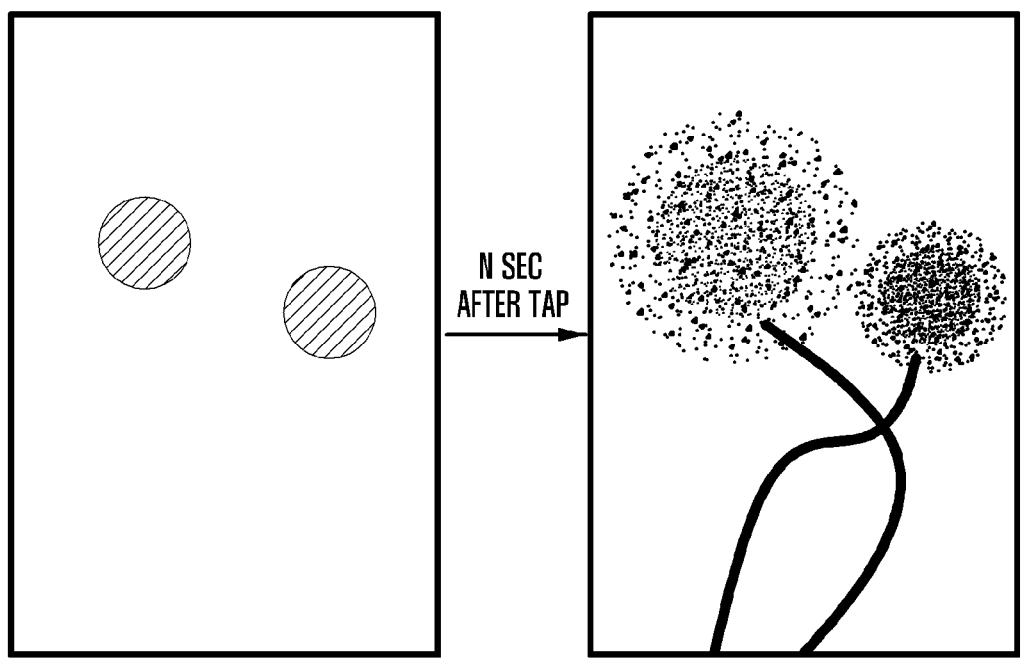

FIG. 24 shows an exemplary operation in response to a second tap interaction (second interaction) made within a predetermined time (e.g. N seconds) after the previous tap interaction (second interaction) (i.e., FIG. 23). If the second interaction is detected after rendering the effect in response to the first interaction, the electronic device determines whether the second interaction is made within the predetermined time after the first interaction. If the second interaction is detected within the predetermined time after the first interaction, the electronic device outputs the explosion effect of the same firework as selected in response to the first interaction at the position where the second interaction is detected. The explosion effects in response to the first and second interactions can be rendered differently or identically in size to give a perspective effect.

Figure 25:
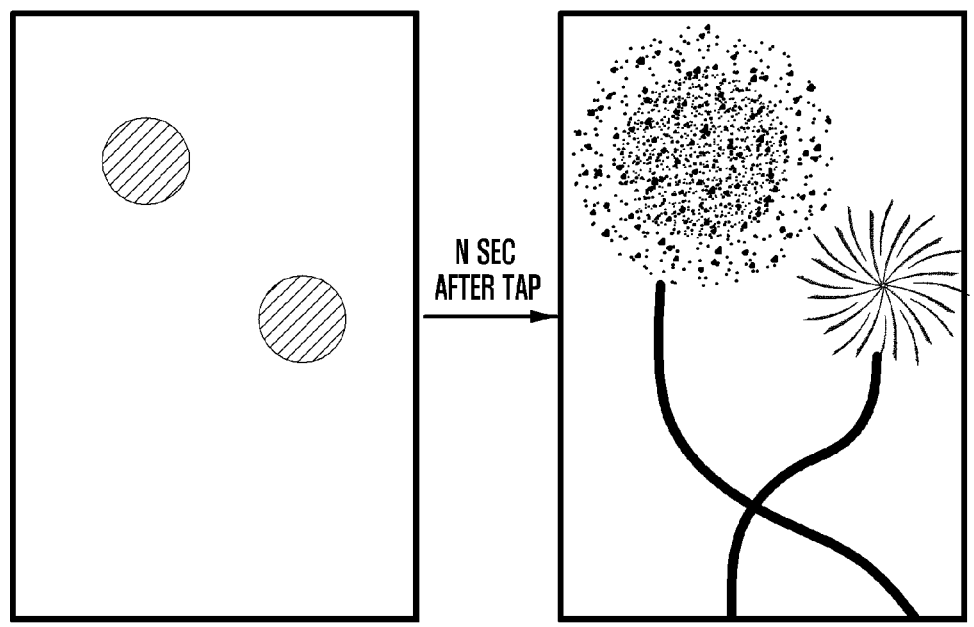

FIG. 25 shows an exemplary operation in response to a second tap interaction (second interaction) made at another position on the screen after a predetermined time (e.g. N seconds) has passed from the time when the previous tap interaction (first interaction) is detected. If the second interaction is detected after rendering the effect in response to the first interaction, the electronic device determines whether the second interaction is detected within the predetermined time after the first interaction.

If it is determined that the second interaction is detected after the predetermined time has passed from the time when the first interaction has been detected, the electronic device outputs the explosion effect of a firework which is different from the firework selected in response to the first interaction in type. The explosion effects in response to the first and second interactions can be rendered differently or identically in size to give a perspective effect.

As shown in FIGS. 23 to 25, the electronic device according to an exemplary embodiment of the present invention can be configured to output a series of effects in response to two user interactions made within a known time interval. The types of the fireworks can be selected depending on the timing of the tap interactions. For example, the electronic device can be configured such that, when the second interaction is detected in 2 seconds after the detection of the first interaction, the same fireworks are exploded. Otherwise, different fireworks are exploded.

Figure 26:
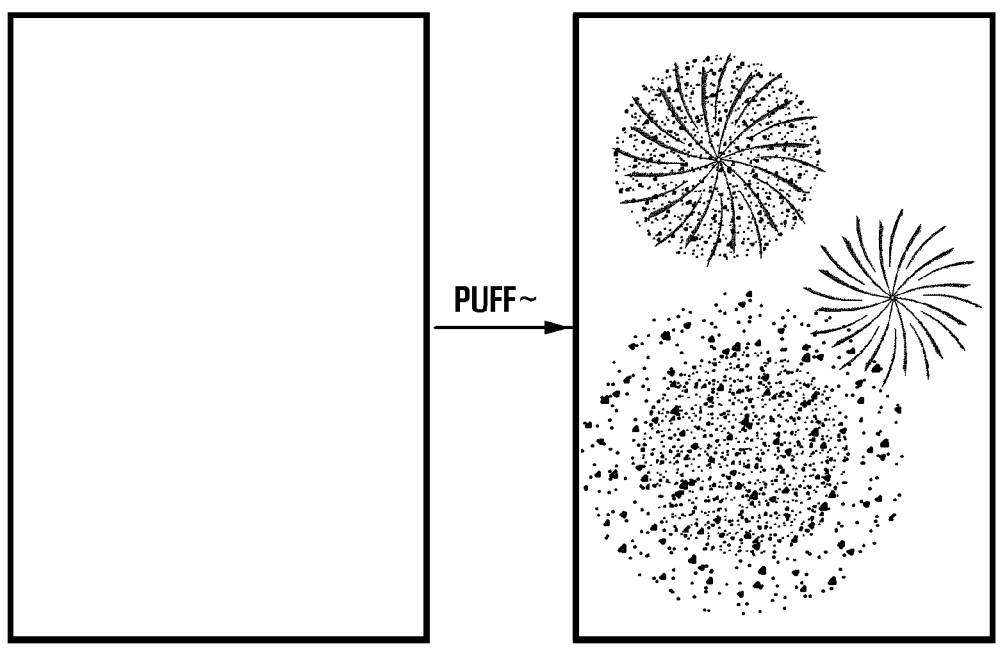

FIG. 26 shows an exemplary operation in response to the blow interaction of the user while the firework object is activated. If the blow interaction is detected, the electronic device can output a firework explosion effect in which various types of fireworks explode at random positions. At this time, the fireworks can explode simultaneously or in a sequential order. Of course, the number of the fireworks can be changed depending on the user's configuration. The firework explosion effect can be designed such that different fireworks appear in series while the blow interaction continues and all of the fireworks disappear when the blow interaction stops.

Figure 27:
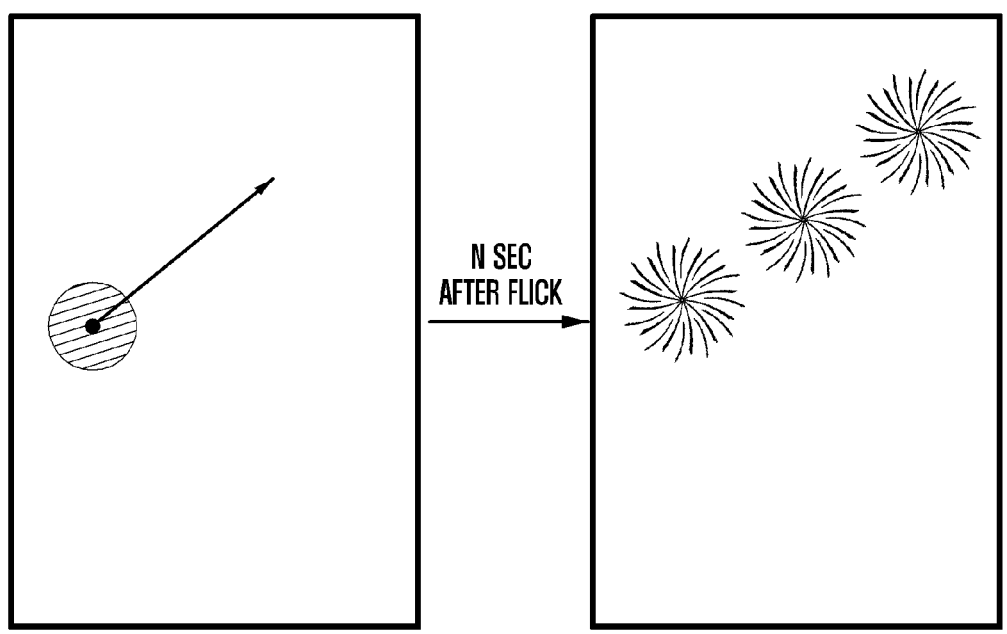

FIG. 27 shows an exemplary operation in response to the flick interaction of the user on the firework object. If the flick interaction is detected, the electronic device can output a firework explosion effect in which the same fireworks explode in series according to the variation of the contact position in the flick interaction (a gesture of touch and release after quick linear movement). As shown in FIG. 27, the electronic device can be configured such that, if a predetermined time elapses after the detection of the flick interaction, fireworks explode in series along the movement line from the contact to the release positions of the flick interaction. Also, the firework explosion effect can be output in such a way that the fireworks explode simultaneously at different positions. For example, three fireworks can explode in series or simultaneously. At this time, the firework explosion effect can be outputted with the same or different types of fireworks, and the number of fireworks can be determined depending on the length of the flick interaction. As would be appreciated, the different displays may be performed by an animated (video/audio) file associated with the specific action, as previously described.

Figure 28:
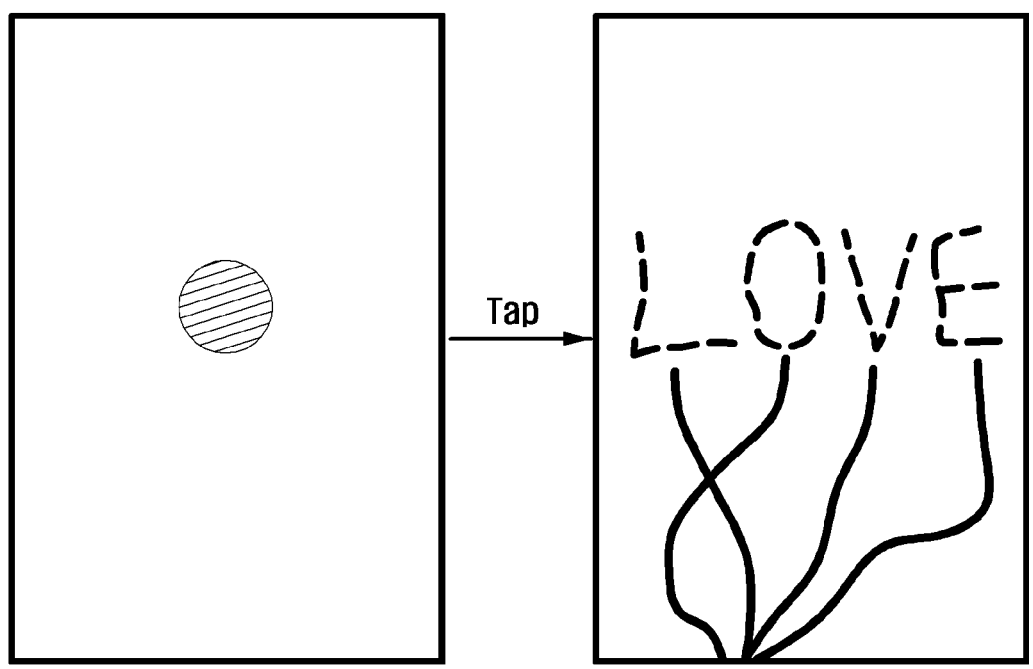

FIG. 28 shows another exemplary operation in response to the tap interaction of the user on the firework object. Here, a firework explosion effect is designed such that fireworks explode with a specific text (e.g. LOVE). If the tap interaction is detected at a position on the firework object screen, the electronic device outputs a firework explosion effect in which a plurality of fireworks explode at random positions with various messages. In FIG. 28, the firework explosion effect is output with a message presenting a text "LOVE". The text presented along with the explosion of the firework can be changed by the user, and the number of fireworks can be determined depending on the number of characters constituting the message. Also, the firework explosion effect can be designed such that various message presentation fireworks are randomly selected and explode in response to the tap interaction.

Figure 29:
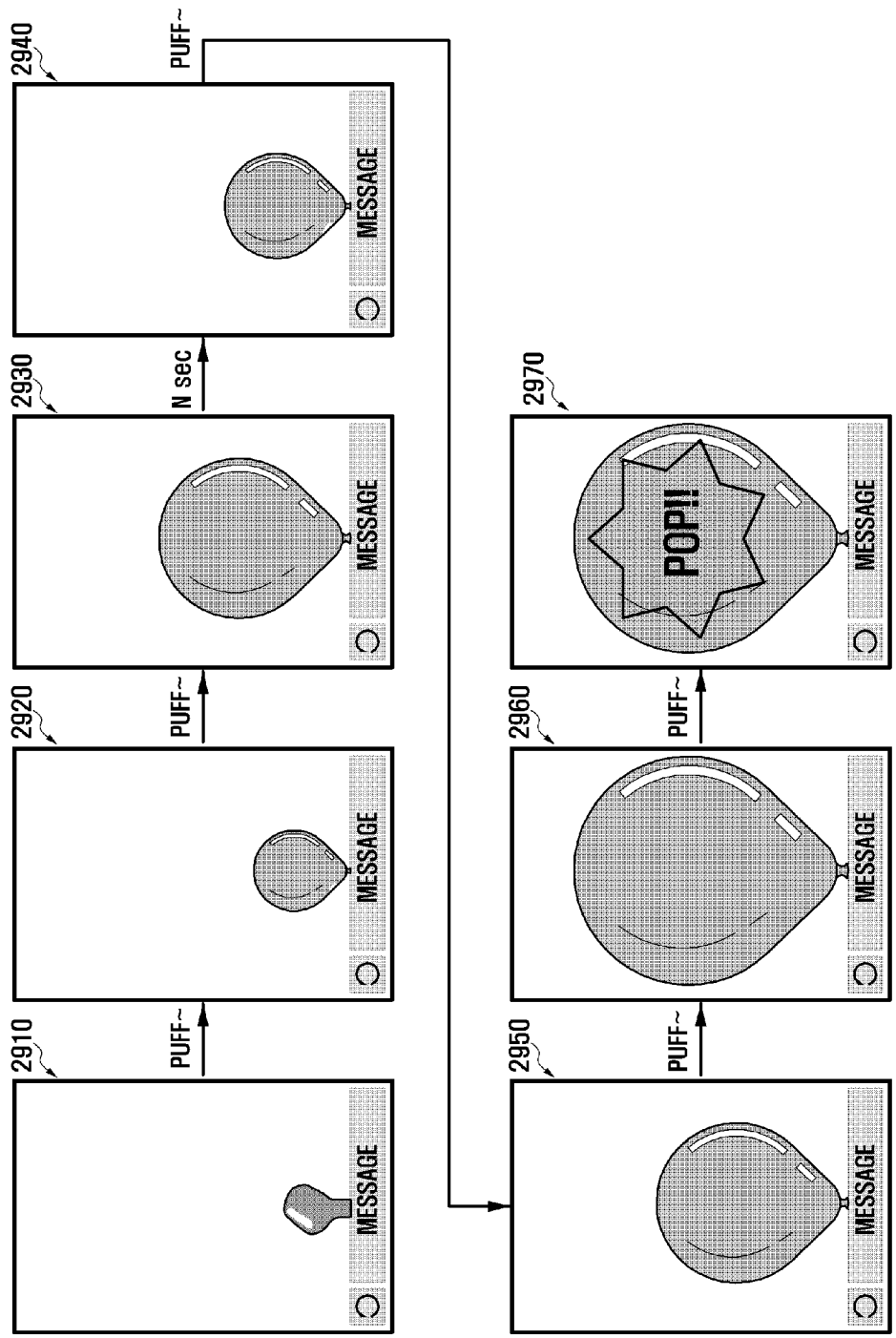
FIG. 29 is a diagram for explaining operations of outputting an effect associated with a balloon item in the electronic device according to an exemplary embodiment of the present invention.

FIG. 29 is a diagram for explaining operations of outputting an effect associated with the balloon item in the electronic device according to an exemplary embodiment of the present invention. Particularly in FIG. 29, various effect objects are displayed in response to a blow interaction. The effect object output in FIG. 29 can be provided in the form of an animated motion picture or flash file in which the balloon is inflated in response to the intensity of the blow interaction (duration and impact).

Referring to FIG. 29, the electronic device can output the object corresponding to the balloon item in response to the user input as shown in the screen image 2910. While the object is provided, the user can input the blow interaction to the object as shown in the screen images 2910 to 2930. If the blow interaction is detected, the electronic device outputs an effect in which the balloon is inflated gradually as the blow interaction continues. The electronic device can measure the input duration of the blow interaction (e.g., continuation of puff) to output the effect in which the balloon is gradually inflated for the duration of the blow interaction. The electronic device can measure the intensity of the blow interaction and adjust the time taken for the flat balloon shown in the screen image 2910 to be inflated as shown in the screen image 2930 based on the intensity of the puff action.

The electronic device can output an effect in which the balloon is reduced in size as shown in the screen image 2940 if the blow interaction is paused while the effect object is provided in response to the blow interaction. That is, while no blow interaction is detected, an effect in which the inflated balloon, as shown in the screen image 2930, diminishes in size as if the air is expelled from the balloon.

As shown in the screen images 2950 and 2960, the user can keep continuing the blow interaction made across steps corresponding to the screen images 2910 to 2930 or make new blow interaction at the state depicted in the screen image 2940. When the balloon is inflated up to its maximum size as shown in the screen image 2960, the electronic device maintains the balloon at its maximum size even though the blow interaction continues. Whether the balloon has reached the maximum size can be determined depending on the input degree of the blow interaction. For example, when the blow interaction is maintained over a predetermined time duration, the electronic device determines that the balloon has been swollen up to its maximum size so as to maintain the size of the balloon at the end of the predetermined time duration.

The user can make the blow interaction again when the object is provided as shown in the screen image 2960. If the new blow interaction is detected after the balloon has reached its maximum size, the electronic device outputs an effect in which the balloon is inflated to the point of explosion as shown in the screen image 2970. At this time, the explosion effect can include visual elements to show an image in which the balloon explodes and an audio element to output a balloon exploding sound. The electronic device can output the balloon explosion effect with a predetermined text. For example, a text object presenting a text "POP!". The text of the text object can be input/edited by the user. Detailed description is made with reference to drawings later.

The electronic device can provide the initial screen as denoted by reference number 2910 after outputting the balloon explosion effect.

In FIG. 29, the new blow interaction is applied for the effect shown in the screen image 2970 after the balloon reaches its maximum size as shown in the screen image 2960. However, in case that the blow interaction is maintained even after the balloon items has reached its maximum size, the balloon explosion effect can be outputted as shown in the screen image 2970. That is, the blow interaction can be maintained. Accordingly, when the blow interaction continues over a predetermined time duration, the electronic device can output the balloon explosion effect at the time when the predetermined time duration expires.

Figure 30:
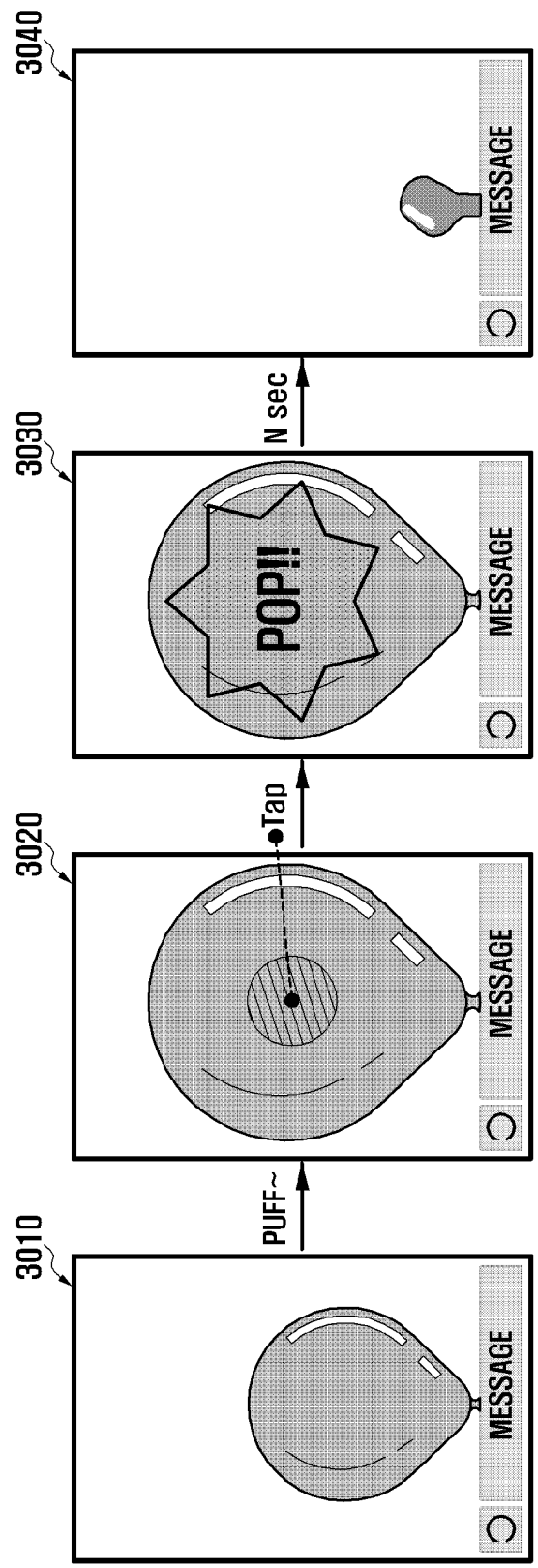
FIG. 30 is a diagram illustrating exemplary operations of rendering a feedback effect in response to a user interaction made on a balloon item according to an exemplary embodiment of the present invention.

FIG. 30 is a diagram illustrating exemplary operations of rendering a feedback effect in response to a user interaction made on the balloon item according to an exemplary embodiment of the present invention. Particularly in FIG. 30, a series of effect objects are output in response to the blow and tap interactions.

As shown in FIG. 30, a balloon is inflated in response to the blow interaction in a visual effect and the inflated balloon explodes in response to the tap interaction in another visual effect.

The effect rendered as shown in a series of the screen images 3010 and 3020 can correspond to the operations rendering the effect in response to the blow interaction as described with reference to FIG. 29. For example, steps represented by the screen images 3010 and 3020 can correspond to steps represented by the screen images 2910 to 2960 of FIG. 29, and, thus, the detailed description on the operations related to the screen images 3010 and 3020 are omitted.

While an effect object is output as shown in the screen image 3020, the user can make a tap interaction onto the effect object. If the tap interaction is made on the effect object, the electronic device detects the tap interaction and outputs an effect object in which the balloon explodes as shown in the screen image 3030. At this time, the effect object can be composed of a visual effect in which the balloon explodes and an audio effect in which a balloon pop sound is played. Also, the effect object can be rendered with a predetermined text message. For example, the effect object can be rendered with a text "pop" inside of the balloon. The text can be changed and presented in various forms according to the user's configuration. Exemplary screen presentations related to the balloon item are described later with reference to drawings.

After the balloon explosion effect has been rendered, the electronic device can control the procedure to return to the step corresponding to the initial screen image 3010. In case that various types of flatted balloon objects are provided in association with the balloon explosion effect, one of the flatted balloon objects can be rendered randomly in the screen image 3040.

Figure 31:
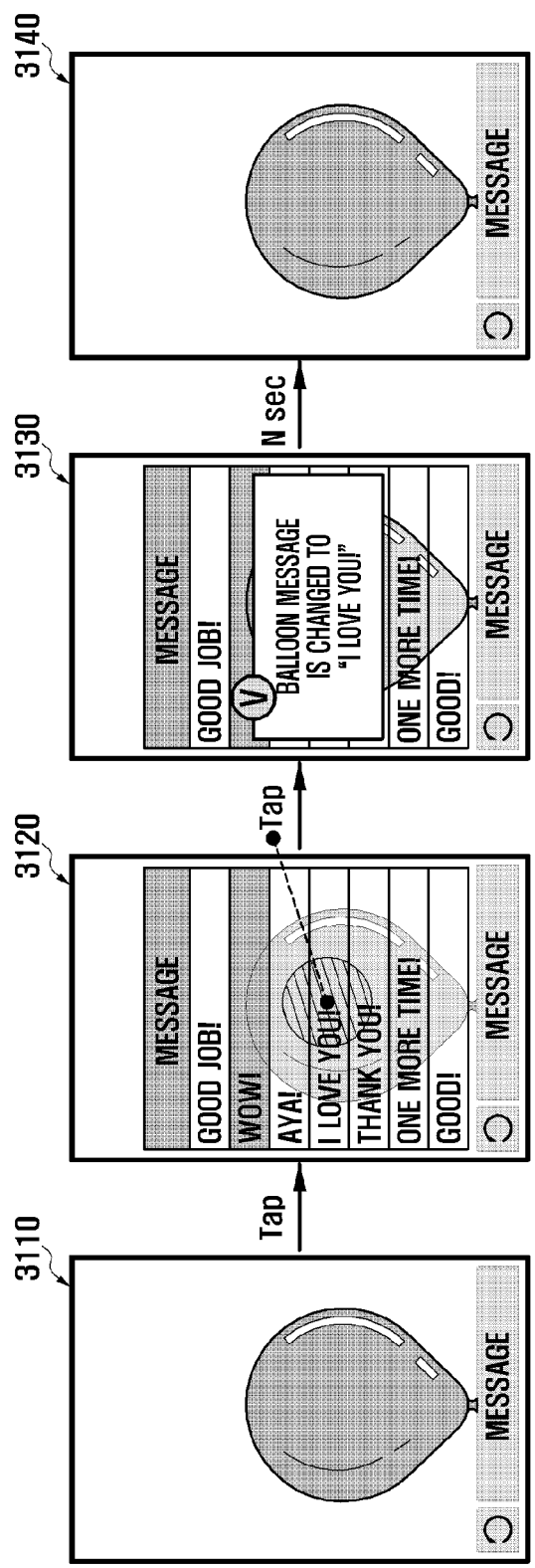
FIG. 31 is a diagram illustrating steps of editing text for use in a balloon item in the electronic device according to an exemplary embodiment of the present invention.

FIG. 31 is a diagram illustrating steps of editing the text for use in the balloon item in the electronic device according to an exemplary embodiment of the present invention.

Referring to FIG. 31, the user can request a menu for editing the text related to the balloon item by making a user input (e.g. tap interaction) on text edit option button provided in the screen as shown in the screen image 3110. If the tap interaction is detected on the text edit option button, the electronic device controls the operation such that a text edit screen is displayed as shown in the screen image 3120.

The user can configure a text message that is to be presented in the balloon explosion effect on the text edit screen (e.g. select one of the texts from a list or enter a new text) as shown in the screen image 3120. The screen image 3120 shows an exemplary case in which the user selects the text "I love you!" from a text list. At this time, the electronic device can change the background image according to the selected text. For example, the electronic device can be configured such that the sound "GOOD JOB" is output in response to the selection of the text "GOOD JOB!" and the sound "I love you" is output in response to the selection of the text "I LOVE YOU!." Although not depicted in FIG. 31, the electronic device can provide a preview function for showing the selected text or a prehearing function for outputting the sound corresponding to the selected text.

If the user makes a command input (e.g. tap interaction) on the text item "I love you!" as shown in the screen image 3120 or an item designated for the function to progress to the next step, the electronic device can output a notification message in the form of a popup window as shown in the screen image 3130. In the exemplary case of FIG. 31, the message notifying the user that the text for the balloon explosion effect is changed to "I LOVE YOU!" as shown in the screen image 3130 in response to the selection of the text item "I LOVE YOU!" from the list as shown in the screen image 3120. The electronic device can display the initial screen after outputting the popup window for a predetermined duration as shown in the screen image 3140.

Figure 32:
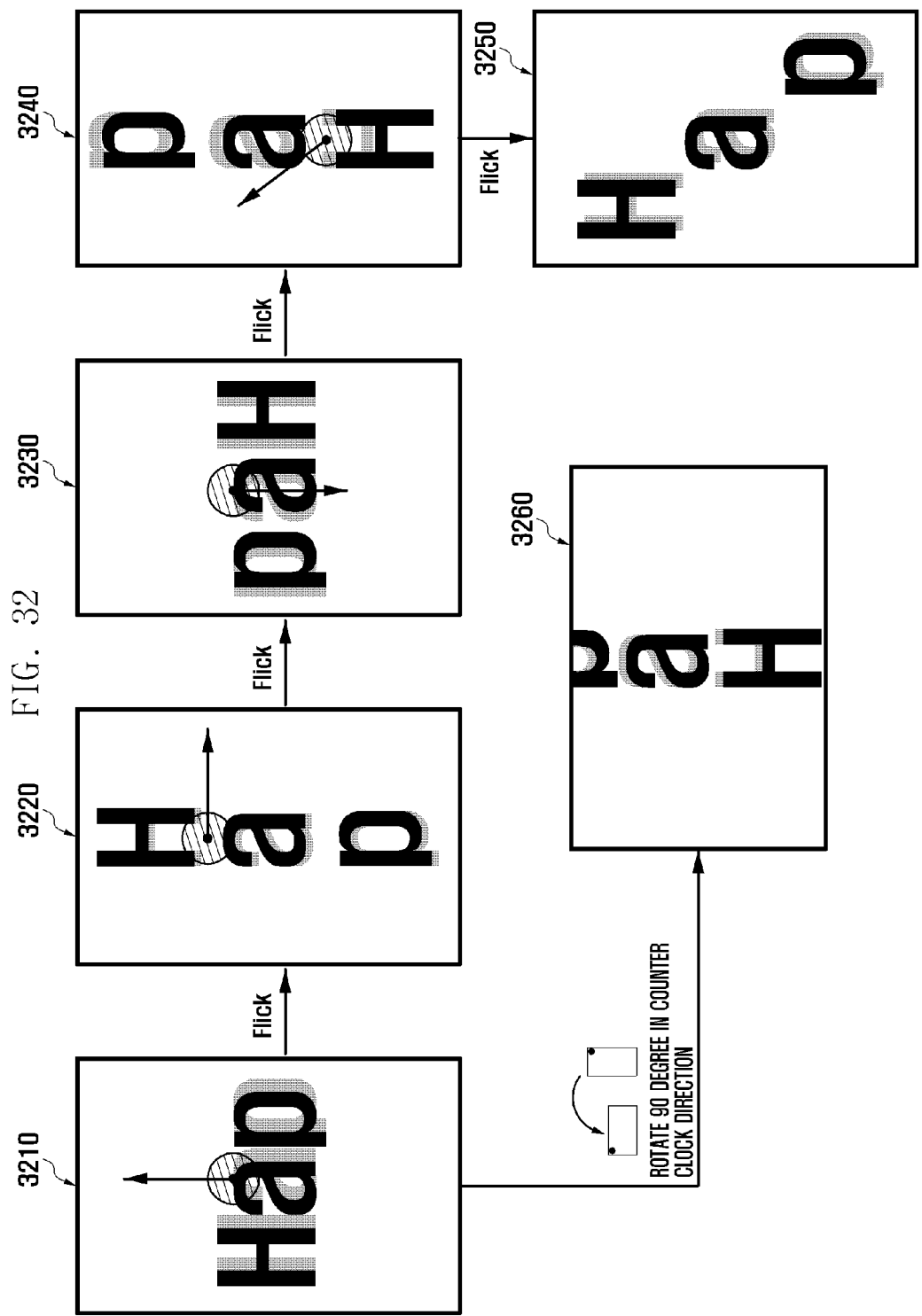
FIG. 32 is a diagram illustrating exemplary operations of rendering a feedback effect in response to a user interaction made on the electric sign item according to an exemplary embodiment of the present invention.

FIG. 32 is a diagram illustrating exemplary operations of rendering a feedback effect in response to a user interaction made on the electric sign item according to an exemplary embodiment of the present invention. Although FIG. 32 is depicted with the exemplary case where the text (object) HAP of the term "HAPPY" is used in the electric sign item, the text and type and color of the text can be changed according to the user configuration.

FIG. 32 shows exemplary operations of rendering an effect in which the text object (character string) of the electric sign item changes in a sliding direction in response to the flick interaction of the user.

Referring to FIG. 32, the electronic device can provide an object corresponding to the electric sign item in response to the user interaction as shown in the screen image 3210. The user can make a series of flick interactions on the object as shown in the screen images 3210 to 3250. The electronic device can change the sliding direction of the object in response to the flick interactions.

For example, if a flick interaction is made upward while the s the text object is sliding from right to left as shown in the screen image 3210, the electronic device controls such that the object slides from the bottom to the top of the screen as shown in the screen image 3220. Also, if a flick interaction is made rightward at a position on the screen as shown in the screen image 3220, the electronic device controls the operation to change the sliding direction of the text object such that the text object slides from left to right as shown in the screen image 3230. If another flick interaction is made downward at a position on the screen as shown in the screen image 3230, the electronic device controls the operation to change the sliding direction of the text object such that the text object slides from the top to the bottom of the screen as shown in the screen image 3240. Also, if still another flick interaction is made in a diagonal direction (in top left direction) at a position on the screen as shown in the screen image 3240, the electronic device controls the operation to change the sliding direction of the text object such that the text object slides from the bottom right to the top left of the screen as shown in the screen image 3250. As shown in the screen images 3210 to 3250, the order of the characters of the text object is maintained as they are entered, e.g. "HAP" of the term "HAPPY".

If a user interaction for changing the sliding direction of the text object is detected in the initial state as shown in the screen image 3210, the electronic device can control the operations such that the individual characters of the text rotate according to the change of the orientation of the electronic device while maintaining the sliding direction of the text object.

According to an exemplary embodiment of the present invention, the electronic device can control the operations such that the first character of the text object (e.g. 'H' of the text 'HAPPY') appears at first always and the direction of each character of the text changes in any direction, up/down/left/right/diagonal directions regardless of the direction of the flick interaction. The electronic device can control the operation such that the individual characters of a text rotate depending on the orientation of the electronic device (landscape/portrait view modes) to be shown upright in user's view point while maintaining the sliding direction of the text object with previous setting value.

Figure 33:
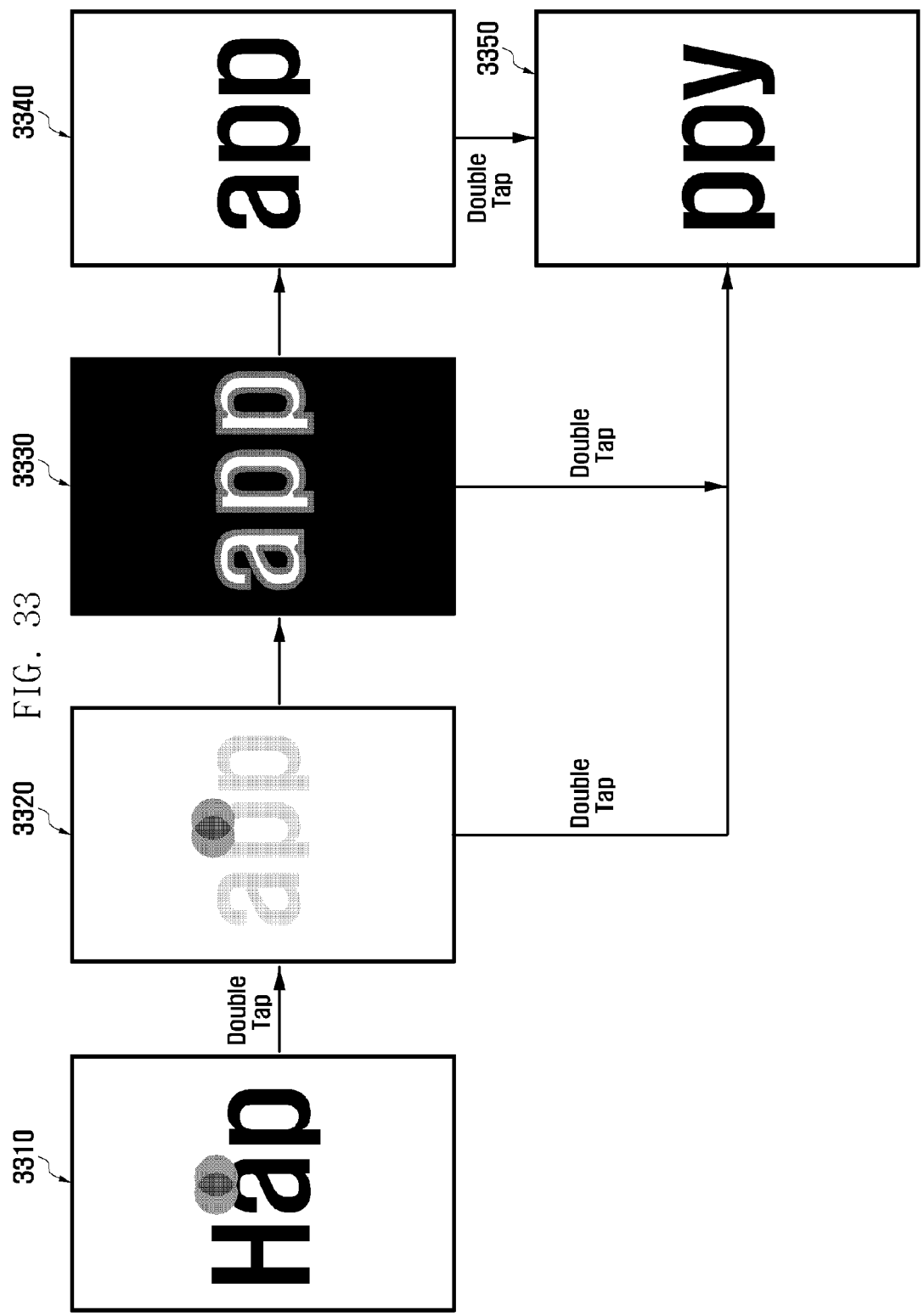
FIG. 33 is a diagram illustrating exemplary operations of rendering a feedback effect in response to a user interaction made on an electric sign item according to an exemplary embodiment of the present invention.

FIG. 33 is a diagram illustrating exemplary operations of rendering a feedback effect in response to a user interaction made on an electric sign item according to an exemplary embodiment of the present invention.

As shown in FIG. 33, the electronic device can provide a text effect object or a blinking screen effect object in response to a double tap interaction made onto the electric sign item. While the text effect or the blinking screen effect is rendered, the text object keeps its sliding motion. The effect can include a color switching effect in which the colors of the screen change as shown in the screen image 3320 and 3340 and a flame effect in which the flame is glowing on the object.

Referring to FIG. 33, the electronic device provides an object in response to a user input made onto the electric sign item as shown in the screen image 3310. The user can make a double tap interaction on the object as shown in the screen image 3310. If the double tap interaction is detected on the object, the electronic device outputs an effect in which the color of the object or the screen is changed, i.e. a blink effect.

For example, if a double tap interaction is detected on the screen as shown in the screen image 3310, the electronic device renders the visual effect showing variation of the screen in response to the double tap interaction as shown in the screen images 3320 to 3340. The visual effect of the screen images 3320 to 3340 can be repeated a predetermined number of times (e.g., 3 or 5 times) at a predetermined interval (e.g., 1 second). That is, the visual effect is rendered in such a manner that the screen images 3320 to 3340 appear alternately. The image alternating (blinking) time and interval can be determined depending on the user configuration.

While the alternating image effect is rendered in response to the user's double tap interaction as shown in the screen images 3320 to 3340, the user can make the double tap interaction again. If the new double tap interaction is detected, the electronic device stops rendering the alternating image effect and provides the initial screen as shown in the screen image 3350.

Figure 34:
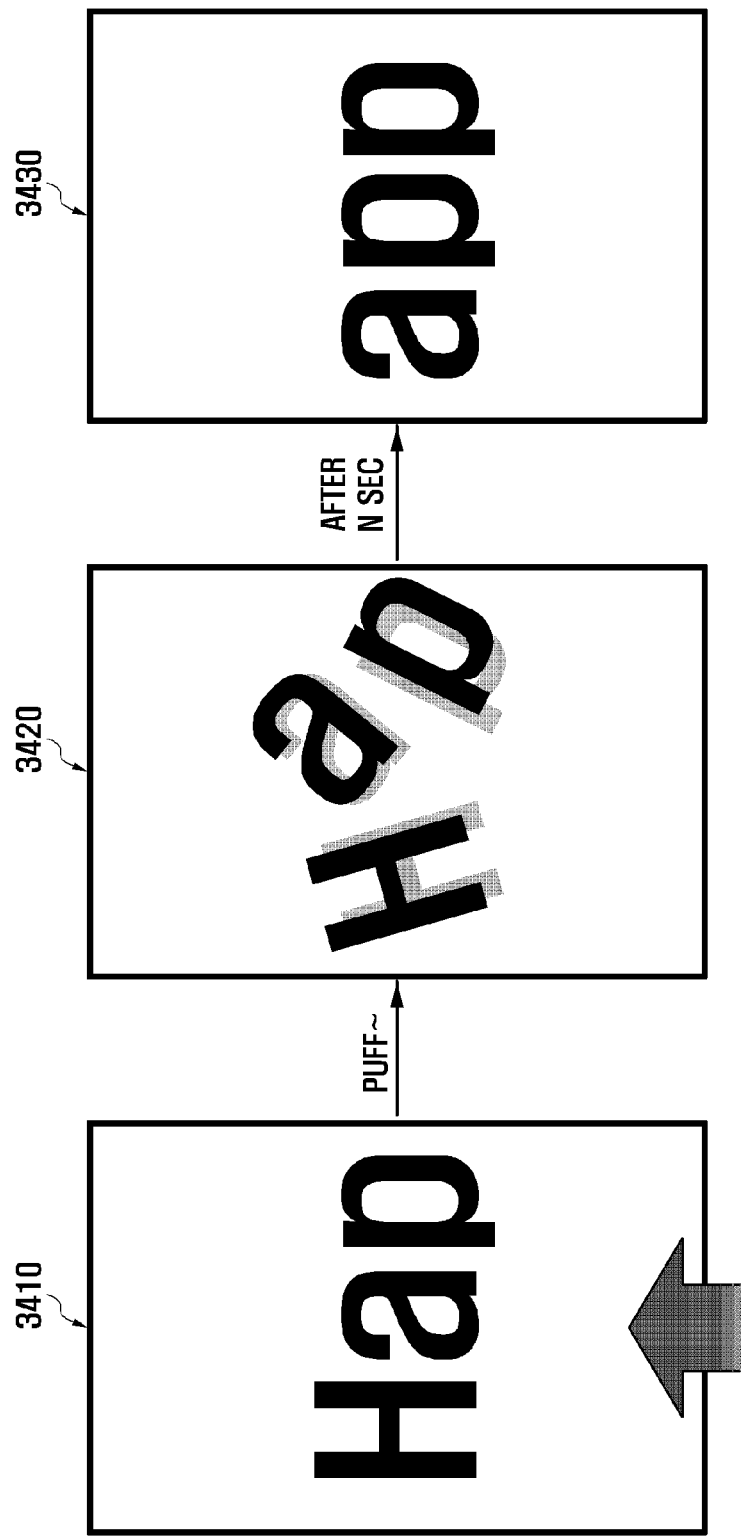
FIG. 34 is a diagram illustrating exemplary operations of rendering a feedback effect in response to a user interaction made on an electric signal item according to another exemplary embodiment of the present invention.

FIG. 34 is a diagram illustrating exemplary operations of rendering a feedback effect in response to a user interaction made on the electric signal item according to another exemplary embodiment of the present invention.

In the exemplary case of FIG. 34, the feedback effect is rendered in such a manner that the individual characters of a text object (character string) of the electric sign item rise upward separately in response to a blow interaction.

Referring to FIG. 34, the electronic device can provide an object corresponding to the electric sign item in response to a user input as shown in the screen image 3410. While the object is provided, the user can make the blow interaction onto the microphone. If the blow interaction is detected by means of the microphone, the electronic device renders the feedback effect in which the individual characters of the text included in the object rise upward in response to the blow interaction.

For example, if the user makes the blow interaction on the microphone with the sound "puff" while the text "Happy" is sliding across the screen as shown in the screen image 3410, the electronic device renders the effect in which the characters of the text are moving up and down in the screen. That is, if the blow interaction is detected at an instant when a part "Hap" of the text "Happy" appears on the screen while the text "Happy" is sliding across the screen, the electronic device renders the effect in which the characters 'H', 'a', and 'p' are transition up and down (i.e., a wave-like movement) on the screen as shown in the screen image 3420.

If the user stops inputting the blow interaction, the electronic device continues rendering the effect in such a manner that the text slides evenly without waving as shown in the screen image 3430. Although the character waving effect is depicted with the part 'Hap' of the whole text 'Happy', the character waving effect can be rendered in such a manner that all of the characters of the text 'Happy' are waved.

Although not depicted in FIG. 34, the electronic device can continue the character waving effect in which the waving characters maintain their waving states as long as the user continues inputting the blow interaction. Also, the electronic device can render the waving effect with different waving strengths depending on the intensity of the blow interaction. The FIG. 35 is a diagram illustrating exemplary operations of rendering a feedback effect in response to a user interaction made on the electric signal item according to another exemplary embodiment of the present invention.

Figure 35:
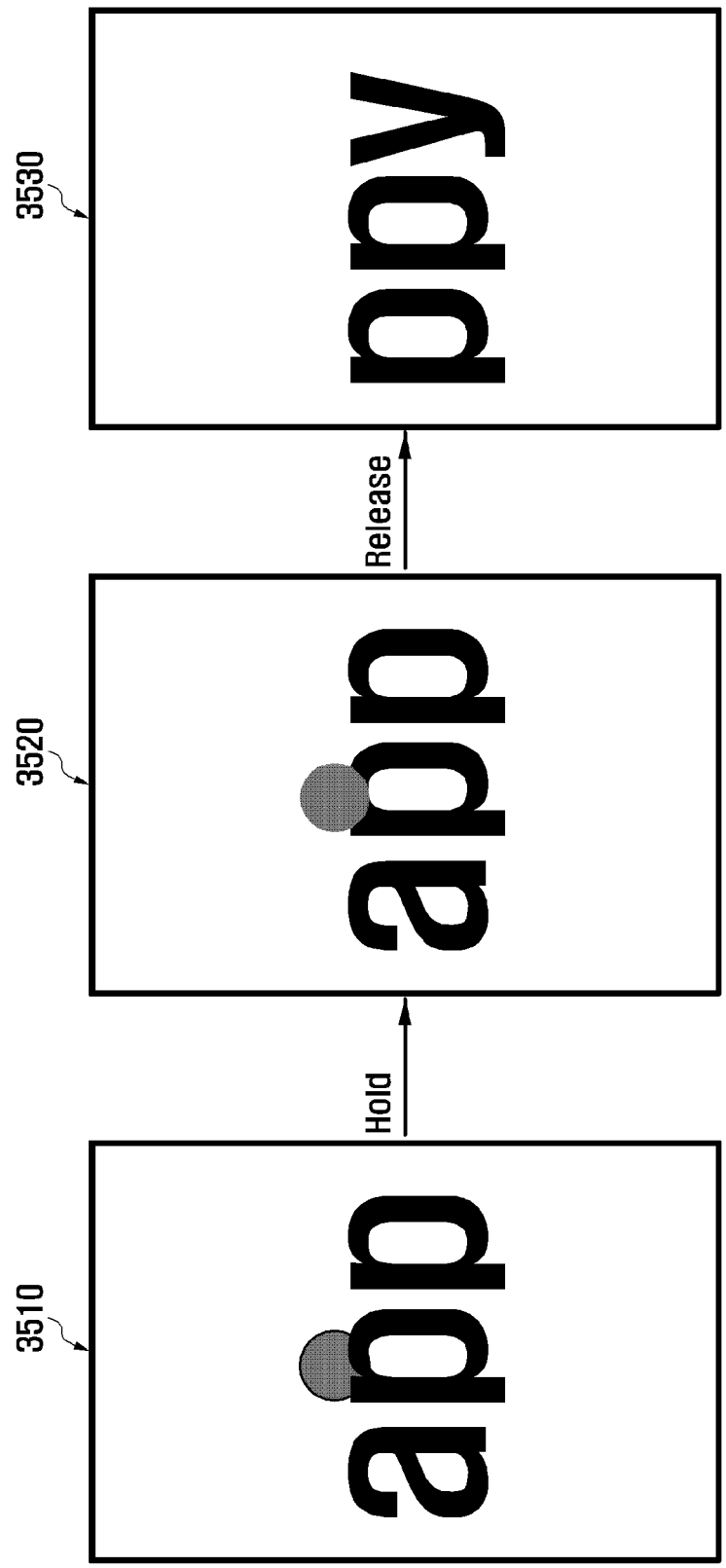
FIG. 35 is a diagram illustrating exemplary operations of rendering a feedback effect in response to a user interaction made on an electric signal item according to another exemplary embodiment of the present invention.

In the exemplary case of FIG. 35, the feedback effect is rendered in such a manner that sliding of text object (character string) is paused in response to a hold interaction.

Referring to FIG. 35, the electronic device can provide an object corresponding to the electric sign item in response to a user input as show in the screen image 3510. In the screen image 3510, the object is sliding from the left to the right.

While the object is sliding from the left to the right, the user can make a hold interaction at a position on the screen. If the hold interaction is detected at a position on the screen, the electronic device renders the feedback effect in which the object stops sliding to pause and maintains the pause as shown in the screen image 3520. That is, the electronic device pauses the sliding of the object while the user maintains the hold interaction with the presentation of the holding state of the object. (i.e., the "app" portion of the term "Happy").

While the sliding of the object is paused by the hold interaction as shown in the screen image 3520, the user can release the hold interaction. If the hold interaction is released, the electronic device restarts sliding the object as shown in the screen image 3530.

Although not depicted in FIG. 35, the sliding hold effect can be applied when the electronic device is operating in the landscape view mode. The electronic device can be configured such that, even though a screen rotation-triggering interaction is input while the object (character string) is held by the hold interaction, the sliding hold state is maintained as before the rotation. If the hold input is released the electronic device can provide the effect in consideration of the screen rotation. A hold interaction represents a general touch&hold input, (represented by the solid circle). A touch&hold function is well-known in the art to pause processing which a touch is maintained.

Figure 36:
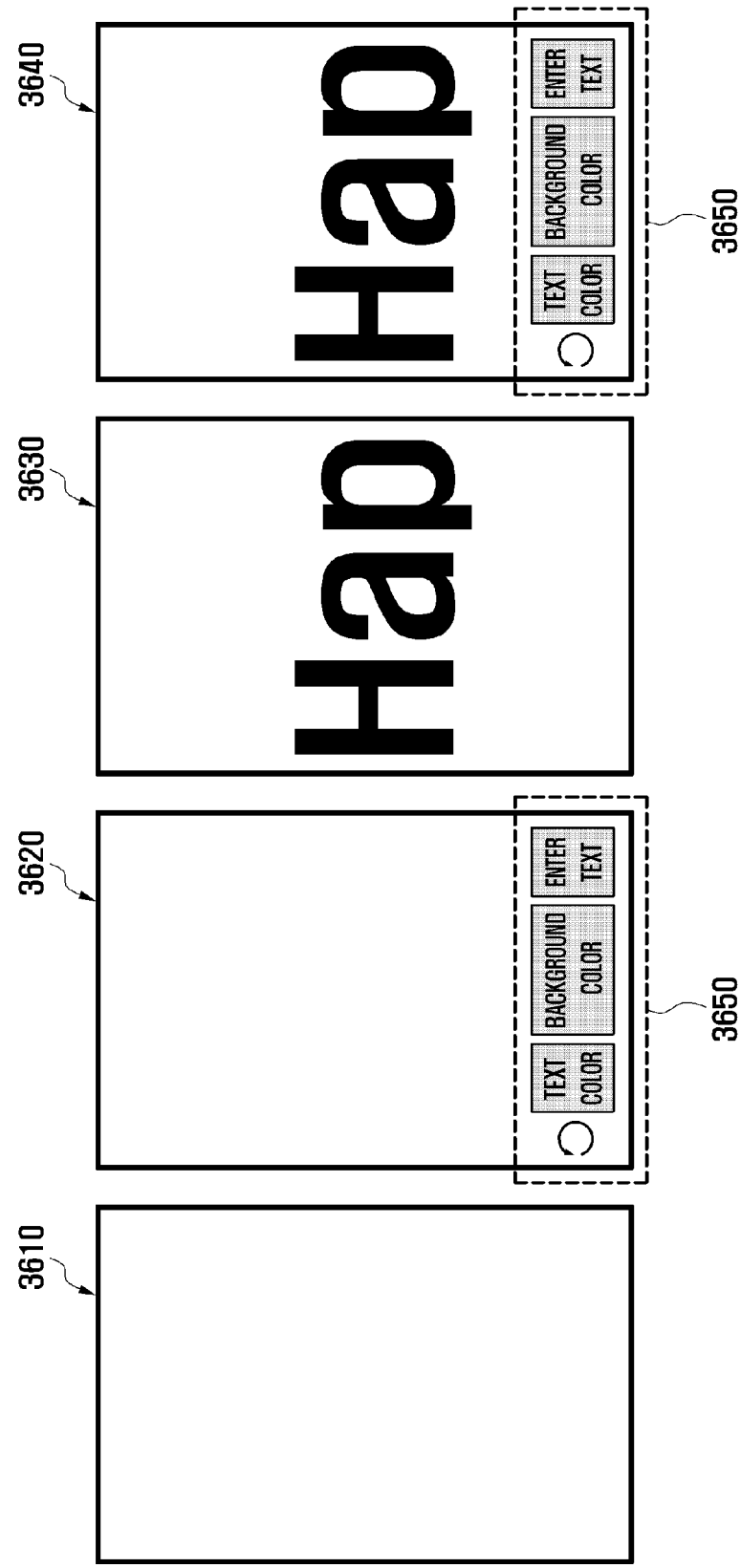
FIGS. 36 and 37 are diagrams illustrating exemplary operations of setting an electric sign item in the electronic device according to an exemplary embodiment of the present invention.
Figure 37:
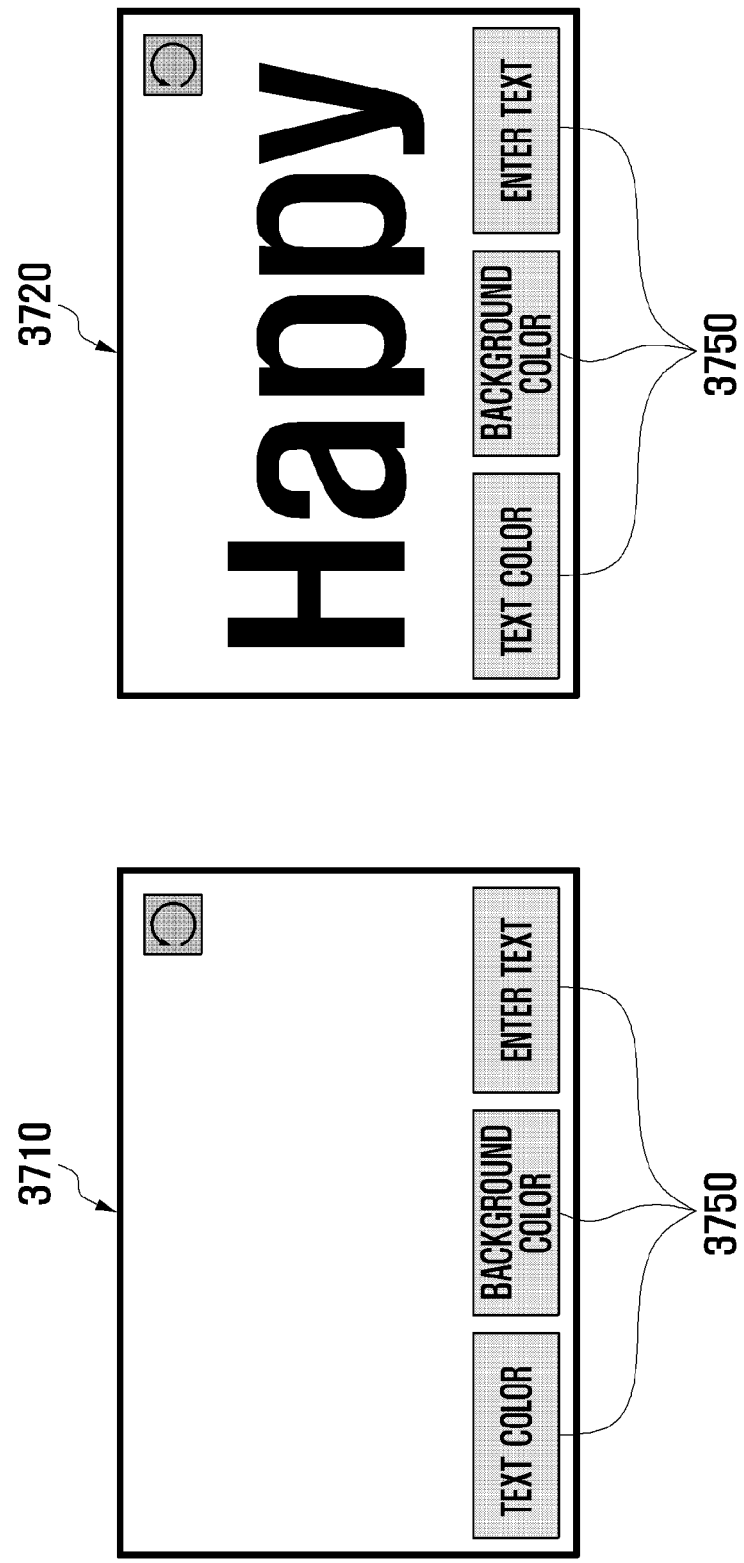

FIGS. 36 and 37 are diagrams illustrating exemplary operations of setting the electric sign item in the electronic device according to an exemplary embodiment of the present invention.

FIG. 36 shows the operations for setting the electric sign item in the portrait view mode of the electronic device, and FIG. 37 shows the operations for setting the electric sign item in the landscape view mode of the electronic device.

Referring to FIG. 36, the electronic device provides a blank setting window having white background in response to the electric sign item execution command input by the user as shown in the screen image 3610. In case that there is an object (background and/or text) configured by the user previously, the electronic device displays the object configured by the user as shown in the screen image 3630. Comparing the screen images 3610 and 3630 with each other, the screen image 3610 shows only a white background without any text, and the screen image 3630 shows a text "Hap" portion of the term "Happy" on the background with color set by the user (e.g. pink). The text "Happy" can be set with specific text color and size selected by the user.

The user can create a new object on the blank electric sign setting screen as shown in the screen image 3610 or on the blank electric sign setting screen with a previously created object as shown in the screen image 3630. In order to start creating or setting an object, the user can make an input (e.g., tap action) at a position on the screen. If the tap action is detected on electric sign setting screen, the electronic device interprets the tap action into an electric sign item edit menu request and thus displays an edit menu bar 3650 as shown in the screen images 3620 and 3640. Once the edit menu bar 3650 is displayed, the user can start configuring detailed settings of an object corresponding to the electric sign item using the menu options of the edit menu bar 3650 as shown in the screen images 3620 and 3640. The operations related to setting the electric sign item are described in detail with reference to drawings hereinafter.

FIG. 37 shows the operations for setting the electric sign item in the landscape view mode of the electronic device. The screen images 3710 and 3730 of FIG. 37 correspond to the screen images 3610 and 3630 of FIG. 36, and the edit menu bar 3750 of FIG. 37 corresponds to the edit menu bar 3650 of FIG. 36. In the landscape view mode as shown in FIG. 37, the edit menu request operation can be performed as described with reference to FIG. 36.

Figure 38:
FIG. 38 is a diagram illustrating an operation of outputting an object in landscape/portrait view mode of the electronic device according to an exemplary embodiment of the present invention.

FIG. 38 is a diagram illustrating an operation of outputting an object in landscape/portrait view mode of the electronic device according to an exemplary embodiment of the present invention.

In the exemplary case of FIG. 38, the electronic device outputs an object in response to a user interaction switching the orientation of the electronic device between the portrait view mode and the landscape view mode while an effect related to the electric sign item is rendered as shown in FIGS. 32 to 37.

In an exemplary embodiment of the present invention, the electronic device can render a sliding effect in which the object of the electric sign item flows from the right to the left according to a default value, e.g. left-to-right direction, regardless of the orientation of the electronic device. That is, the object (character string) sliding effect can be rendered regardless of the rotation input by means of an acceleration sensor or a geomagnetic sensor, motion input such as tilt of the orientation, and orientation switching input for switching between the landscape view mode and portrait mode.

In an exemplary embodiment of the present invention, a voice interaction such as blow interaction can be input by means of the microphone. The microphone can be fixedly installed at a side of the electronic device. In case that the electronic device is operating in landscape view mode, the blow interaction-applying direction is changed as compared to the case where the electronic device is operating in portrait view mode. In an exemplary embodiment of the present invention, the electronic device can provide different Graphic User Interfaces (GUIs) for the landscape view mode and the portrait view mode. For example, if a blow interaction is made onto the microphone (MIC) from the right side while the object of the electric sing item as shown in FIG. 38, the object corresponding to the function configured to operate in response to the blow interaction can be provided.

According to an exemplary embodiment of the present invention, the user can make an additional input by rotating the orientation of the electronic device while an effect (e.g., wave effect) is rendered in response to a user interaction such as blow interaction made onto the object (character string) of the electric sign item. The electronic device can be configured such that, when the additional input is detected, the effect in response to the additional input is rendered after the current effect is finished.

Figure 39:
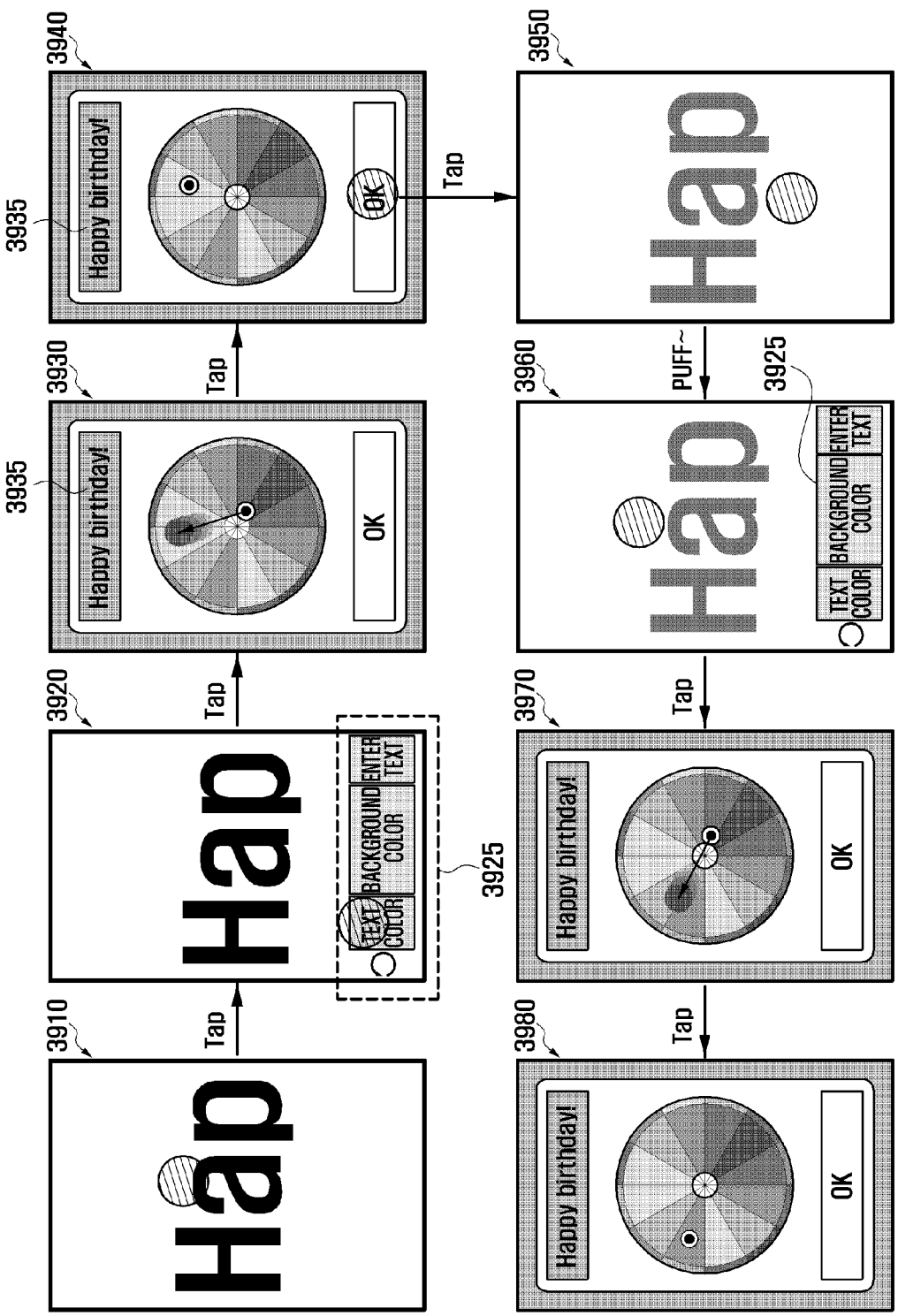
FIG. 39 is a diagram illustrating exemplary operations for configuring detailed settings of an object provided with the electric sign item in the electronic device according to an exemplary embodiment of the present invention.

FIG. 39 is a diagram illustrating exemplary operations for configuring detailed settings of an object provided with the electric sign item in the electronic device according to an exemplary embodiment of the present invention.

Referring to FIG. 39, the user can make an input (action) requesting a setting menu for setting the object provided by the electric signal item as shown in the screen image 3910. The setting menu request can be input by making an action (e.g. tap action) at a position on the screen. If the user input is detected on the object setting screen, the electronic device interprets the user input into the setting menu request signal and thus outputs a setting menu bar 3925 as shown in the screen image 3920. The user can configure detailed settings of the object corresponding to the electric sign item using the menu items of the setting menu bar 3925. The electronic device can be configured such that, if there is no other input detected within a predetermined time after the input of the setting menu request for the setting menu bar 3925, the setting menu bar 3925 disappears.

The user can set the color of the sliding object (character string) provided by the electric sign item using the text color menu item of the setting menu bar 3925. Also, the user can set the color of the object (background) provided by the electric sign item using the background color menu item of the setting menu bar 3925. Also, the user can set the text of the sliding object (character string) provided by the electric sign item using the text input menu item of the setting menu bar 3925. At this time, the object (character string) can continue sliding while the setting menu bar 3925 is displayed in an overlaid manner.

In case of selecting the text color menu item, the user can make an action (e.g. tap action) onto the text color menu item of the setting menu bar 3925 as shown in the screen image 3920. If the user action is detected on the text color menu item, the electronic device displays a text color setting screen (including a palette object) as shown in the screen image 3930.

The user can move a cursor across the palette object to select a text color by making a user input such as drag and drop and tap action as shown in the screen images 3930 and 3940. At this time, a color corresponding to the current position of the cursor can be presented in a preview box 3935 as shown in the screen images 3930 and 3940. That is, the preview box 3935 provides the user with the information of the text color or background color immediately when the user places the cursor at a specific color on the palette object. Although the color selection is performed with the drag and drop action in FIG. 39, the user can select a color by making a tap action right on the color intended by the user.

In order to complete the selection of the text color of the object (character string), the user can make an action (e.g. tap action) on an item designated for generating a command for completing the color selection operation as shown in the screen image 3940. If the color selection complete command is detected, the electronic device displays the object in which the selected color is reflected to the text color as shown in the screen image 3950. Here, the object is provided in sliding manner, and the step of displaying the setting menu bar can be omitted.

The user can make a user input requesting the setting menu as shown in the screen image 3950. If the setting menu request is detected, the electronic device displays the setting menu bar 3925 in response to the setting menu request as shown in the screen image 3960. As a consequence, the user can perform the detailed settings of the object corresponding to the electric sign item using the menu items provided on the setting menu bar 3925. A description is made of the operation for use of the background color menu item hereinafter.

The user can make an input action (e.g. tap action) onto the background color menu item of the setting menu bar 3925 as shown in the screen image 3960. If the input action for selecting the background color menu item is detected, the electronic device displays a background color setting screen (including a palette object) as shown in the screen image 3970.

The user can select a background color on the background color setting screen with a drag and drop action or a tap action as shown in the screen images 3970 and 3980. Since the background color selection can be performed in the same manner as described with reference to the screen images 3910 to 3950, detailed description on the background color selection process is omitted.

Figure 40:
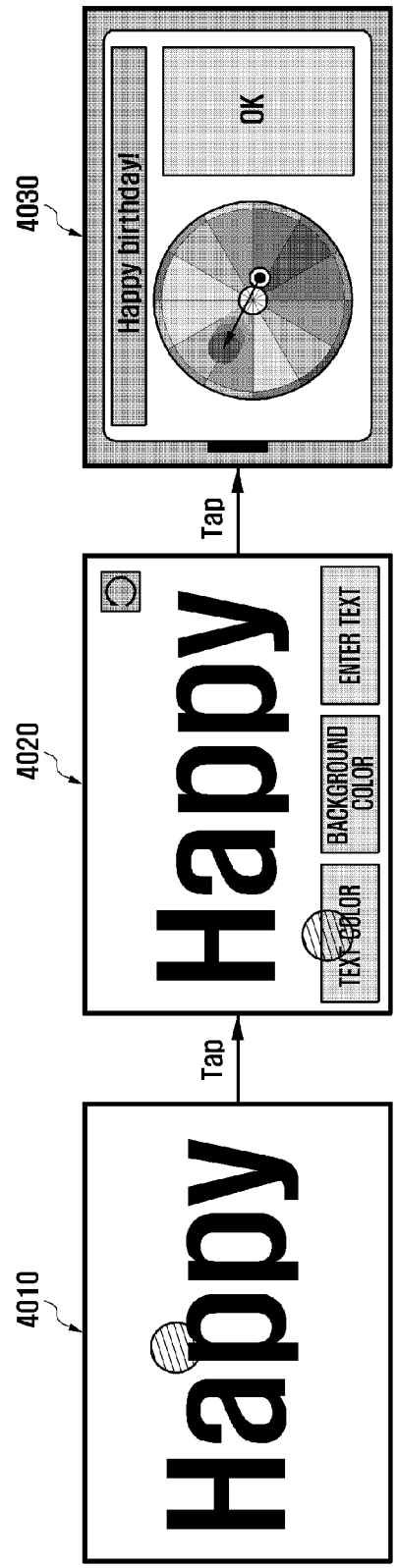
FIG. 40 is a diagram illustrating exemplary operations for configuring detailed settings of an object provided with the electric sign item in the electronic device according to another exemplary embodiment of the present invention.

FIG. 40 is a diagram illustrating exemplary operations for configuring detailed settings of an object provided with the electric sign item in the electronic device according to another exemplary embodiment of the present invention. Particularly, FIG. 40 shows the exemplary case where the electronic device is operating in the landscape view mode.

Referring to FIG. 40, the object setting operations in the landscape view mode are identical with those in the portrait view mode. That is, the operations represented by the screen images 4010, 4020, and 4030 of FIG. 40 correspond to the operations depicted in the screen images of FIG. 39. For example, the step represented by the screen image 4010 of FIG. 40 corresponds to the step represented by the screen image 3920 of FIG. 39, and the step represented by the screen image 4030 of FIG. 40 corresponds to the step represented by the screen image 3930 of FIG. 39. That is, the setting menu entry and text object setting operations in the landscape view mode are performed in the same manner as those in the portrait view mode as described with reference to FIG. 39. Accordingly, detailed descriptions on the screen images of FIG. 40 are omitted herein.

Figure 41:
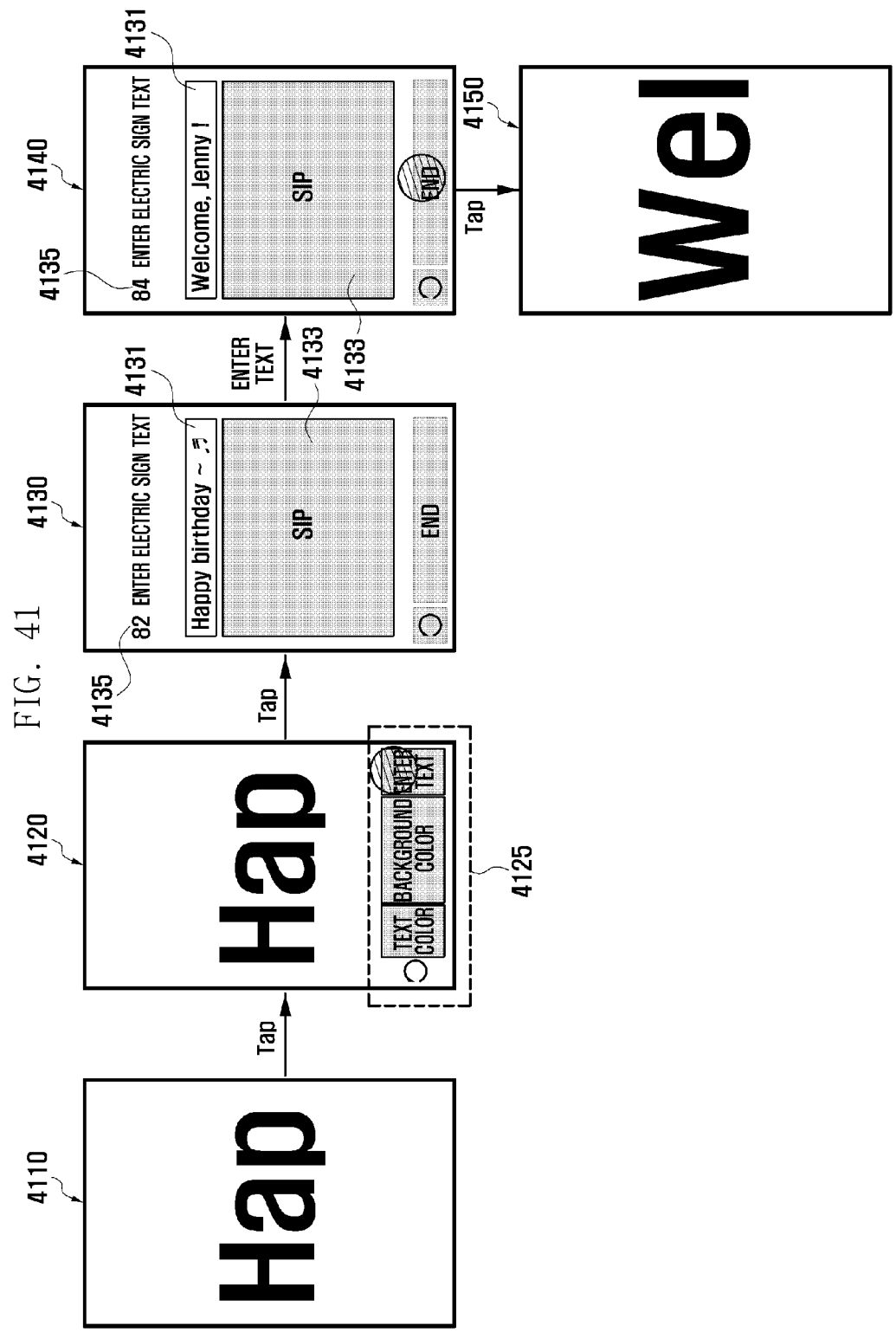
FIGS. 41 and 42 are diagrams illustrating exemplary operations of configuring detailed settings of the object provided by the electric sign item in the electronic device according to an exemplary embodiment of the present invention.
Figure 42:
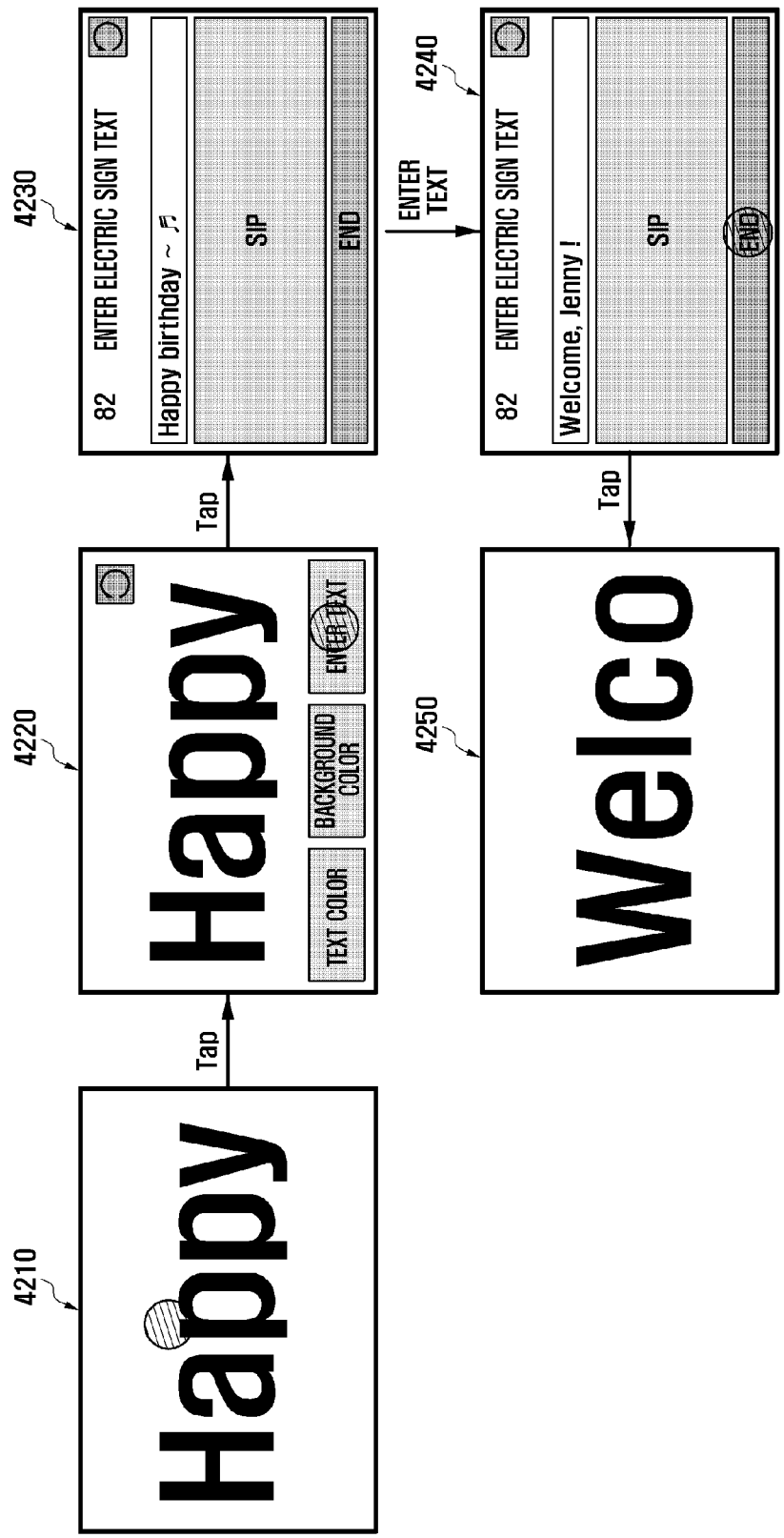

A description is made of the operations related to a text input menu item provided in the setting menu with reference to FIGS. 41 and 42.

FIGS. 41 and 42 are diagrams illustrating exemplary operations of configuring detailed settings of the object provided by the electric sign item in the electronic device according to an exemplary embodiment of the present invention. Particularly, FIGS. 41 and 42 show the cases where the text of the object provided by the electric sign item is edited.

FIG. 41 shows steps of editing a text in the portrait view mode, and FIG. 42 shows steps of editing a text in the landscape view mode of the electronic device.

Referring to FIG. 41, the user can make an input action to request a setting menu for setting the object provided by the electric sign item as shown in the screen image 4110. The setting menu request can be input by the user action (e.g. tap action, not shown) made at a position on the screen. If the setting menu request is detected, the electronic device displays a setting menu bar 4125 as shown in the screen image 4120. The user can configure the detailed settings of the object provided by the electric sign item using the setting menu bar 4125. The electronic device can be configured such that, if there is no user input within a predetermined time after displaying the setting menu bar 4125, the setting menu bar 4125 disappears.

The setting menu bar 4125, as previously described, may be provided with 'text color', 'background color', and 'text input' menu items such that the user can configure the detailed settings of the object using the menu items. The operations for configuring detailed settings of an object with the 'text color' and 'background color' menu items have been described above with reference to FIGS. 39 and 40. A description is made of the operations for configuring the object using the 'text input' menu item with reference to FIGS. 41 and 42.

The user can make an input action (e.g. tap action) onto the text input menu item of the setting menu bar 4125 as shown in the screen image 4120. If the input action is detected on the text input menu item, the electronic device displays a text edit screen as shown in the screen images 4130 and 4140.

The user can configure the object (e.g. input text) for rendering an effect with the electric sign item on the text edit screen as shown in the screen images 4130 and 4140. As shown in the screen image 4120, a previously configured text is displayed on the text edit screen. For example, the text "Happy birthday" which has been entered previously can be displayed. In case of initial text setting, a blank text edit screen can be provided.

The user can input a text using the text input tool 4133 supporting various input methods according to the design of the electronic device. For example, the user can input a new text such as "Welcome, Jenny!" using the text input tool 4133 as shown in the screen image 4140. If a text is input by means of the text input tool 4133, the electronic device displays the text input by the user in the text input box 4131. The electronic device can provide a character counter 4135 for indicating the number of characters that can be further input at a region on the screen. If a text is input by means of the text input tool 4133, the input text is displayed in the text input box, and the character counter 4135 shows the number of characters that can be further input after the input of the text.

Although not depicted in the screen images 4130 and 4140, the text input tool can be provided with a font type selection menu item and a font size selection menu item.

After completing the configuration of the detailed settings of the text object through steps represented by the screen images 4130 and 4140, the user can make an input action (e.g., tap action, hashed circle) on a menu item designated for the function completing the text settings. If the input action for completing the text settings is detected, the electronic device displays the text edit screen in which the reset text object is displayed as shown in the screen image 4150. The reset text object is provided with a sliding effect, and the step of presenting the setting menu bar 4125 can be omitted.

FIG. 42 shows steps of editing a text in the landscape view mode of the electronic device, and the operations represented by the screen images 4210, 4220, 4230, 4240, and 4250 of FIG. 42 correspond to the operations depicted in the screen images of FIG. 41. For example, the step represented by the screen image 4210 of FIG. 42 corresponds to the step represented by the screen image 4110 of FIG. 41, the step represented by the screen image 4230 of FIG. 42 corresponds to the step represented by the screen image 4130 of FIG. 41, the step represented by the screen image 4240 of FIG. 42 corresponds to the step represented by the screen image 4140 of FIG. 41, and the step represented by the screen image 4250 of FIG. 42 corresponds to the step represented by the screen image 4150 of FIG. 41. That is, the setting menu entry and text object setting operations in the landscape view mode are performed in the same manner as those in the portrait view mode as described with reference to FIG. 41.

Figure 43:
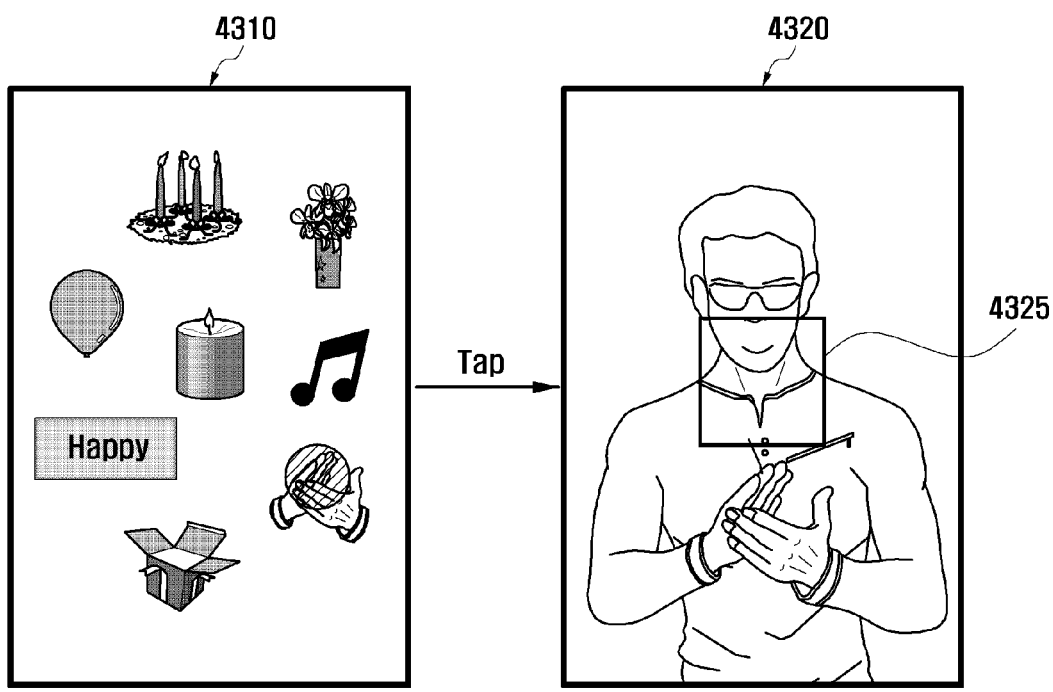
FIG. 43 is a diagram illustrating exemplary operations of rendering an effect provided with a cheer item in the electronic device according to an exemplary embodiment of the present invention.

FIG. 43 is a diagram illustrating exemplary operations of rendering an effect provided with the cheer item in the electronic device according to an exemplary embodiment of the present invention.

If a user input is made onto the cheer item, the electronic device displays an object provided by the cheer item in response to the user input as shown in FIG. 43. The user can make an input action (e.g. tap action) onto the cheer item as shown in the screen image 4310. If the input action is detected on the cheer item, the electronic device displays and object corresponding to the cheer item as shown in the screen image 4320. The initial screen can be provided only with the background object without sound output as shown in the screen image 4320. The background object can be provided in the form of a motion picture (or animation) in which at least one person applauds. The user can make a user interaction (e.g., a tap, a blow, a flick, etc.) at a position on the screen. The electronic device can be configured such that, when a user interaction is detected at a position on the screen, a predetermined cheering/jeering sound is output in response to the user interaction. The user can control the sound by manipulating a cursor as denoted by the reference number 4325. For example, the user can control the tempo of the sound with the user interaction moving the cursor along the X axis and select a sound item such as cheering/jeering sound.

Although not depicted in the screen image 4320, the screen can be divided to implement functions for controlling the output effect. For example, the electronic device can be configured to increase the applaud sound in response to the user interaction made at the top of the screen, decrease the applaud sound in response to the user interaction made at the bottom of the screen, increase the tempo of the sound in response to the user interaction made at the left of the screen, or decrease the tempo of the sound in response to the user interaction made at the right of the screen, for example. Detailed description on the effect related to the cheer item is made hereinafter with reference to FIGS. 44 and 45.

Figure 44:
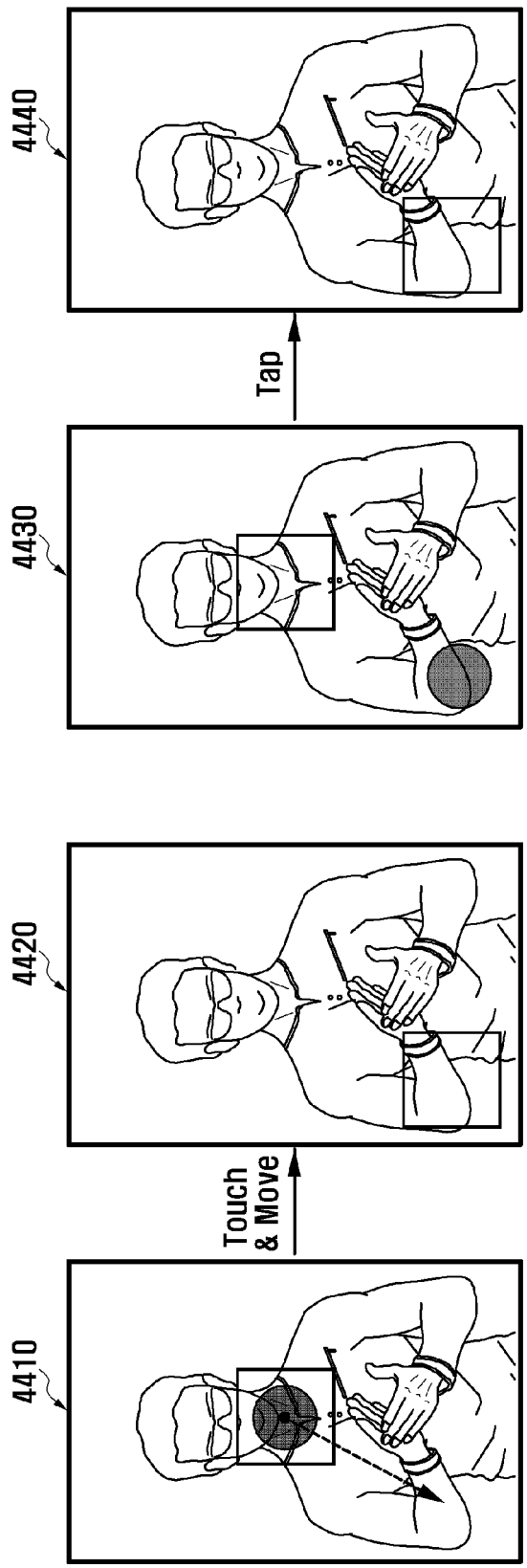
FIGS. 44 and 45 are diagrams illustrating exemplary operations of rendering feedback effects provided with a cheer item in the electronic device according to an exemplary embodiment of the present invention.
Figure 45:
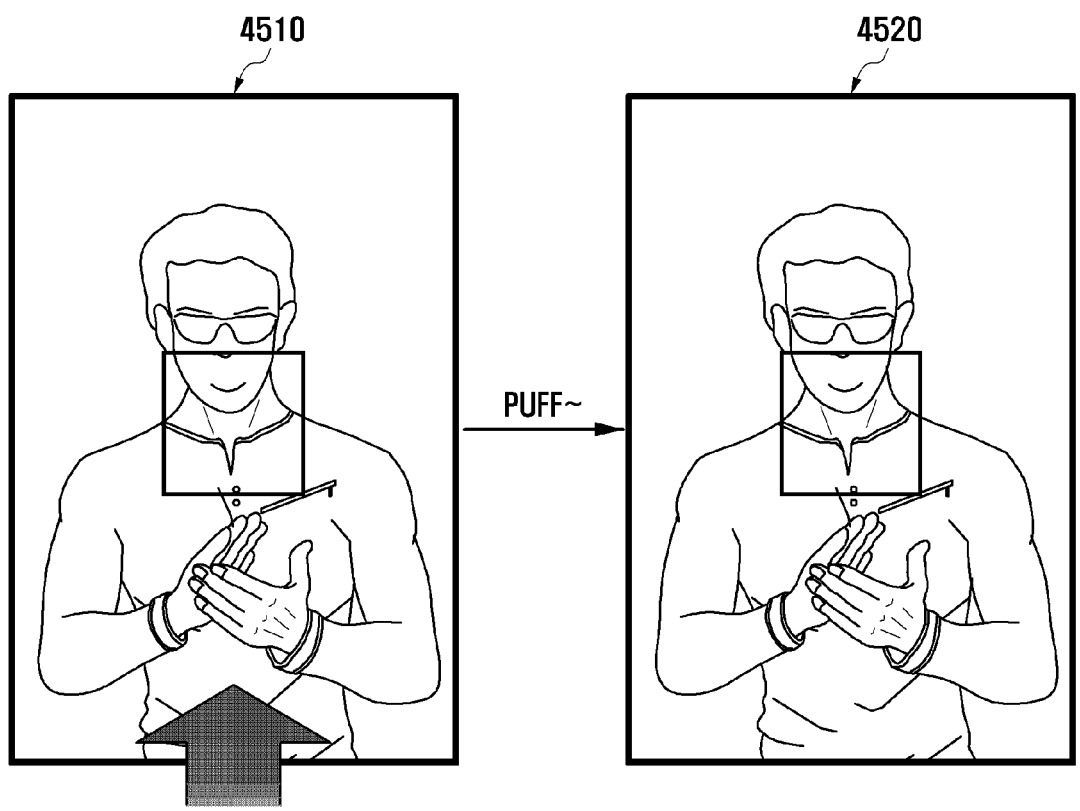

FIGS. 44 and 45 are diagrams illustrating exemplary operations of rendering feedback effects provided with the cheer item in the electronic device according to an exemplary embodiment of the present invention.

As shown in FIGS. 44 and 45, the electronic device provides an object corresponding to the cheer item in response to a user input. The user can makes one of a plurality of predefined user inputs onto the object. The effects of the cheer item that are rendered in response to various user interactions are described hereinafter.

FIG. 44 shows exemplary operations when a touch and move interaction (see screen images 4410 and 4420) is input or when the tap interaction (see screen image 4430 and 4440) is input.

As shown in the screen images 4410 and 4420, the user can make the touch and move interaction by touching the screen at a position and moving the touch to another position (as indicated by the direction of the illustrated arrow). If the touch and move interaction is detected, the electronic device selects type and tempo of the cheer sound and then renders an effect with the sound in the selected type and tempo. For example, if a touch and move interaction is made from the center to the left bottom of the screen, the electronic device can output an applaud sound in low volume and slow tempo.

As shown in the screen images 4430 and 4440, the user can make a tap interaction at a position on the object (screen). If the tap interaction is detected, the electronic device selects the type and tempo of a cheer sound depending on the position where the tap interaction is detected and outputs a sound effect with the selected type and tempo. For example, if the tap interaction is made at the bottom left position of the screen as shown in the screen images 4430 and 4440, the electronic device can output an applaud sound in low volume one time.

The electronic device can be configured such that the type and tempo of the sound effect to be rendered are selected with the touch and move interaction or the tap interaction. The electronic device also can be configured such that the sound effect is rendered with different types and tempos in accordance with the change of the position where the user interaction is made. For example, the electronic device can be configured such that the sound effect is continuously rendered changing the type and tempo according to the current position of the touch while the touch and move interaction is input and an applaud sound is output one time when the tap interaction is detected.

FIG. 45 shows exemplary operations of the electronic device when a blow interaction is made on the object by the user.

As shown in the screen images 4510 and 4520, the user can make the blow interaction (as indicated by the solid arrow) onto the object. If the blow interaction is detected onto the object, the electronic device selects a type and tempo of a whistle sound and renders the whistle sound effect based on the selected type and tempo. Here, the whistle sound effect is rendered while the blow interaction continues, and the blow interaction can be made while the cheer sound effect is rendered as shown FIG. 44. Also, the electronic device can be configured such that the pitch of the whistle sound is adjusted according to the intensity of the blow interaction (duration and impact).

Figure 46:
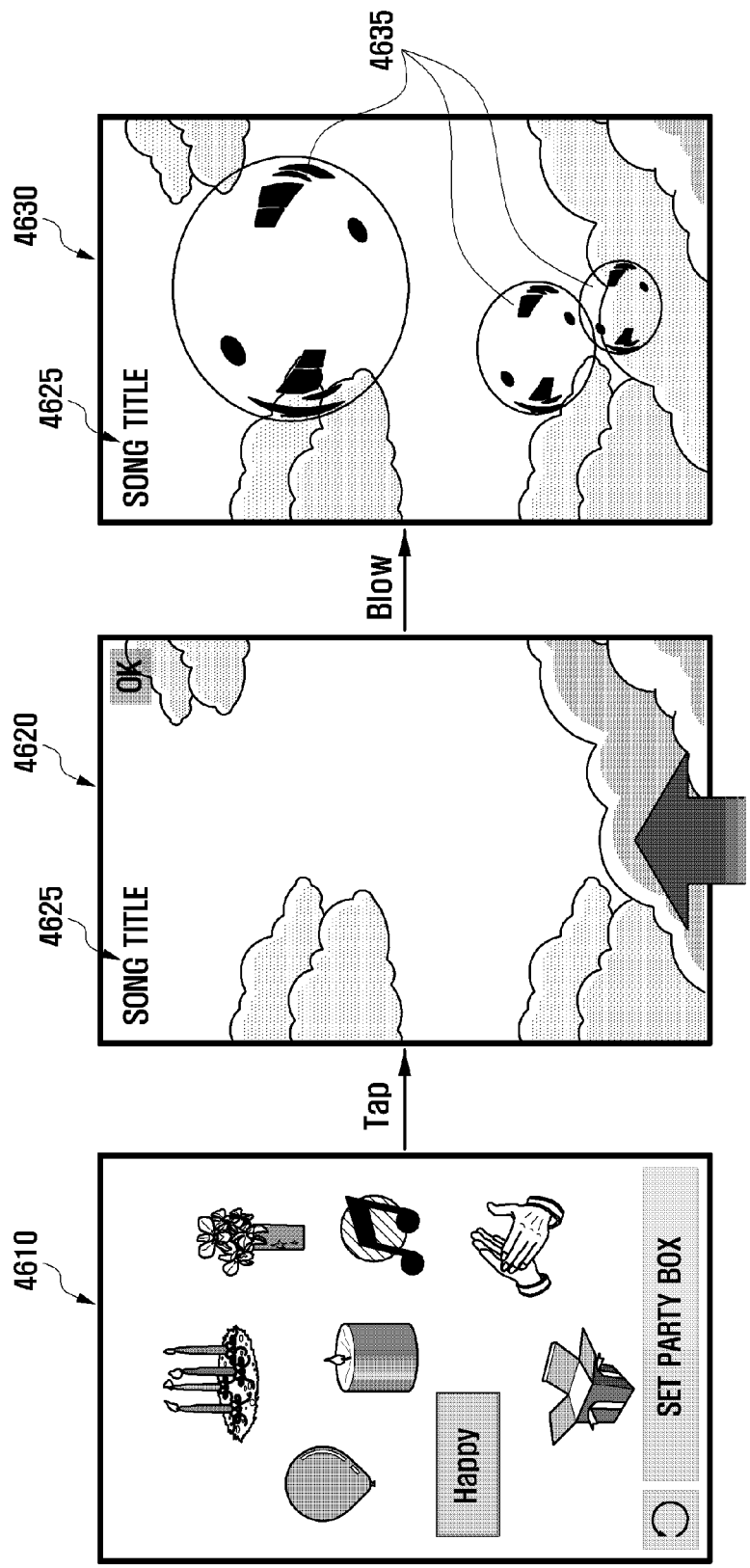
FIG. 46 is a diagram illustrating exemplary operations of rendering feedback effects provided with a bubble item in an electronic device according to an exemplary embodiment of the present invention.

FIG. 46 is a diagram illustrating exemplary operations of rendering feedback effects provided with the bubble item in an electronic device according to an exemplary embodiment of the present invention.

As shown in FIG. 46, the electronic device displays an initial object in response to a user input made on the bubble item and renders an effect in response to a user input mode on the object. Referring to FIG. 46, the user can make an input action (e.g. tap action) onto the bubble item as shown in the screen image 4610. If the input action is detected on the bubble item, the electronic device outputs an object (initial screen) corresponding to the bubble item in response to the input action as shown in the screen image 4620.

The object (initial screen) is provided with a preset background image and a song title 4625. The user can make a blow interaction (as indicated by the direction of the solid arrow) to the microphone (MIC) while the object (initial screen) is displayed as shown in the screen image 4620. If the blow interaction is detected, the electronic device outputs a part (a measure) of a song file corresponding to the song title 4625 while rendering a visual effect as shown in the screen image 4630. The electronic device can be configured to play one or multiple parts of the song file and determine a number of graphic components 4635 of the visual effect according to the intensity (duration and impact) of the blow interaction. Also, the electronic device can be configured to play a part of the next sequence whenever the blow interaction is input.

Figure 47:
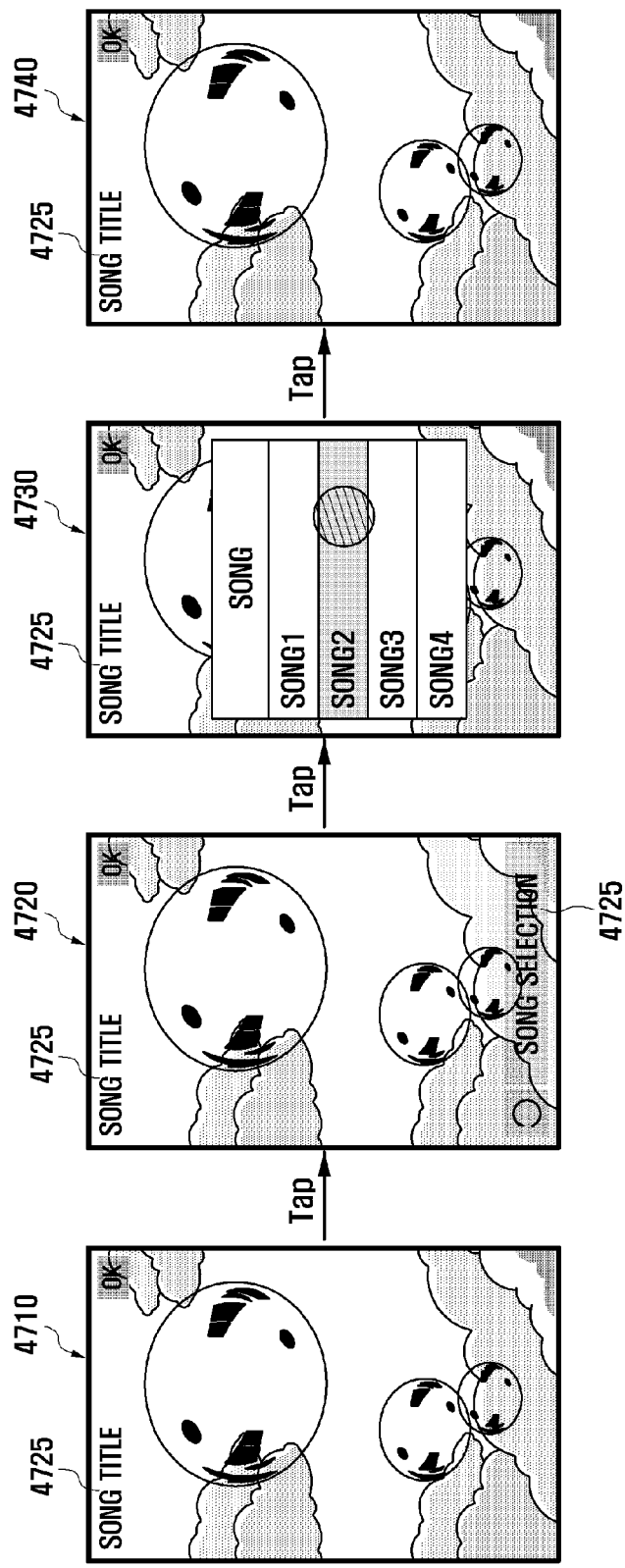
FIG. 47 is a diagram illustrating exemplary operations of configuring/editing the effect provided with a bubble item in an electronic device according to an exemplary embodiment of the present invention.

FIG. 47 is a diagram illustrating exemplary operations of configuring/editing the effect provided with the bubble item in an electronic device according to an exemplary embodiment of the present invention.

Referring to FIG. 47, the user can configure new settings or edit the previous settings of an object in a setting menu screen provided with the bubble item. In order to enter the setting menu screen, the user can make an input action (e.g. tap action, not shown) at a position on the bubble effect screen as shown in the screen image 4710. If the input action is detected on the bubble effect screen, the electronic device interprets the input action into a setting menu request command and displays a setting menu item 4725 as shown in the screen images 4710 and 4720.

The user can make an input action (e.g. tap action, not shown) on the setting menu item 4725. If the input action is detected on the setting menu item 4725, the electronic device displays a detailed setting window of the bubble item in response to the input action as shown in the screen image 4730. In the detailed setting window of the bubble item, the user can configure the detailed settings of the effect to be rendered with the bubble item (e.g. select a song). In the screen image 4730, "song 2" is selected from the detailed setting window. If the user jumps to the next step or setting completion step without editing the settings, the first item (i.e. "song 1") can be selected as a default item automatically.

If the user makes the input action (e.g. tap action) onto the "song 2" within the detailed setting window as shown in the screen image 4730, the electronic device displays the object screen in which the settings edited by the user is reflected as shown in the screen image 4740. In the screen image 4740, the song title 4635 of the song selected from the detailed setting window is displayed, such that the song title 4635 displayed in the screen image 4740 differs from the song title displayed in the screen images 4710 to 4730.

Although not depicted in FIG. 47, the electronic device can be configured to provide various setting menu items for setting number, play speeds, and sizes of graphic components (bubbles).

Figure 48:
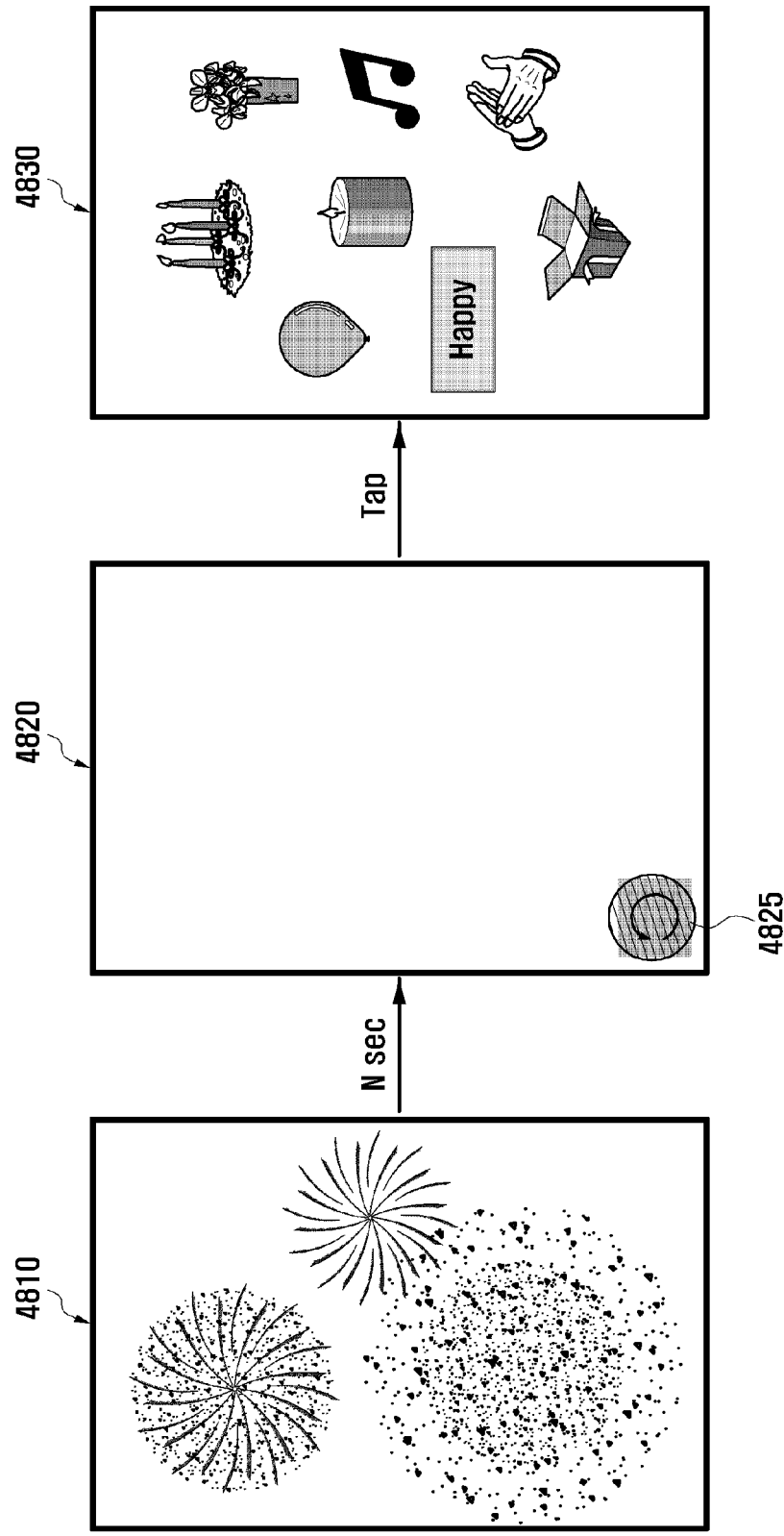
FIGS. 48 and 49 are diagrams illustrating exemplary operations of returning to a previous menu while a feedback effect of an event effect is rendered in the electronic device according to an exemplary embodiment of the present invention.
Figure 49:
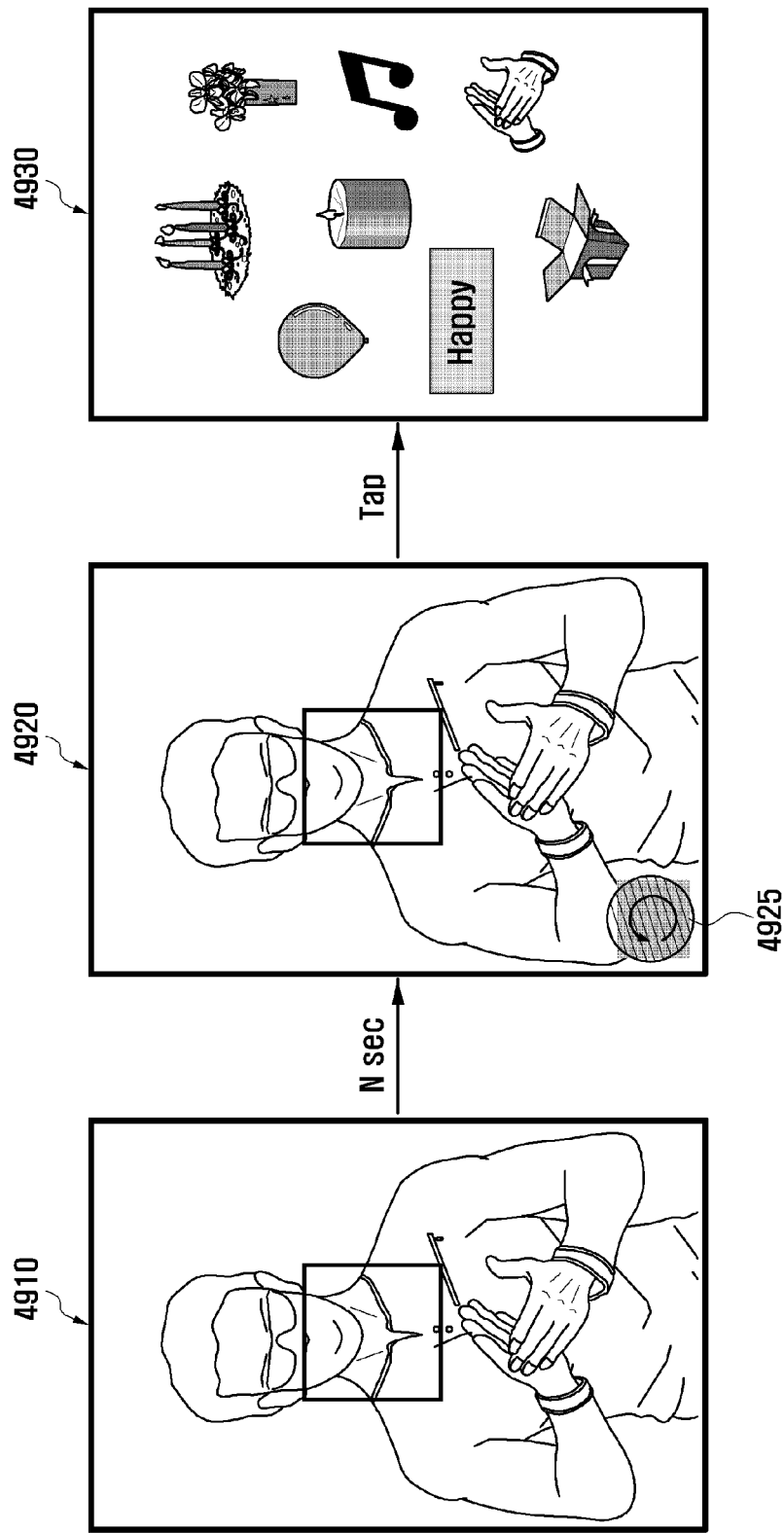

FIGS. 48 and 49 are diagrams illustrating exemplary operations of returning to previous menu while and a feedback effect of an event effect is rendered in the electronic device according to an exemplary embodiment of the present invention.

Referring to FIGS. 48 and 49, the user can make an input action onto an event element to render a feedback effect as shown in the screen images 4810 and 4910. The electronic device can be configured such that, if no user input is detected within a predetermined time (e.g. n seconds, where n is a natural value) after the beginning of the effect, a return menu item 4825 and 4925 for returning to the previous menu appears on the screen as shown in the screen images 4820 and 4920.

The user can request stopping the current operation and returning to the previous menu by selecting the return menu item 4825 and 4925. That is, if an input action (e.g. tap action) is detected on the return menu item 4825 and 4925, the electronic device stops the current operation and displays the screen corresponding to the previous step as shown in the screen image 4830, 4930. If the user input is detected on the return menu item, the electronic device can stop performing the current operation (e.g. rendering an effect) and return the process to the previous step or wait for the completion of the current operation (e.g. rendering an effect) and then return the process to the previous step.

Although the descriptions have been made with the exemplary cases in which the operations are triggered by single interactions, the present invention is not limited thereto but can be implemented with multiple interactions. For example, the user can make a tap interaction along with the blow interaction for rendering an effect. If the tap interaction is detected while rendering the effect in response to the blow interaction, the electronic device can render another effect responsive to the tap interaction while rendering the effect responsive to the blow interaction.

The descriptions have been made of the exemplary operations of rendering the effects in response to the user interactions in the electronic device according to the embodiments of the present invention hereinabove. Descriptions are made of the exemplary operations for sharing settings information between electronic devices supporting the entertainment function of the present invention and connected with each other through a wired or a wireless link and making user interactions and rendering the corresponding effects in the electronic devices.

Figure 50:
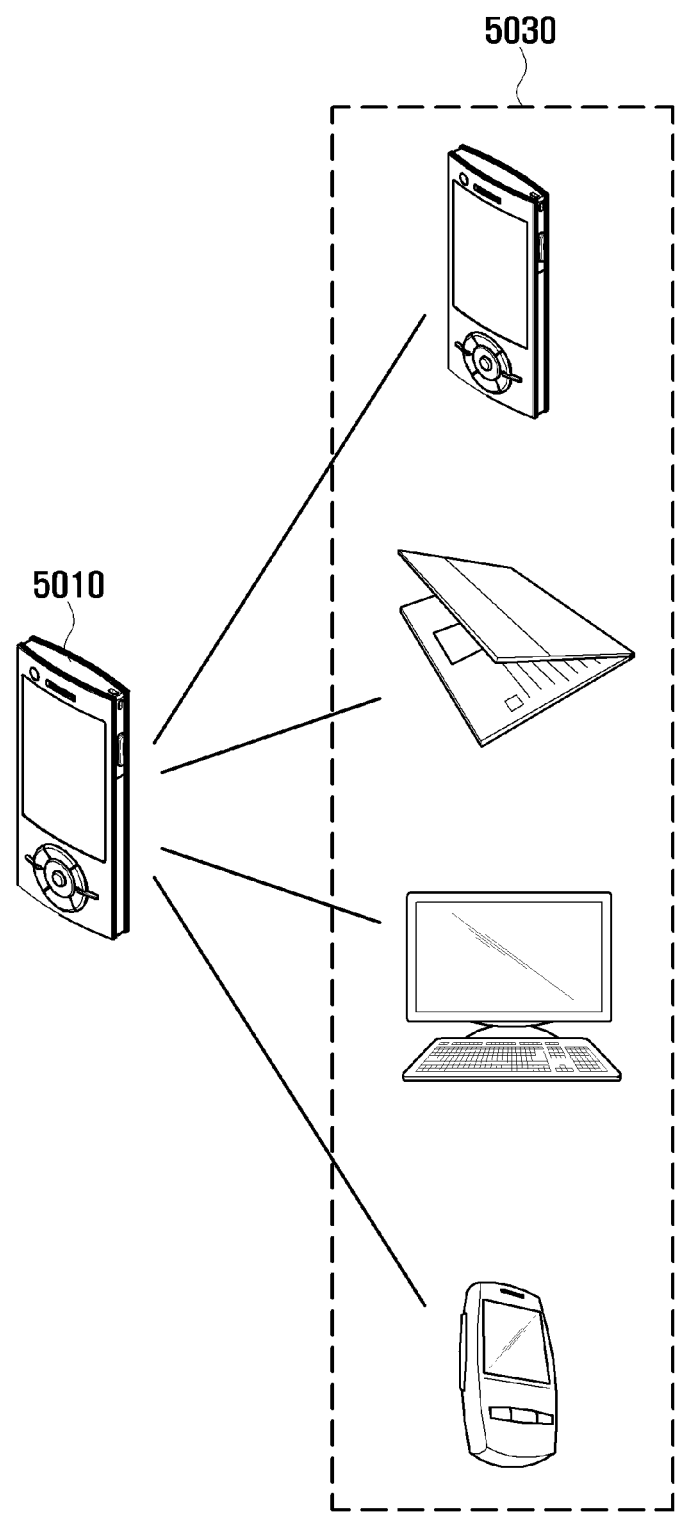
FIG. 50 is a diagram illustrating connection among the electronic devices supporting the entertainment function according to an exemplary embodiment of the present invention.

FIG. 50 is a diagram illustrating connection among the electronic devices supporting the entertainment function according to an exemplary embodiment of the present invention.

Referring to FIG. 50, the electronic device 5010 can communicate with any of other electronic devices 5030 through a wired or a wireless communication link. The electronic device 5010 can share the data and setting information related to the entertainment function with other electronic device 5030 by means of wired or wireless communication. For example, the electronic device 5010 can share the information on the object corresponding to the balloon item, effects mapped to the individual user interaction to the object, and settings about the effects with the other electronic device 5030. The shared information can be transferred in response to a user input by means of one of file transfer technologies used in wired and wireless communication systems. The shared information also can be transferred by means of a messaging service such as Multimedia Messaging Service (MMS). The shared information also can be transferred by means of a short range wireless communication link such as Bluetooth link. Although not depicted in FIG. 50, the data and settings information can be shared by means of an external storage medium.

When the electronic devices 5010 and 5030 are connected with each other, the effect intended by the user interaction input in one electronic device and be rendered in the other electronic device. For example, assuming that the electronic device 5010 is the sending party's electronic device (first electronic device) and one of the electronic devices 5030 is the receiving party's electronic device (second electronic device), the user can execute the entertainment function of the first electronic device 5010 and input a user interaction to the first electronic device 5010 such that the effect intended by the user interaction made in the first electronic device 5010 is rendered in the second electronic device 5030. The contents sharing technology according to an exemplary embodiment is described in detail with reference to FIGS. 51 to 54. However, the present invention is not limited to the following description on the contents sharing technology but can be implemented with various modifications in other exemplary embodiments.

Figure 51:
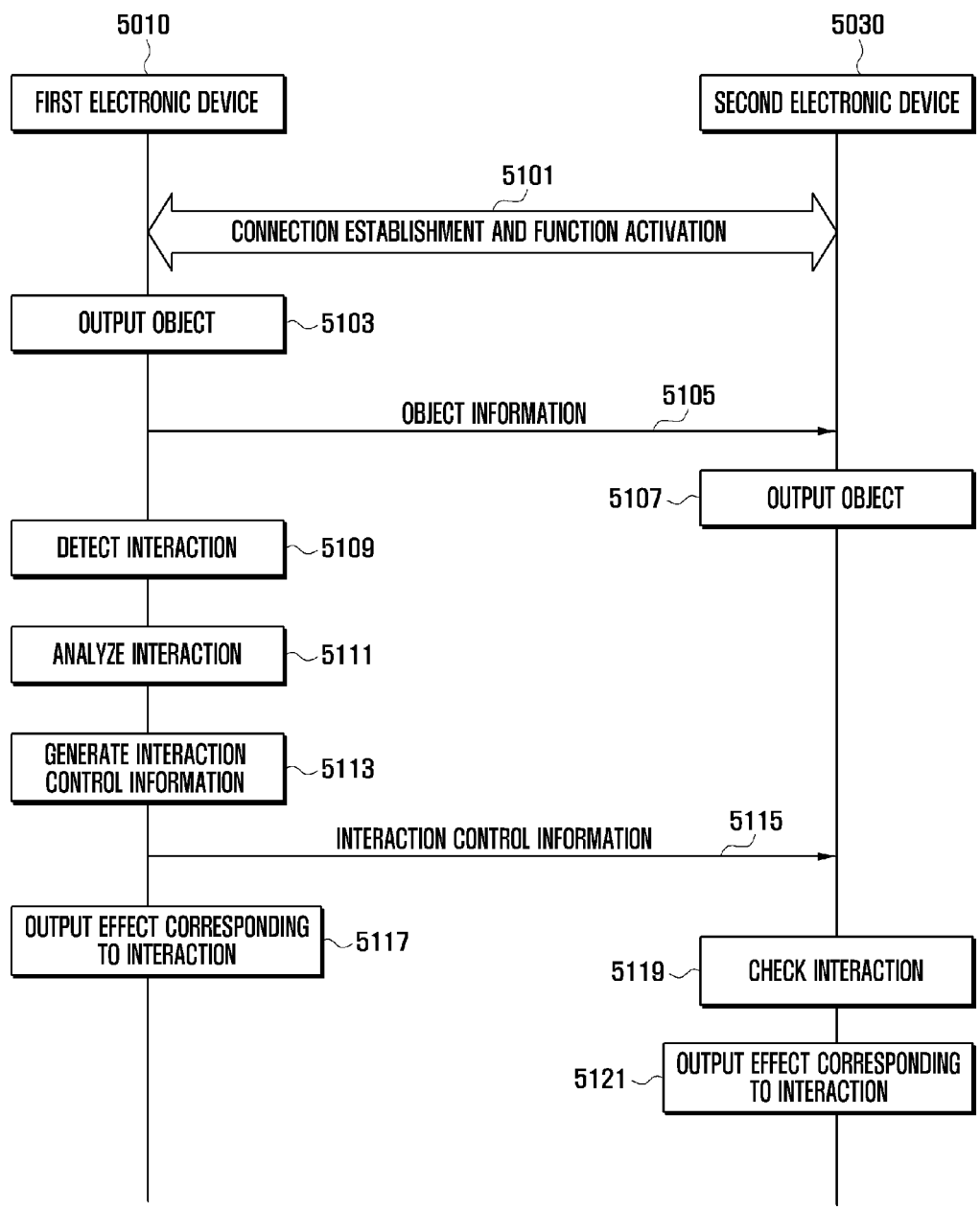
FIG. 51 is a sequence diagram illustrating operations of electronic devices connected with each other for rendering an effect remotely according to an exemplary embodiment of the present invention.
Figure 52:
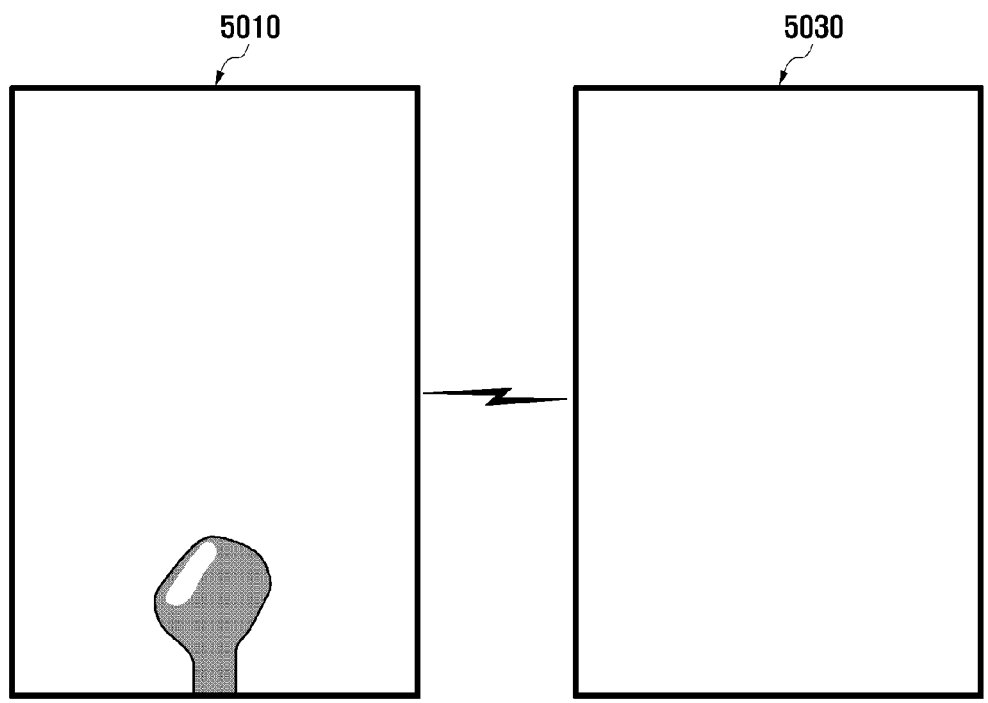
FIGS. 52 to 54 are diagrams illustrating steps of remote effect rendering procedure of FIG. 51.
Figure 53:
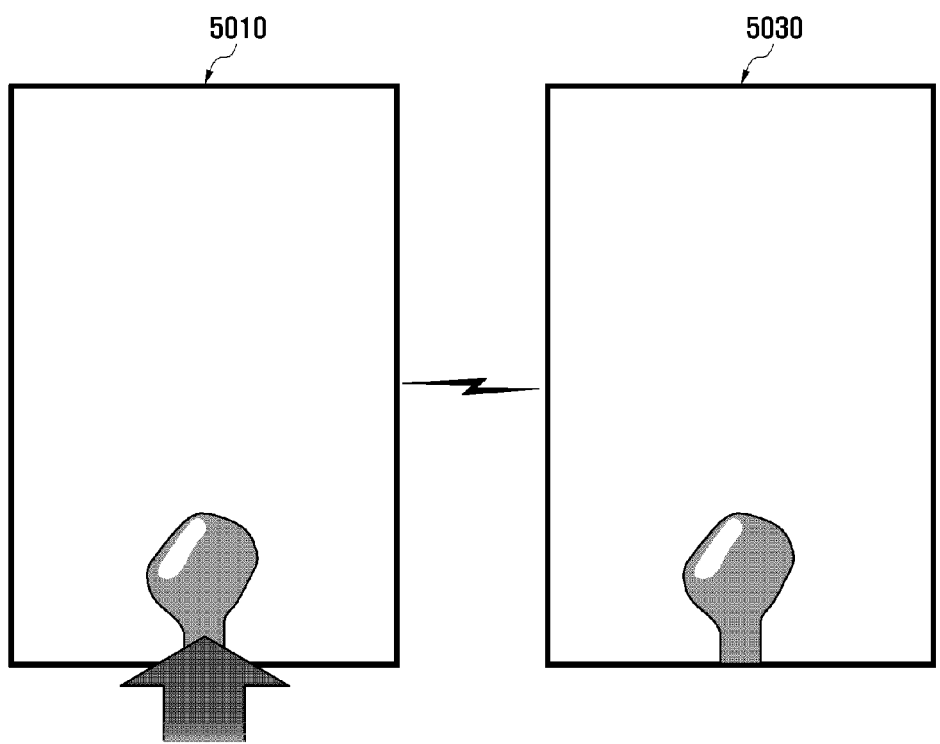
Figure 54:
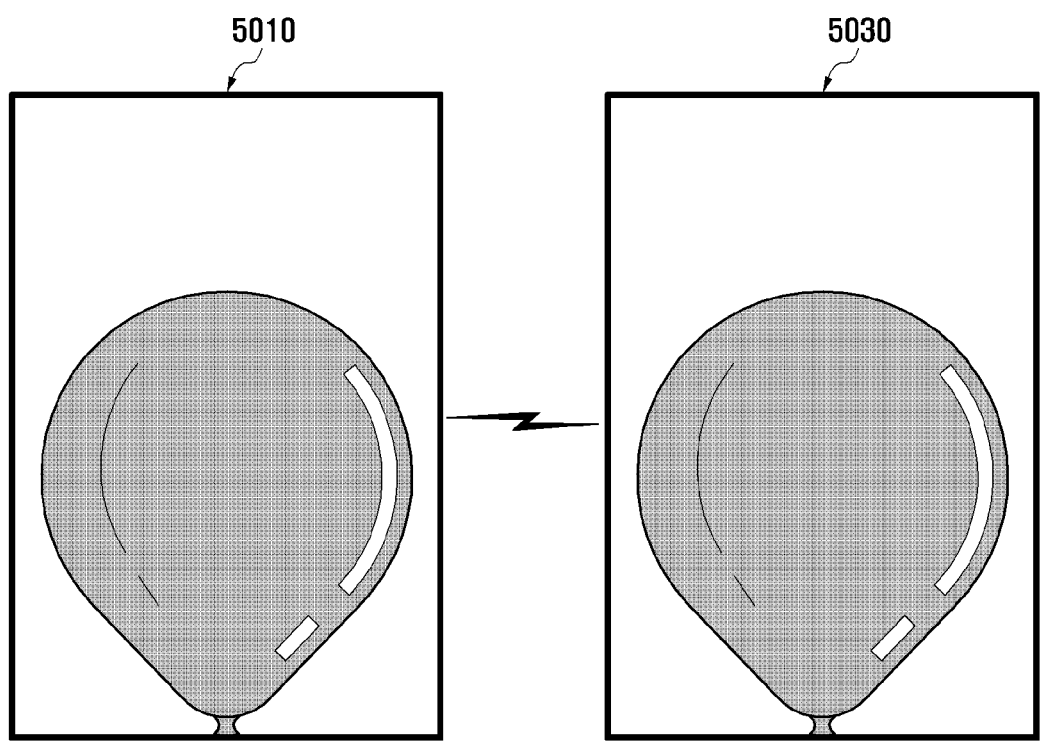

FIG. 51 is a sequence diagram illustrating operations of electronic devices connected with each other for rendering an effect remotely according to an exemplary embodiment of the present invention, and FIGS. 52 to 54 are diagrams illustrating steps of remote effect rendering procedure of FIG. 51.

Referring to FIGS. 51 to 54, the first and second electronic devices 5010 and 5030 establish a connection (5101). At this time, the electronic devices 5010 and 5030 can activate the entertainment function according to an exemplary embodiment of the present invention. For example, each of the electronic devices 5010 and 5030 display a function execution screen and activates a data communication mode in association with the entertainment function.

In an exemplary embodiment of the present invention, the electronic devices 5010 and 5030 can be connected with each other through any of a short range wireless communication link such as Bluetooth link, a wired link such as data cable, a Wireless Local Area Network (WLAN) link, and cellular communication link. The communication technology for establishing the connection between the first and second electronic device 501 and 5030 can be one of known wireless or wired communication technologies. In the exemplary case of FIGS. 51 to 54, it is assumed that a short range wireless communication technology is used. In an exemplary embodiment of the present invention, any of the communication technologies such as WLAN, Bluetooth, IrDA, and Zigbee can be used for establishing a communication channel between the electronic devices.

Once the connection is established between the first and second electronic devices 5010 and 5030, the first electronic device 5010 outputs an object corresponding to the event element selected by the user (5103). That is, the first electronic device 5010 displays the object corresponding to the balloon item selected by the user as shown in FIG. 52. Next, the first electronic device 5010 sends the information about the object (object information) to the second electronic device 5030 while displaying the object (5105). If the object information is received, the second electronic device 5030 displays the object on the screen based on the object information as shown in FIG. 53 (5107).

Although FIGS. 51 and 52 are depicted under the assumption that the information about the object output in the first electronic device 5010 is transmitted to the second electronic device 5030, the data of the object itself (object data) can be transmitted from the first electronic device 5010 to the second electronic device 5030. In this case, the second electronic device 5030 receives the object data and displays the object data on the screen through a process such as recoding.

After transmitting the object information, the first electronic device monitors the input unit to detect a user interaction while displaying the object (5109). If a user interaction is detected, the first electronic device 5010 analyzes the user interaction (5111). For example, the first electronic device 5010 can distinguish among voice interaction (e.g., blow interaction), touch interaction (e.g., tap interaction), motion interaction (e.g. orientation switching), and combinations thereof, including at least two types of interactions).

Next, the first electronic device 5010 generates a control information based on the analysis result (interaction control information) (5113) and sends the interaction control information to the second electronic device 5030 (5115). After sending the interaction control information, the first electronic device 5010 renders the effect in response to the user interaction (5117). Of course, the effect rendering at the first electronic device can be omitted.

If the interaction control information is received, the second electronic device 5030 identifies the interaction indicated by the interaction control information (5119). That is, the second electronic device 5030 checks the interaction made at the first electronic device 5010 based on the interaction control information. Finally, the second electronic device 5030 renders the effect in response to the interaction made at the first electronic device 5030 (5121). FIGS. 53 and 54 show the screen images of the first and second electronic devices 5010 and 5030 at steps 5109 and 5121.

Although the description is made with an exemplary case in which the second electronic device 5030 retrieves the interaction indicated by the interaction control information transmitted by the first electronic device 5010 from its predetermined settings information and renders the effect in response to the retrieved interaction, the second electronic device 5030 can render the effect based on the interaction control information received from the first electronic device 5010.

Although the description is directed to the case where the first electronic device 5010 sends the interaction control information to the second electronic device 5030, the first electronic device 5010 can send a motion picture file or a flash file for rendering the effect to the second electronic device 5030. In this case, the second electronic device 5030 can render the effect by playing the motion picture file or the flash file after performing a prerequisite process such as recording process.

As described with reference to FIGS. 50 to 54, the user can make an input action to one electronic device such that the effect intended by the user interaction is rendered in another electronic device according to an exemplary embodiment of the present invention. In this manner, the entertainment service can be provided in association with multiple electronic devices.

The description has been directed to the entertainment function which receives the user interaction by means of an object corresponding to an event element and renders the effect in response to the user interaction, hereinabove. The entertainment function of the present invention can be performed as a single operation function or a combination operation function in cooperation with other supplementary functions, such as an organizer function, a camera function, and a phonebook function to provide the user with supplementary services.

For example, by combining the birthday item and the organizer function, when somebody's birthday information is set by the organizer function is extracted, the electronic device can present specific objects such as icons and widgets corresponding to the birthday item in the idle screen on the day and/or time indicated by the birthday information. Using this combined function, the user can be entertained with the event service and informed of scheduled celebration events.

In an exemplary embodiment of the present invention, the objects corresponding to the event elements can be stored in association with the photo IDs of the contents (user information) configured by the phonebook function. In this case, the user can transmit the user interactions receivable by means of the associated objects and effect objects corresponding to the user interactions to a counterparty user only with the content selection behavior. That is, when the content sharing function is activated, the user can transmit specific data and settings information generated by the entertainment function to the counterparty by selecting the content (user information) associated with the counterparty.

In an exemplary embodiment of the present invention, the effect objects, particularly the objects used for the background music and background image can be provided using the music files and photo data stored in the electronic device.

As described above, the event service provision method and apparatus for an electronic device according to the present invention is capable of providing the user with information service with various informative events. That is, the user can user the event service in simple manner with the object (including screen image and sound) corresponding to the event situation by selecting one of the predefined event elements which is suitable for the event situation. Also, the user can experience an effect object reflecting various effects rendered in response to one or more user interactions made on an event object. According to an exemplary embodiment of the present invention, the user can use the more emotional and intuitive interface adaptive to the event situation with the entertainment function and experience virtual but realistic events.

According to an exemplary embodiment of the present invention, various user interactions (voice interaction, touch interaction, motion interaction, etc.) are predefined according to given situations such that the user can easily use and transmit the user interactions. That is, the user interaction method and apparatus of the present invention is capable of improving limited and inflexible control mechanism, virtual reality, and utilization convenience.

According to an exemplary embodiment of the present invention, the user interaction method and apparatus for an electronic device is capable of providing the user with emotional and intuitive services by combining the basic functions (voice call, messaging, phonebook, organizer, and camera functions) and the entertainment function.

According to an exemplary embodiment of the present invention, the user interaction method and apparatus allows multiple electronic devices to the entertainment function such that multiple users can enjoy the event service. Also, the user interaction method and apparatus of the present invention allows the user to make user interactions related to an event service provided by an electronic device such that an event object as a result of the user interaction is output through another electronic device. In this manner, the user can celebrate any special occasion such as somebody's birthday with dynamic and intuitive events.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware includes memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An interaction method, operable in a processor within an electronic device, comprising:
outputting an event object including event content in response to an input action to an event element;
detecting a user interaction to the event object; and
outputting an effect object in response to the user interaction, wherein the outputted effect object includes outputted media composed of effect content and having at least animated graphical special effects, with the effect content being different from the event content of the event object and the event element.

2. The interaction method of claim 1, wherein the event element can be one of: a single event element and a group event element which includes at least two single event elements.

3. The interaction method of claim 2, wherein the event element is a single event element, and further comprising:
outputting an effect object that comprises rendering the effect object in response to the user interaction to the event object.

4. The interaction method of claim 2, wherein the event element is a group event element, and further comprising:
outputting an effect object that comprises rendering one of effect objects depending on the user interaction made on a current event object corresponding to one of the single event elements included in the group element.

5. The interaction method of claim 2, wherein the effect object comprises at least one effect mapped to the event element and the user interaction.

6. The interaction method of claim 5, wherein the at least one effect comprises at least one of: a video effect, an audio effect, and a haptic effect.

7. The interaction method of claim 2, wherein the user interaction is at least one of: a voice interaction, a touch interaction, a motion interaction, and a combined thereof.

8. The interaction method of claim 2, wherein outputting an effect object comprises:
analyzing the user interaction;
extracting at least one effect object corresponding to the user interaction; and
playing a motion picture for rendering the at least one effect object.

9. The interaction method of claim 8, wherein the motion picture comprises at least one of: a video file and flash file.

10. The interaction method of claim 2, further comprising analyzing an intensity of the user interaction, wherein outputting an effect object comprises determining one of event objects depending on the intensity of the user interaction.

11. The interaction method of claim 2, wherein a user interaction comprises a series of input actions, and further comprising: outputting an effect object that comprises rendering a series of effects corresponding to the series of input actions.

12. The interaction method of claim 2, wherein a user interaction comprises a first input action and a second input action following the first input action, and further comprising:
outputting an effect object that comprises rendering an effect corresponding to the second input action in combination with an effect rendered in response to the first input action.

13. The interaction method of claim 2, further comprising:
correlating the event element with an application running in the electronic device; and
outputting an event object of the event element correlated with the application when the application is executed.

14. The interaction method of claim 2, further comprising transmitting the effect object to a second electronic device.

15. An interaction system for an electronic device, comprising:
a plurality of event elements displayed on a display unit for executing event effects corresponding to various situations;
a plurality of event objects displayed on the display unit and mapped to the event elements, with each event object having respective event content;
a plurality of user interactions that can be made to the event objects; and
a plurality of effect objects outputted by an output device including the display unit mapped to the event elements and the user interactions per event element, wherein each effect object includes outputted media composed of effect content and having at least animated graphical special effects, with the effect content being different from the event content of the corresponding event object of the plurality of event objects and the plurality of event elements.

16. The interaction system of claim 15, wherein each event object is an object to execute an event corresponding to the event element in response to one of the user interactions.

17. The interaction system of claim 16, wherein each effect object is an object to render an effect in response to one of the user interaction.

18. An interaction apparatus for an electronic device, comprising:
an input means which receives at least one user interaction associated with an event element and an outputted event object including event content; and
an output means which outputs an effect object in response to a user interaction input through the input means, wherein the outputted effect object includes outputted media composed of effect content and having at least animated graphical special effects, with the effect content being different from the event content of the event object and the event element.

19. The interaction apparatus of claim 18, wherein the input means comprises at least one of: a voice input device, a touch input device, and a motion input device that can detect predefined user interactions.

20. The interaction apparatus of claim 19, wherein the output means comprises at least one of: an audio output device, a video output device, and a vibration output device that can output predefined effects.

* * * * *